United States Patent [19]

Foley

[11] 4,304,833
[45] Dec. 8, 1981

[54] PHOTOGRAPHIC PRODUCTS AND PROCESSES EMPLOYING TRIARYLMETHANE COMPOUNDS

[75] Inventor: James W. Foley, Andover, Mass.

[73] Assignee: Polaroid Corporation, Cambridge, Mass.

[21] Appl. No.: 152,189

[22] Filed: May 22, 1980

Related U.S. Application Data

[63] Continuation-in-part of Ser. No. 106,520, Dec. 26, 1979, abandoned.

[51] Int. Cl.$^3$ .................. G03C 1/40; G03C 1/84; G03C 1/10; G03C 5/54
[52] U.S. Cl. .................. 430/221; 430/227; 430/228; 430/236; 430/244; 430/245; 430/383; 430/390; 430/520; 430/434; 430/446; 430/448; 430/505
[58] Field of Search ............. 430/221, 520, 236, 244, 430/245, 227, 228, 505, 446, 434, 448, 383, 390

[56] References Cited

U.S. PATENT DOCUMENTS

| | | | |
|---|---|---|---|
| 1,879,537 | 9/1932 | Schneider | 430/520 |
| 1,994,876 | 3/1935 | Schneider et al. | 430/517 |
| 2,350,090 | 5/1944 | Beilenson | 430/520 |
| 3,005,711 | 10/1961 | Burgardt et al. | 430/520 |
| 3,406,069 | 10/1968 | Overman | 430/510 |
| 4,139,381 | 2/1979 | Bloom et al. | 430/221 |

*Primary Examiner*—Richard L. Schilling
*Attorney, Agent, or Firm*—Sybil A. Campbell

[57] ABSTRACT

The present invention is concerned with photographic products and processes, particularly diffusion transfer products and processes employing certain colored triarylmethane compounds possessing in their triaryl structure a 4'-oxo-1'-naphthylidene (or a 4'-oxo-1'-phenylidene) moiety, a naphthyl (or phenyl moiety) and a phenyl moiety substituted in the ortho-position to the central carbon atom with a non-nucleophilic group that cannot add to the central carbon atom but in alkaline solution undergoes an irreversible cleavage reaction with base that is complete within a predetermined time at a predetermined alkaline pH to provide a nucleophilic moiety that adds to the central carbon atom to form a ring-closed compound which is colorless.

62 Claims, 2 Drawing Figures

PHOTOGRAPHIC PRODUCTS AND PROCESSES EMPLOYING TRIARYLMETHANE COMPOUNDS

CROSS-REFERENCE TO RELATED APPLICATION

This is a continuation-in-part of application Ser. No. 106,520 filed Dec. 26, 1979 and now abandoned.

BACKGROUND OF THE INVENTION

1. Field of the Invention

This invention relates to photography, and more particularly, it relates to the use of certain triarylmethane compounds in photographic products and processes.

2. Description of the Prior Art

It is well known that photographic film, and especially multicolor films, may and generally do vary from lot to lot, notwithstanding efforts to "repeat" previous films. Manufacturers of multicolor photographic films have developed a number of procedures to minimize the effects upon the final multicolor image of unavoidable variations in the manufacturing operations. These variations are reflected primarily in shifts in color balance as reflected in mismatching of the D log E curves of the individual red, green and blue exposures. Equipment used to coat multicolor films is highly precise but variations between intended coverage of silver halide and/or the dye image-forming materials do occur. Repeat batches of silver halide emulsions may, and usually do, vary in their photographic response. Individual layers may be dried to slightly different degrees. Films are stored for a period of time after coating to allow the films to "age", so that changes in sensitometry following coating have an opportunity to reach a plateau prior to sale. If the film is designed to be developed by a photofinisher or in a darkroom, processing of the exposed multicolor film is controlled within very narrow limits, typically within plus or minus a half degree of a prescribed temperature, in order to minimize sensitometric variations from film to film. Where the multicolor film is of the negative type, an opportunity to adjust the sensitometry occurs in printing the desired final positive image, during which operation the printing exposure may be appropriately color filtered.

The basic sources of sensitometric variations noted above exist also in multicolor diffusion transfer films, with the added complication that once the film is shipped, the sensitometric properties are essentially fixed. The opportunity for adjustment provided in darkroom processing, practically speaking, is unavailable for users of self-developing films. While professional and advanced amateur photographers may be skillful enough to utilize color correction filters to at least partially "rebalance" the color balance, ordinary users of the film would only be confused by such additional operations.

It is well known to use light-screening dyes in photographic elements. Such a dye may be incorporated as a filter dye in a light-sensitive emulsion layer(s) or in a layer coated over one or more light-sensitive emulsion layers or between two differently color-sensitized emulsion layers to modify the light record in the emulsion layer or to control the spectral composition of light falling on the underlying light-sensitive layer, or it may be incorporated as an anti-halation dye in a non-light-sensitive layer positioned on either side of a support carrying the light-sensitive layer(s).

The dyes employed for these purposes, in addition to having the requisite spectral absorption characteristics for their intended use should not have any adverse effect on the properties of the light-sensitive emulsion layer(s), and also, should be capable of being decolorized or removed during photographic processing so as not to leave stain in the processed photographic element. In photographic processes where the dye is removed by being dissolved in a processing solution, it is usually preferred that the dye also decolorize in order to avoid contamination of the processing solution and to prevent staining from residual dye in the processed light-sensitive element.

Though various classes of dyes have been proposed for use in antihalation and color correction filter layers, the dyes heretofore employed have not been altogether satisfactory. Some of the dyes tend to reduce sensitivity, fog or exert other adverse effect on the light-sensitive material. However, the major drawback of previously employed dyes is their tendency to cause stain due to incomplete decolorization or reversal of some of the decolorized form to the original colored form. For example, some classes of dyes rely on the presence of a reagent, such as, a sulfite for "bleaching", i.e., decolorization and unless the dyes are removed from the light-sensitive material during or after processing, their color may reappear in time.

Among the classes of light-screening dyes used previously are the triarylmethanes. For example, U.S. Pat. Nos. 1,879,537; 1,994,876; 2,350,090; and 3,005,711 disclose the use of fuchsone-type dyes in antihalation layers, and U.S. Pat. Nos. 3,406,069 and 3,615,548 are concerned with the metal chelates of fuchsone dyes as antihalation dyes. These and other types of triarylmethane dyes suffer from one or more of the drawbacks discussed above, and in particular, prior dyes of this type have been difficult to keep decolorized at the pH's normally encountered during processing subsequent to bleaching and in the final product.

U.S. Pat. No. 4,139,381 of Stanley M. Bloom, Alan L. Borror and James W. Foley is directed to the use of certain 3,3-disubstituted sulfam(na)phthaleins as photographic optical filter agents and filter agent precursors. As described therein, one of the 3-substituents is a 4'-hydroxy-1'-phenyl moiety or a 4'-hydroxy-1'-naphthyl moiety, the other of the 3-substituents is a phenyl moiety or a naphthyl moiety, and the N atom of the sulfam(na)phthalein ring is substituted with a carbonyl moiety that undergoes an irreversible cleavage reaction in alkaline solution. These compounds are initially colorless, i.e., they do not absorb visible radiation intended to expose the photosensitive material but upon contact with base form a colored compound capable of absorbing such radiation thereby preventing further exposure of said photosensitive material by ambient light, which colored compound after remaining in contact with said base for a given time forms a colorless compound as a result of the irreversible cleavage of the carbonyl moiety.

Copending U.S. patent application Ser. No. 957,161 of James W. Foley filed Nov. 2, 1978, now U.S. Pat. No. 4,186,004 and copending U.S. patent application Ser. No. 836,067 of Alan L. Borror et al filed Sept. 23, 1977, now U.S. Pat. No. 4,195,180 also are concerned with N-carbonyl-3,3-disubstituted sulfam(na)phthaleins. The sulfam(na)phthaleins disclosed in these applications are initially colored, and when contacted with base, they are converted to a form having a different color, which form decolorizes by undergoing an irreversible cleavage reaction after remaining in contact with said base for a given time. U.S. patent applications Ser. Nos. 106,902 and 106,901 of Louis Cincotta and James W. Foley and of Richard Cournoyer and James W. Foley, respectively, both filed Dec. 26, 1979 disclose xanthene dyes which also decolorize by irreversible cleavage in base, and like the initially colored sulfam(na)phthaleins, offer advantages over prior light-screening dyes because of their ability to decolorize completely and irreversibly to a substantially inert colorless product.

The present invention is concerned with another class of compounds which also find utility as photographic light-screening dyes and which also are free from the deficiencies associated with the dyes previously used for this purpose. The subject triarylmethane dyes, which will be defined with greater particularity hereinafter, are efficient absorbers of radiation within a predetermined range in the visible range of 400 to 700 nm, may be incorporated in gelatin or other processing composition-permeable colloidal binding agents and are decolorized at an alkaline pH to yield a colorless product. Because of their ability to decolorize completely and irreversibly in base without requiring an additional reagent, such as, a sulfite for the "bleaching" reaction and because the new colorless product produced upon irreversible cleavage remains colorless in aqueous solution over a pH range of 1 to 14, the cleavage product may be retained in the photographic light-sensitive element without the possibility of color reappearing in time. Besides being non-staining, the compounds usually are substantially inert with respect to the light-sensitive material and thus, may be positioned in a layer adjacent to a silver halide emulsion layer or directly incorporated into an emulsion layer without having any adverse effect on the properties of the emulsion.

SUMMARY OF THE INVENTION

It is therefore the primary object of the present invention to provide photographic products and processes which employ certain colored triarylmethane compounds which are irreversibly decolorized by forming a new ring-closed compound when contacted with an alkaline photographic processing composition.

It is another object of the present invention to provide photographic multicolor diffusion transfer film units which contain a layer of said triarylmethane dye(s) so positioned that photoexposure is effected therethrough to correct imbalances in the color sensitometry of the multicolor photosensitive element of said film units.

Other objects of this invention will in part be obvious and will in part appear hereinafter.

This invention accordingly comprises the process involving the several steps and the relation and order of one or more of such steps with respect to each of the others and the products and compositions possessing the features, properties and the relation of elements which are exemplified in the following detailed disclosure, and the scope of the application of which will be indicated in the claims.

For a fuller understanding of the nature and objects of the present invention, reference should be had to the following detailed description taken in conjunction with the accompanying drawings.

DETAILED DESCRIPTION OF THE INVENTION

Figure 1:
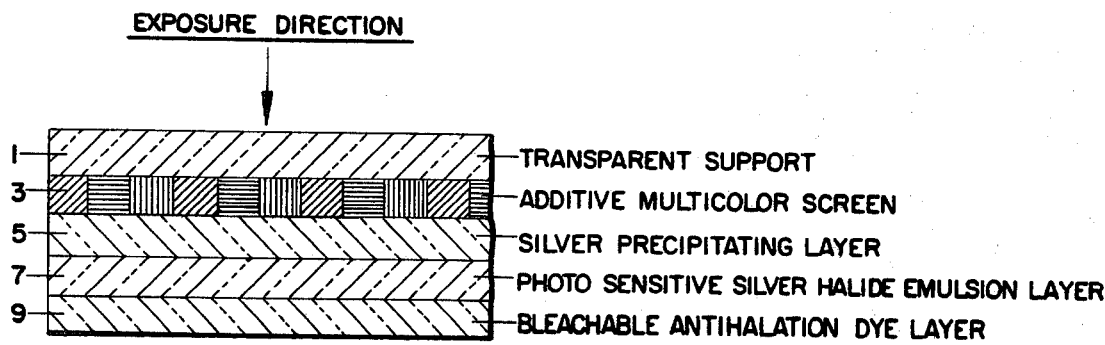
FIG. 1 is a diagrammatic, enlarged cross-sectional view of a diffusion transfer film unit incorporating a dye of the present invention as a bleachable antihalation dye layer.

Specifically, the compounds employed in accordance with the present invention may be represented by the formula

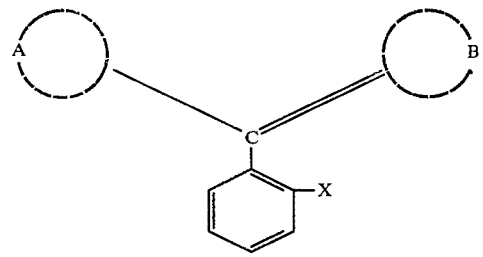

wherein A is a phenyl moiety or a naphthyl moiety; B is a 4'-oxo-1'-phenyl moiety or a 4'-oxo-1'-naphthyl moiety and X is a non-nucleophilic group that cannot add to the central carbon atom but in alkaline solution undergoes an irreversible cleavage reaction with base that is complete within a predetermined time at a predetermined alkaline pH to provide a nucleophilic moiety that adds to the central carbon atom to form a ring-closed compound which is colorless.

It will be understood that the A moiety and/or the B moiety of the compounds represented in formula I above also may contain one or more substituents in addition to those specified, which substituents should not interfere with the intended use of the compounds.

Typical substituents include branched or straight chain alkyl, such as, methyl, ethyl, n-propyl, isopropyl, n-butyl, t-butyl, hexyl, octyl, dodecyl, hexadecyl, octadecyl and eicosanyl; aryl, such as phenyl and naphthyl; alkaryl and aralkyl, preferably, alkyl-substituted phenyl and phenyl-substituted alkyl, such as, p-ethylphenyl, p-octylphenyl, p-dodecylphenyl, benzyl, phenethyl, phenylhexyl and phenyldodecyl; alkoxy, such as, methoxy, ethoxy, butoxy, octadecyloxy, 1-ethoxy-2-($\beta$-ethoxyethoxy); aryloxy, such as, phenoxy, benzyloxy and naphthoxy; alkoxyalkyl, such as, methoxyethyl, ethoxymethyl, and dodecyloxyethl; halo, such as, fluoro, bromo and chloro; trihalomethyl, such as, trifluoromethyl and trichloromethyl; sulfonamido (—NH—$SO_2$—$R_0$ wherein $R_0$ is alkyl, aryl, alkaryl or aralkyl); sulfamoyl (—$SO_2$—NH—$R_0$ wherein $R_0$ has the same meaning given above); sulfonyl (—$SO_2$—$R_0$ wherein $R_0$ has the same meaning given above); sulfo; hydroxy; amino including mono- and disubstituted amino (—$NR_1R_2$ wherein $R_1$ and $R_2$ each are hydrogen, alkyl, aryl, alkaryl or aralkyl and $R_1$ and $R_2$ taken together represent the atoms necessary to complete a heterocyclic ring, such as piperidino, pyrrolidino, N-lower alkylpiperazino, morpholino, thiomorpholino and tetrahydro-2H,4H-1,3,6-dioxazocino.

Examples of useful X groups include

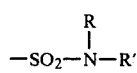

wherein R is an alkyl group or a phenyl group, unsubstituted or substituted with a solubilizing group; R' is selected from

wherein R" is methyl, unsubstituted or substituted with, e.g., one or two halo groups or substituted with a phenyl, alkoxy or phenoxy group and

wherein Y is an electron-withdrawing group; and R and R' taken with said $$-\overset{|}{\underset{|}{N}}-$$

represents

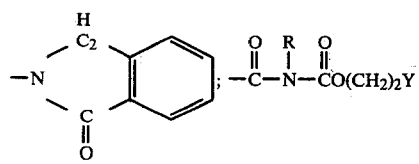

wherein R and Y have the same meaning given above;

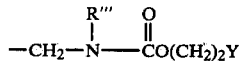

wherein R''' is an alkyl group, unsubstituted or substituted with a solubilizing group and Y has the same meaning given above; and

wherein R° is hydrogen; alkyl, unsubstituted or substituted with, e.g., halo, alkoxy, carboxy-substituted alkoxy, phenoxy or phenyl; or phenyl, unsubstituted or substituted usually in the meta or para position with, e.g., halo, alkoxy, nitro, dimethylamino or alkyl.

As noted above, the subject compounds are initially colored, i.e., capable of absorbing visible radiation, and at an alkaline pH, are converted to a colorless product by undergoing an irreversible cleavage reaction with base. The colorless product formed is a new compound which is different from and non-reversible to the colored compound by a change in pH. In particular, it is the X group substituted on the phenyl moiety in a position ortho to the central carbon atom that undergoes the irreversible cleavage reaction in alkaline solution that is complete within a predetermined time at a predetermined alkaline pH to give the new ring-closed compound as illustrated by the following wherein the A moiety is 4'-hydroxyphenyl and the B moiety is 4'-oxophenylidene.

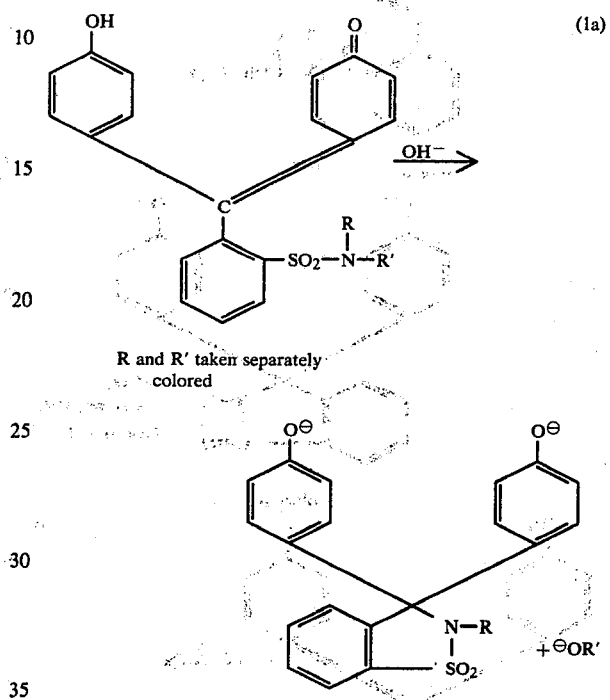

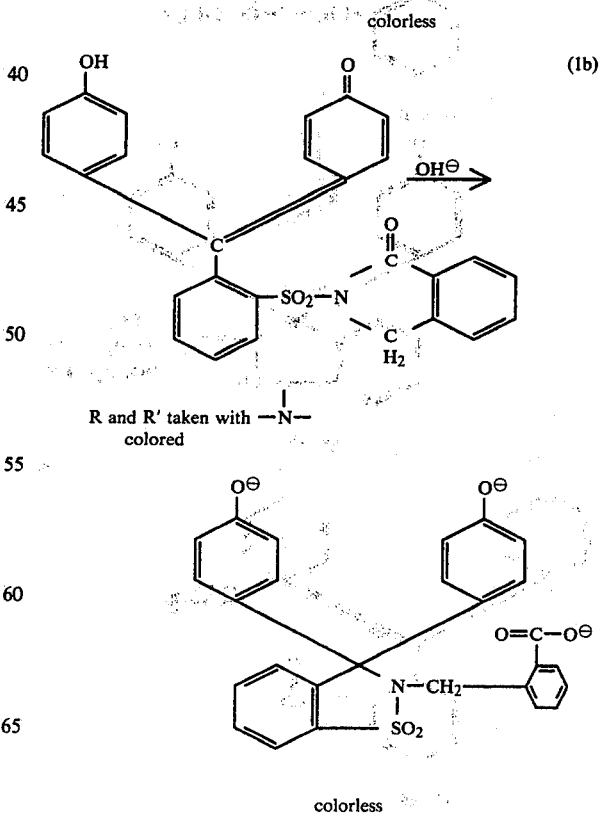

-continued

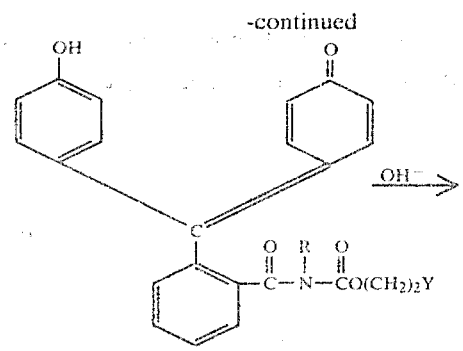

colored

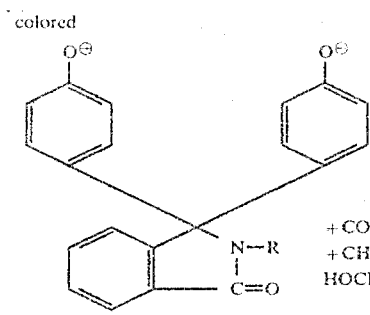

$+CO_2$
$+CH_2=CHY/$
$HOCH_2CH_2Y$ colorless

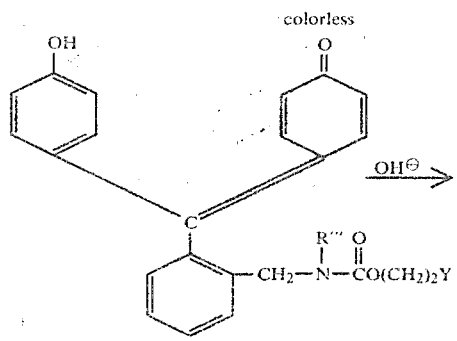

colored

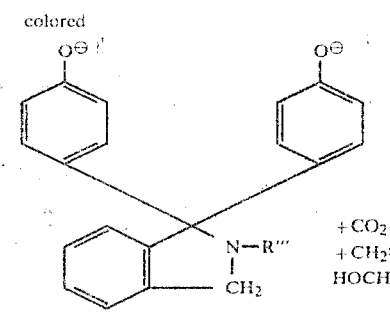

$+CO_2$
$+CH_2=CHY/$
$HOCH_2CH_2Y$ colorless

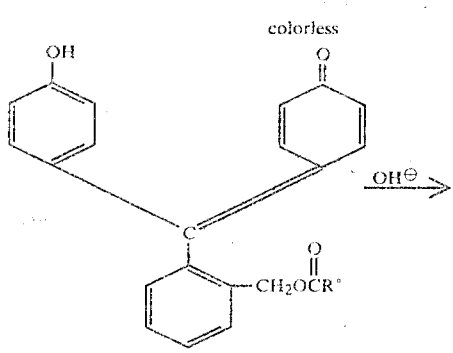

colored

-continued

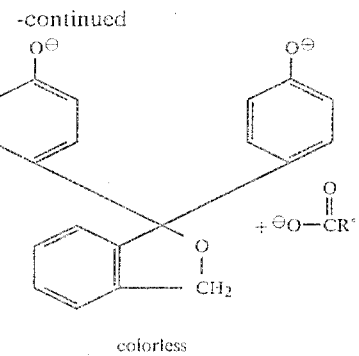

$+ {}^{\ominus}O-CR'$ colorless

It will be appreciated that the by-products formed upon cleavage of the X group also are colorless. Because the said cleavage reaction proceeds at a faster rate at higher pH's, the subject compounds are particularly suitable for use in photographic processes where the pH is maintained above about 10 at least for the time necessary for decolorization to the corresponding ring-closed product.

Typical of the triarylmethane light-screening dyes of the present invention are those represented by the following formulae

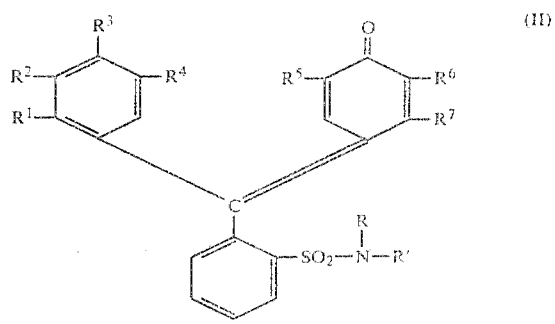

(II)

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen; alkyl, alkoxy, hydroxy, -N,N-(dialkyl)amino, -N,N-(w-$R^8$alkyl)$_2$amino wherein $R^8$ is halo or hydroxy, piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydrogen, phenyl, alkyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, both of which may be unsubstituted or substituted with a solubilizing group; R' is selected from

wherein R" is methyl, unsubstituted or substituted with one or two halo groups or substituted with a phenyl, alkoxy or phenoxy group, and

wherein Y is an electron-withdrawing group; and R and R' taken with said

represents

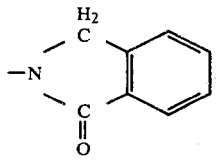

By "solubilizing group" is meant a group that enhances the solubility of the compound in aqueous alkaline photographic processing solutions. Preferably, said solubilizing groups are —SO$_3$H, —COOH or —OH and said R is an alkyl group having 1 to 4 carbon atoms. When R" is substituted, the halo group(s) preferably is selected from chloro, bromo and fluoro, and when substituted with two halo groups, they are preferably the same. When substituted with alkoxy, the alkoxy preferably has 1 to 4 carbon atoms. The electron-withdrawing group, Y, preferably has a positive sigma value ($\sigma^-$) greater than 0.6. Preferred electron-withdrawing groups include nitro; cyano; —SO$_2$CH$_3$;

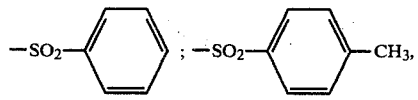

COCH$_3$; and —SO$_2$N(CH$_2$Ph)$_2$. The sigma value for these and other groups, such as, —CHO, —COOH, —COOC$_2$H$_5$ and —CONH$_2$ have been reported by Eugen Müller, Methoden Der Organischen Chemie, Georg Thieme Verlag, Stuttgart, 1970, p. 78 in terms of $\sigma^-$ values based on the ionization of p-substituted phenols.

Usually, the alkyl and alkoxy substituents comprising R$^1$, R$^2$, R$^3$, R$^4$, R$^5$, R$^6$ and R$^7$ are lower alkyl having 1 to 4 carbon atoms, such as, methyl, ethyl, n-propyl, isopropyl and n-butyl and lower alkoxy having 1 to 4 carbon atoms, such as, methoxy, ethoxy, propoxy and butoxy. Also, the alkyl groups of the -N,N-(dialkyl)amino and -N,N-(w-R$^8$alkyl)$_2$-amino substituents usually are lower alkyl having 1 to 4 carbon atoms and R$^8$, when halo, is preferably chloro. When R$^5$ is perhalomethylcarbinol, it is preferably

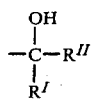

wherein R$^I$ is perhalomethyl, e.g., trifluoromethyl, difluoromethyl, difluorochloromethyl, dichlorofluoromethyl, dichloromethyl and trichloromethyl and R$^{II}$ is hydrogen or said perhalomethyl, usually the same as R$^I$.

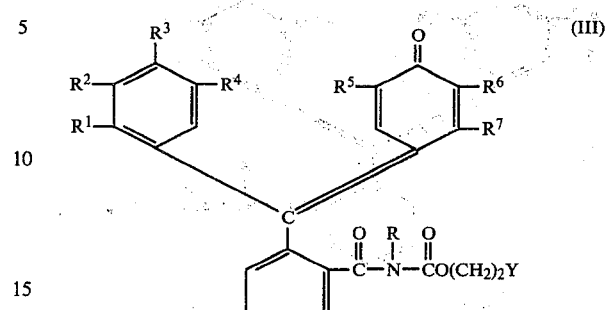

wherein R, R$^1$, R$^2$, R$^3$, R$^4$, R$^5$, R$^6$, R$^7$ and Y have the same meaning given above.

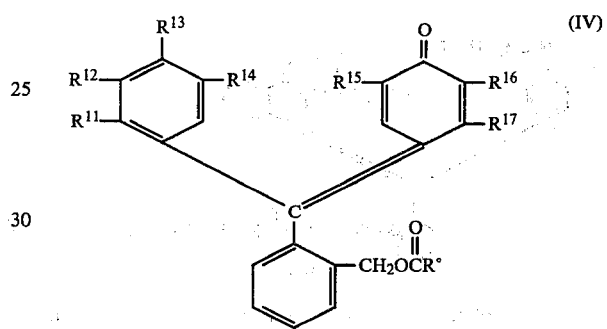

wherein R$^{11}$ is hydrogen, alkyl, alkoxy or hydroxy; R$^{12}$ and R$^{14}$ each are selected from hydrogen, alkyl, alkoxy, chloro and fluoro; R$^{11}$ and R$^{12}$ taken together represent the carbon atoms necessary to complete a fused benzene ring; R$^{13}$ is hydrogen, alkyl, alkoxy, hydroxy, -N,N-(dialkyl)amino, -N,N-(w-R$^8$alkyl)$_2$amino wherein R$^8$ is halo or hydroxy; piperidino, pyrrolidino, N-methylpiperazino, morpholino, thiomorpholino or tetrahydro-2H,4H-1,3,6-dioxazocino; R$^{15}$ is hydrogen, phenyl, alkyl, alkoxy, chloro or fluoro; R$^{16}$ is hydrogen, alkyl, alkoxy, chloro or fluoro; R$^{17}$ is hydrogen; alkyl, alkoxy or hydroxy and R$^{16}$ and R$^{17}$ taken together represent the carbon atoms necessary to complete a fused benzene ring; and R° is hydrogen; alkyl, unsubstituted or substituted with halo, alkoxy, carboxy-substituted alkoxy, phenoxy or phenyl; phenyl, unsubstituted or substituted in the m- or p-position with halo, alkoxy, alkyl, nitro or dimethylamino.

Usually, the alkyl and alkoxy substituents comprising R$^{11}$, R$^{12}$, R$^{13}$, R$^{14}$, R$^{15}$, R$^{16}$ and R$^{17}$ and comprising R° and the substituent groups on R° are lower alkyl having 1 to 4 carbon atoms, such as methyl, ethyl, n-propyl, isopropyl and n-butyl and lower alkoxy having 1 to 4 carbon atoms, such as, methoxy, ethoxy, propoxy and butoxy. Also, the alkyl groups of the -N,N-(dialkyl)amino and -N,N-(w-R$^8$alkyl)$_2$amino substituents usually are lower alkyl having 1 to 4 carbon atoms and R$^8$, when halo, is preferably chloro.

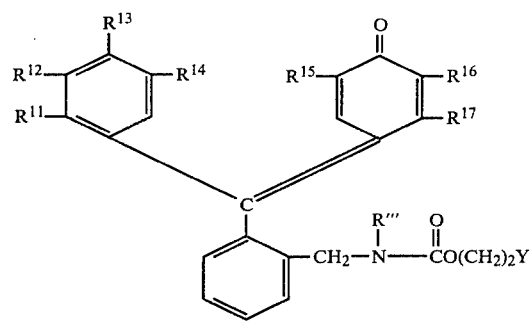
(V)
wherein R''' is alkyl, unsubstituted or substituted with a solubilizing group and $R^{11}$, $R^{12}$, $R^{13}$, $R^{14}$, $R^{15}$, $R^{16}$, $R^{17}$ and Y have the same meaning given above. Preferably, R''' is alkyl having 1 to 4 carbon atoms.
Specific examples of compounds within the scope of the present invention are as follows:
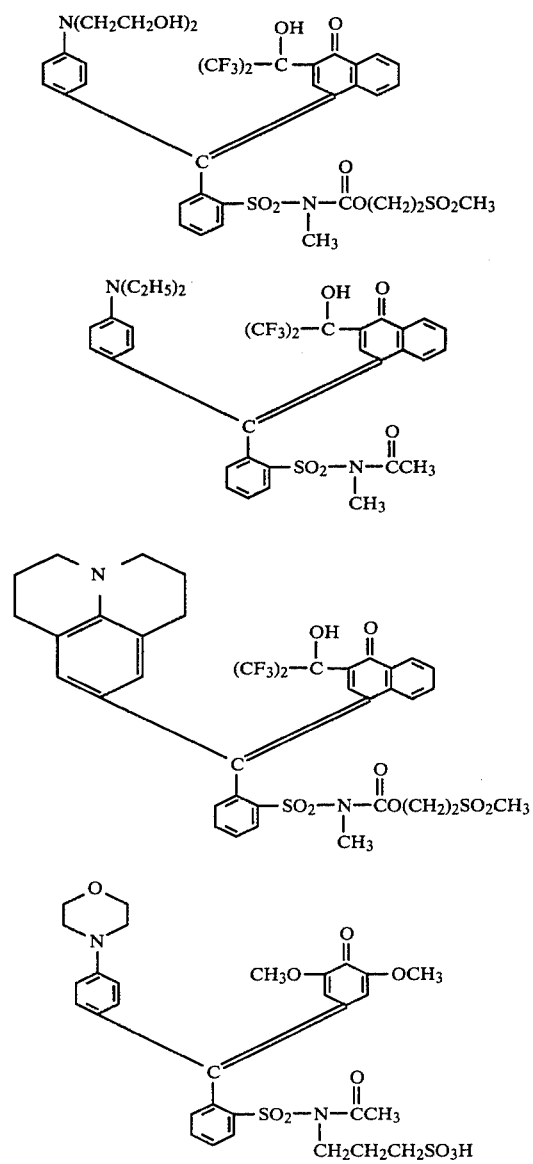
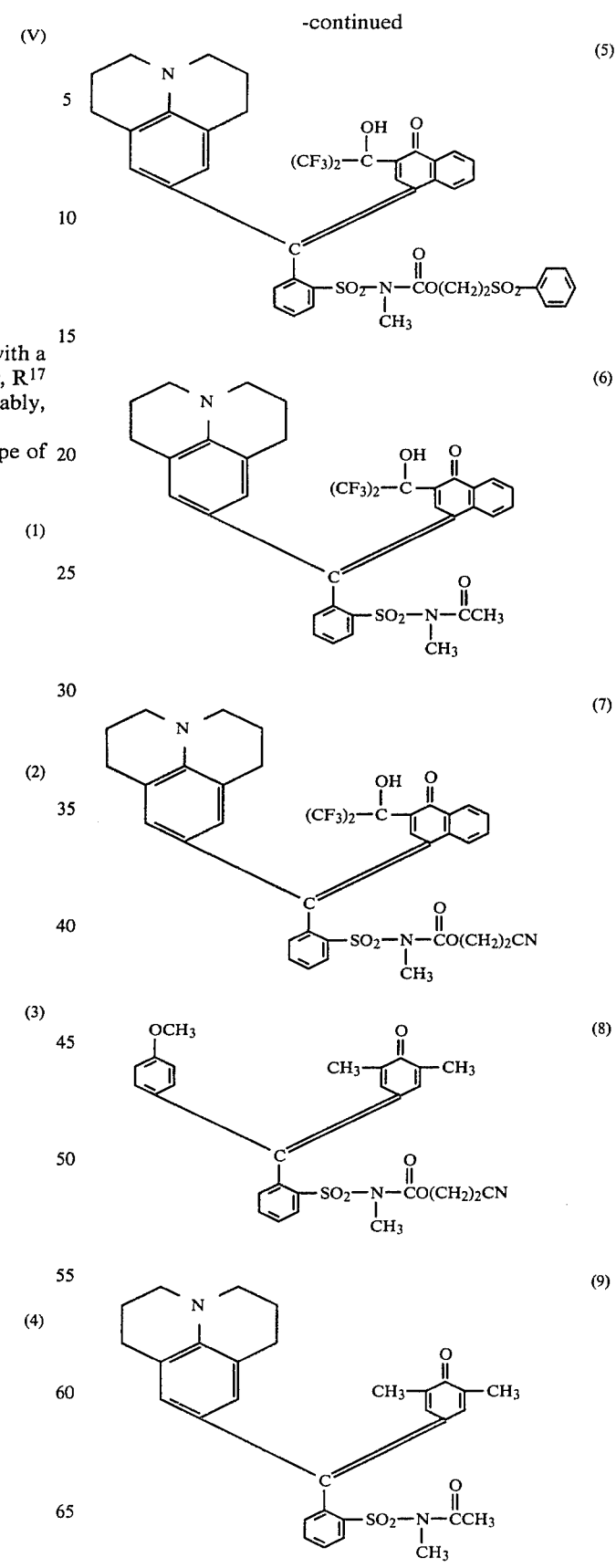

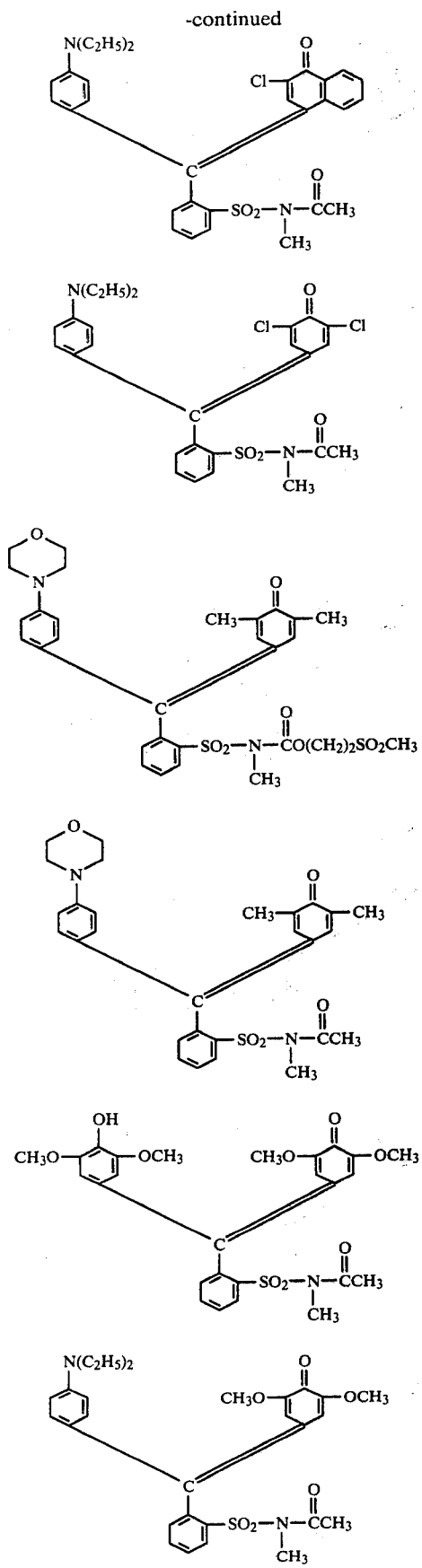

-continued
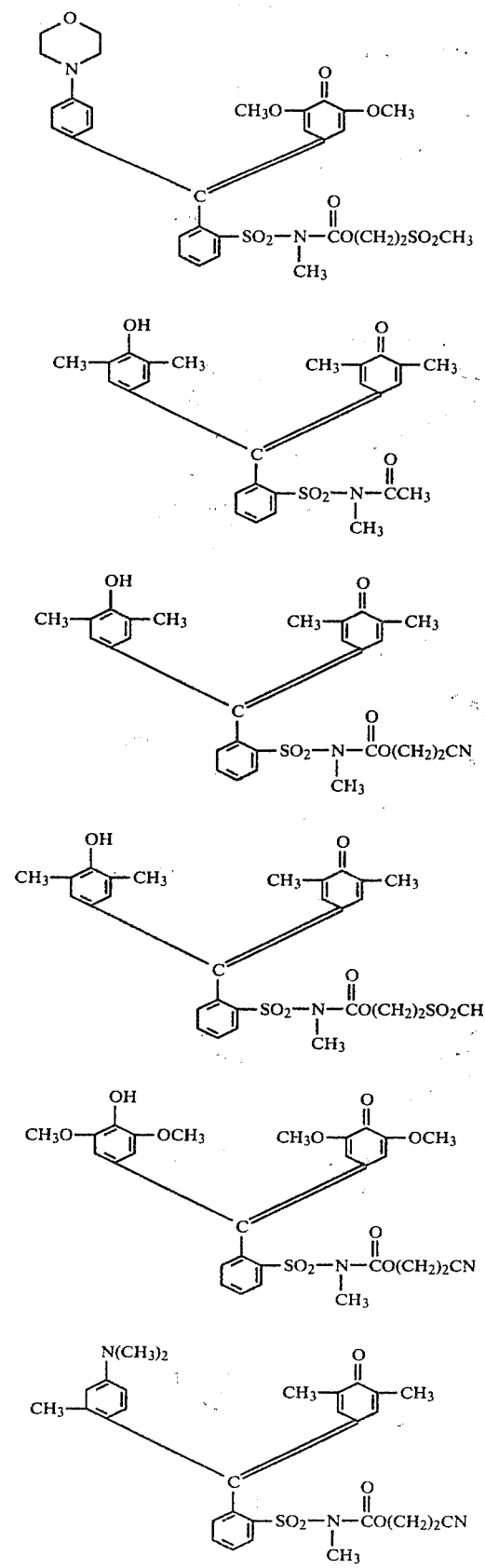
-continued
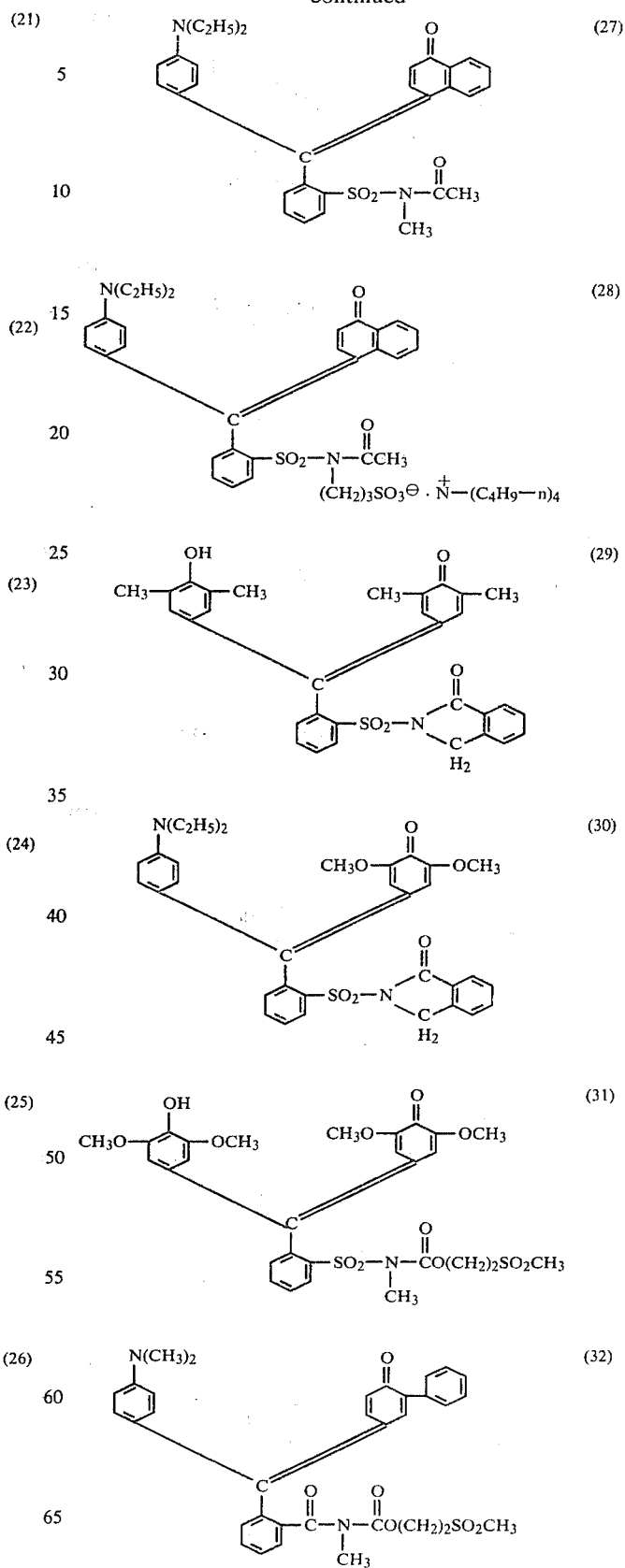

-continued
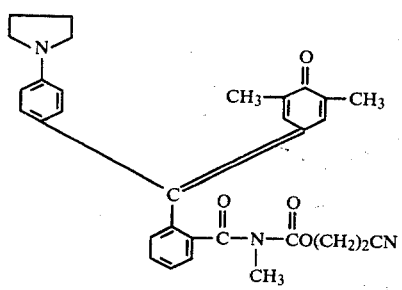 (33)
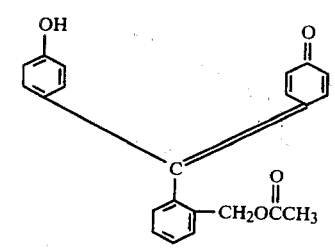 (34)
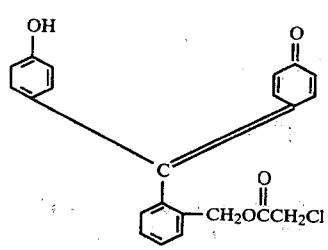 (35)
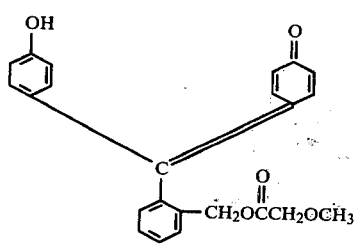 (36)
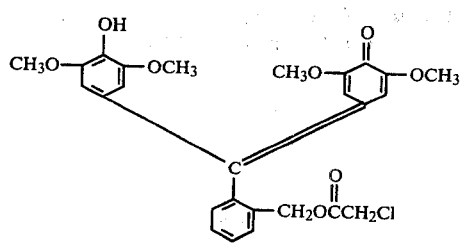 (37)
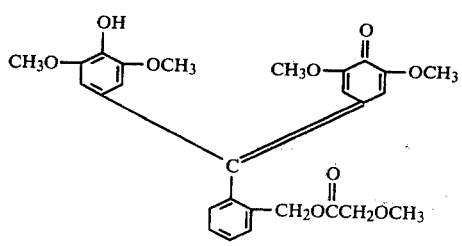 (38)
-continued
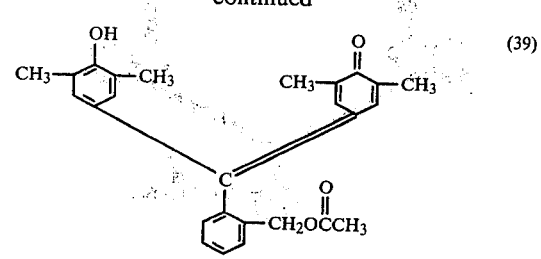 (39)
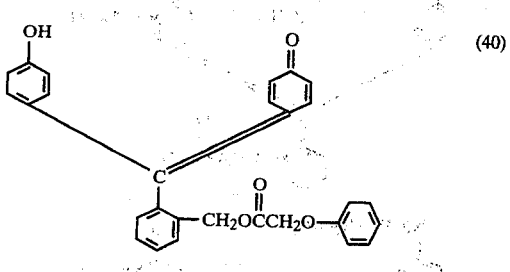 (40)
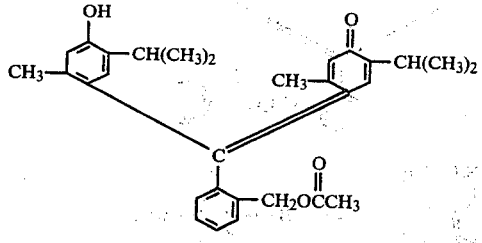 (41)
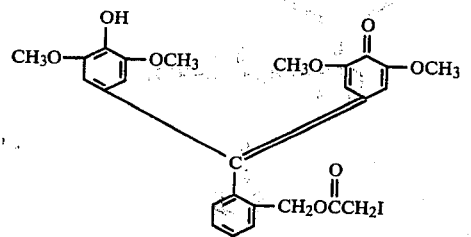 (42)
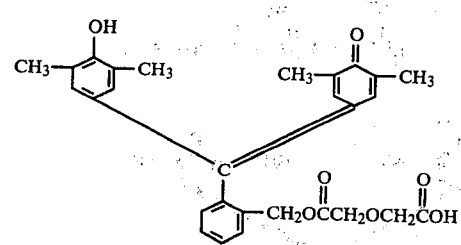 (43)
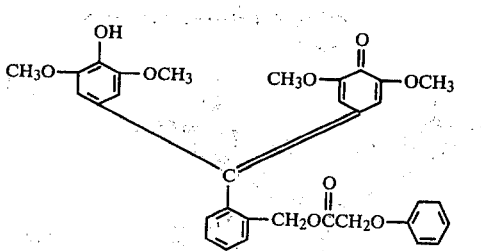 (44)

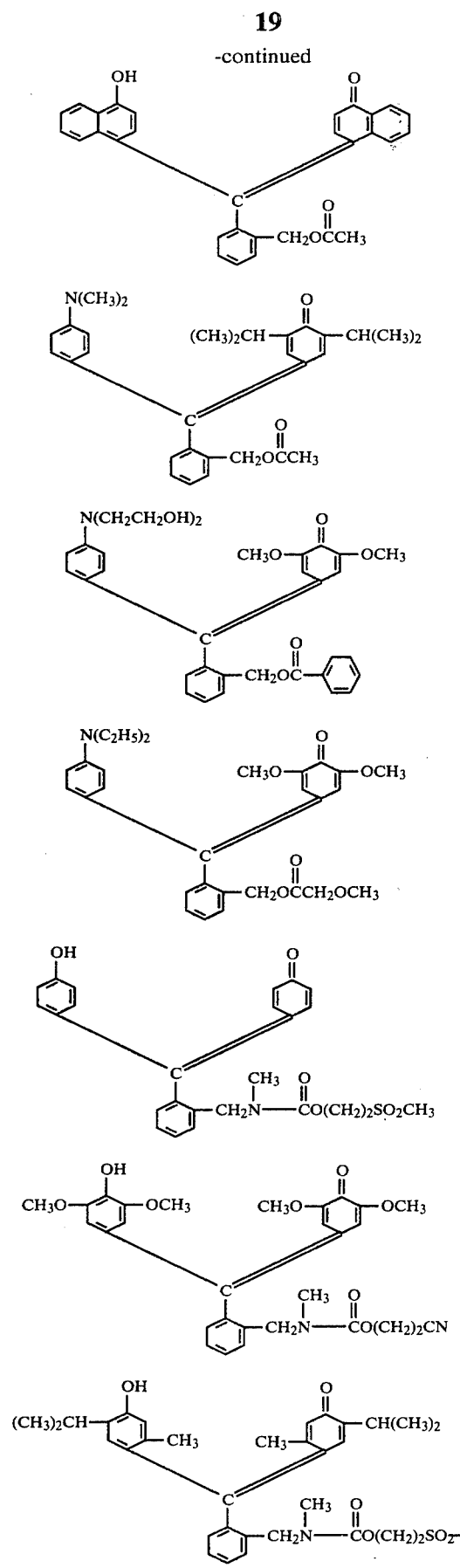

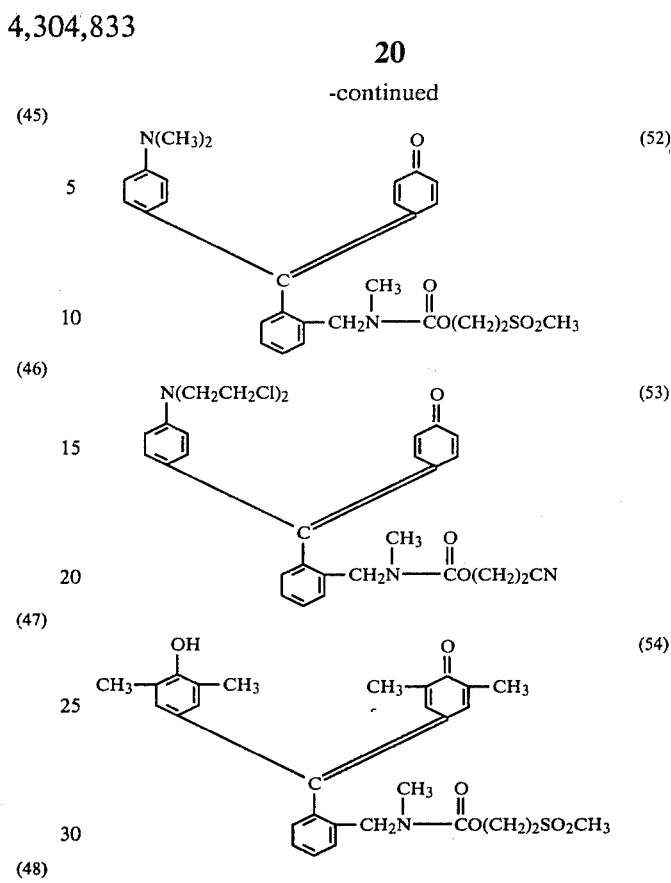

In preparing the compounds of formula II, a 3,3-disubstituted-2,3-dihydrobenz[d]isothiazole-1,1-dioxide of the formula (a)

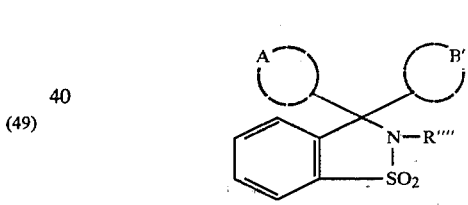

wherein A is a phenyl moiety or a naphthyl moiety; B' is a 4'-hydroxy-1'-phenyl moiety or a 4'-hydroxy-1'-naphthyl moiety; and R'''' is selected from

and R', i.e.,

wherein R'' is methyl, unsubstituted or substituted with one or two halo groups or substituted with a phenyl, alkoxy or phenoxy group, and

wherein Y is an electron-withdrawing group is reacted, when R'''' is

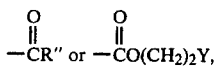

with an alkylation reagent in the presence of base in a concentration sufficient to open said 2,3-dihydrobenz[d]-isothiazole-1,1-dioxide ring without substantial cleavage of said

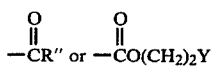

group to give the compound of the formula

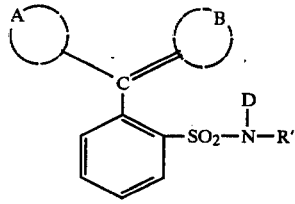

wherein B is a 4'-oxo-1'-phenylidene moiety or a 4'-oxo-1'-naphthylidene moiety; A has the same meaning given above; D is an alkyl group, unsubstituted or substituted with a solubilizing group; R' is selected from

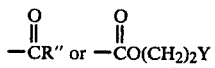

wherein R'' and Y have the same meaning given above and when R'''' is

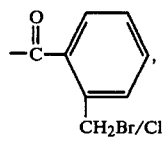

treating said (a) with base in a concentration sufficient to give the following compound without substantial cleavage of said

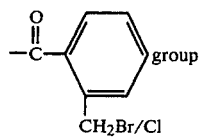

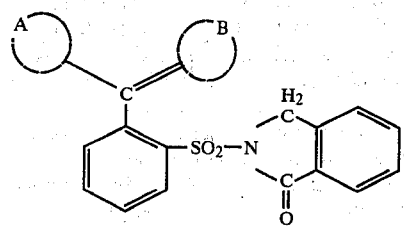

In carrying out the aforementioned method, the 2-R'-3,3-disubstituted-2,3-dihydrobenz[d]isothiazole-1,1-dioxide starting material and the selected alkylation reagent may be reacted in an inert organic solvent, for example, tetrahydrofuran, acetone, dimethyl sulfoxide or N,N-dimethylformamide, or they may be reacted in a two-phase system comprising an aqueous phase and an organic phase of, for example, a polar organic solvent such as dichloromethane preferably employing a quaternary ammonium salt as phase-transfer catalyst. The reactants may be used in equivalent amounts, or the alkylation reagent may be used in an excess of up to 10 equivalents per equivalent of isothiazole.

Because the

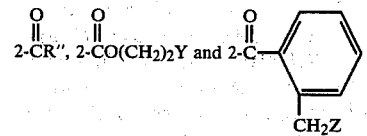

substituents of the isothiazole starting material, and especially the

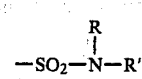

substituent of the product, undergo irreversible cleavage quite rapidly in alkaline solution especially at higher pH's, it is important that the concentration of base employed in the subject method should be sufficient for opening the isothiazole ring to permit N-substitution but should not be high enough to destroy the starting material (or the desired product) by initiating any substantial cleavage of said 2-substituents. Where the N-alkylation reaction is conducted in a two-phase system, the pH for achieving the desired results is usually about 10. Where the reaction is conducted in an inert organic solvent, about one equivalent of base is used with one equivalent of isothiazole. It will be appreciated that the specific amount may vary somewhat depending upon the starting material and that the appropriate concentration of base may be readily determined empirically.

The order of adding the reactants is not critical, but it will be apparent that where large batches are involved or the addition may be interrupted, the base should be added last to prevent loss of the starting material due to the irreversible cleavage reaction upon standing. Where the reaction product is sensitive to light, it may be desirable to conduct the reaction in the dark. Though not essential, it also may be desirable to conduct the reaction under an inert atmosphere, for example, nitrogen.

The reaction temperature may vary over a relatively wide range of about 0° to 50° C., and ordinarily, the reaction is conveniently carried out at room temperature.

When the two-phase system is employed, the quaternary ammonium salt may be any of those commonly used as phase-transfer catalysts and usually is a tetraalkylammonium bromide or chloride containing up to about 20 carbon atoms in each alkyl group, such as, n-tetrabutylammonium bromide, tetrahexylammonium chloride, ethylhexadecyldimethylammonium bromide, benzyltriethylammonium chloride, dodecyltrimethylammonium bromide and trioctylpropylammonium chloride.

The base may be a hydroxide, a hydride or carbonate, for example, potassium or sodium hydroxide, tetrabutylammonium hydroxide, sodium or potassium carbonate or sodium hydride.

The alkylation reagent employed may be a compound of the formula MD wherein M is halo and D is alkyl, unsubstituted or substituted with a solubilizing group. Because of their greater reactivity, the halo substituent is usually iodo, though it may be chloro or bromo. Other alkylation reagents also may be employed depending upon the particular N-substituted product desired. For example, 1,3-propane sultone or 1,4-butane sultone may be employed in the synthesis of N-alkylated products where the alkyl group is substituted with —SO$_3$H as the solubilizing group, and ethylene oxide may be used in the synthesis of N-alkylated products where the alkyl group is substituted with —OH as the solubilizing group. In the synthesis of N-alkylated products where —COOH is the solubilizing group, they may be prepared via an alkyl ester of the acid, e.g., I(CH$_2$)$_2$COOCH$_3$ followed by converting the ester of the N-alkylated compound to the free acid.

Besides these "external" alkylation reagents, the subject method also involves an internal alkylation. For example, in the preparation of the N-alkylated compounds where the sulfonamido moiety is

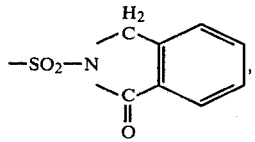

they are prepared by treating a

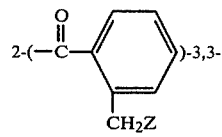

disubstituted-2,3-dihydrobenz[d]isothiazole-1,1-dioxide with base. In this instance, the —CH$_2$Z substituent ortho to the carbonyl of the

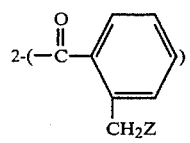

moiety functions as an "internal" alkylating agent to give the ring-closed product. It will be appreciated that other alkylation reagents known in the art may be substituted for those mentioned above where appropriate for obtaining the selected N-substituted product.

In synthesizing N-alkylated compounds from 2-R'-3,3-disubstituted-2,3-dihydrobenz[d]isothiazole-1,1-dioxides which contain two or more free hydroxy groups on the 3,3-substituents, it has been found that conducting the N-alkylation reaction in an aprotic solvent selected from dimethylsulfoxide or N,N-dimethylformamide in the presence of potassium hydroxide base gives a very substantial increase in yields.

The 2-substituted-3,3-disubstituted-2,3-dihydrobenz[d]isothiazole-1,1-dioxide starting materials wherein the 3,3-substituents may be the same or different may be synthesized by reacting one mole of a 3-(4'-OP-1'-phenyl/4'-OP-1'-naphthyl)-2,3-dihydrobenz[d]isothiazole-1,1-dioxide wherein P is a protecting group with about one to two moles of the selected carboxylic acid halide, for example, ClCOR'',

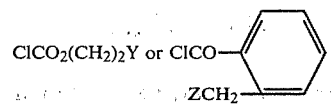

in pyridine at about 0° to 100° C. to yield the corresponding 2-carbonyl derivative followed by removing the protecting group with acid having a pH between about 0.1 to 5.0 at about 20° to 100° C. to give the corresponding 2-carbonyl-3-(4'-OH-1'-naphthyl)-3-(phenyl/naphthyl)-2,3-dihydrobenz[d]isothiazole-1,1-dioxide.

Where the 3-(phenyl/naphthyl) substituent ultimately forming the A moiety of the starting material possesses a protected hydroxy group, e.g., —OP or —N(CH$_2$CH$_2$OP)$_2$, it is unnecessary to remove the protecting group, but it may be deblocked to regenerate the free —OH or —N(CH$_2$CH$_2$OH)$_2$, if desired. The protecting group employed may be the same or different from the protecting group used for the 3-(4'-OP-phenyl/4'-OP-naphthyl) substituent. For example, different protecting groups may be selected that will permit deblocking of the 3-(4'-OP-1'-phenyl/4'-OP-1'-naphthyl) substituent, such as, a trimethylsilyl protecting group while leaving the protecting group on the hydroxy of the 3-(phenyl/naphthyl) substituent, such as, a methoxymethyl protecting group. The above method of N-acylating a 3,3-disubstituted-2,3-dihydrobenz[d]isothiazole-1,1-dioxide followed by removing the protecting groups forms the subject matter of copending U.S. patent application Ser. No. 836,010 of Stanley M. Bloom, Alan L. Borror and James W. Foley filed Sept. 23, 1977.

The acid used for the deblocking step may be an inorganic acid, such as, hydrochloric acid or sulfuric acid in a protic solvent, e.g., water, alkanol, such as, methanol or ethanol, or aqueous alkanol, or the acid may be an organic acid, such as, acetic acid or trifluoroacetic acid alone or in a protic solvent.

The carboxylic acid halide reactant may be prepared in a conventional manner, for example, by reacting the selected carboxylic acid, such as R''COOH, with phosphorus trichloride, phosphorus pentachloride or thionyl chloride to give the corresponding R''COCl, or by reacting the selected HO(CH$_2$)$_2$Y with phosgene to give the corresponding ClCO$_2$(CH$_2$)$_2$Y.

To prepare the 3-(4'-OP-1'-phenyl/4'-OP-1'-naphthyl)-3-(phenyl/naphthyl)-2,3-dihydrobenz[d]isothiazole-1,1-dioxides, a 3-(4'-OP-1'-phenyl/4'-OP-1'- naphthyl)benz[d]isothiazole-1,1-dioxide is reacted with at least one molar equivalent of phenyllithium or a naphthyllithium reagent in an inert organic solvent, such as benzene, diethyl ether, dioxane, hexane, toluene, petroleum ether or tetrahydrofuran. The reaction temperature may vary over a relatively wide range from about −80° to 50° C. as may be readily determined for the particular reactants. For achieving maximum yields, the reaction generally is conducted at a temperature below about 0° C. and preferably between about −65° C. and −25° C. This method of preparing the 3-(4'-OP-1'-phenyl/4'-OP-1'-naphthyl)-3-(phenyl/naphthyl)-2,3-dihydrobenz[d]isothiazole-1,1-dioxides forms the subject matter of copending U.S. patent application Ser. No. 836,008 of Alan L. Borror, Louis Cincotta, James W. Foley and Marcis M. Kampe filed Sept. 23, 1977, now abandoned.

The 3-(4'-OP-1'-phenyl/4'-OP-1'-naphthyl)-benz[d]isothiazole-1,1-dioxides are prepared by blocking the functional hydroxy group and any substituent group(s), as may be appropriate, of the selected 4-halophenol or 4-halo-1-naphthol and converting the blocked phenol or 1-naphthol to the corresponding Grignard or lithium reagent which is then reacted with a saccharin reagent. The 4-halo substituent may be chloro, bromo or iodo when the lithium reagent is prepared by reacting the blocked phenol or blocked 1-naphthol with lithium metal and is either bromo or iodo when the lithium reagent is made via a lithium exchange reaction using, for example, n-butyllithium. In preparing the Grignard reagent by reacting the blocked phenol or 1-naphthol with magnesium metal, the 4-halo substituent may be chloro, bromo or iodo. The Grignard or lithium reagent thus prepared is then reacted with saccharin, the N-lithium salt of saccharin or saccharin pseudo-chloride to yield the corresponding 3-(4'-OP-1'-phenyl/4'-OP-1'-naphthyl)benz[d]isothiazole-1,1-dioxide. Generally, the Grignard reagent is reacted with the pseudo-chloride, and the lithium reagent is reacted with the N-lithium salt.

The groups selected for protecting the functional phenolic or naphtholic hydroxy group and other hydroxy groups that may be present in the phenol or 1-naphthol should be stable to and compatible with organolithium and Grignard reagents and should protect the hydroxy group(s) against reaction under the conditions encountered in the synthesis of the aforesaid compounds and in the subsequent N-acylation step. In addition, the protecting group selected should be capable of being easily removed under weakly acid conditions to regenerate the hydroxy group(s) without the removal of or adversely affecting the N-carbonyl moiety or other substituents that may be present. Alkyl groups, such as methyl and ethyl, may be employed in those instances where they can be removed without removal of the N-carbonyl moiety. Because they can be readily removed without disturbing the N-substituent or other substituents, the phenol or 1-naphthol preferably is protected with methoxymethyl, 2'-tetrahydropyranyl or dimethyl-t-butylsilyl. The blocked phenols and 1-naphthols employing these protecting groups may be prepared by methoxymethylation as described, for example, by Kaoru Fuji et al, *Synthesis*, 4, pp. 276–277 (1975), by tetrahydropyranylation as described, for example by William E. Parham et al, *J. Amer. Chem Soc.*, 70, pp. 4187–4189 (1948) or by silylating, e.g., with dimethyl-t-butylsilyl chloride in the presence of imidazole as described by E. J. Corey et al, *J. Amer. Chem. Soc.*, 94, pp. 6190–6191 (1972).

As noted above, hydroxy groups in addition to the functional —OH of the phenol and 1-naphthol may be blocked simultaneously, with the functional hydroxy group, for example, by tetrahydropyranylation or methoxymethylation. Groups other than hydroxy that should be protected may be blocked prior to or subsequent to the blocking of the functional —OH. For example, carboxy group(s) may be protected by reacting a carboxy-substituted 4-halophenol (or 4-halo-1-naphthol) with 2-amino-2-dimethyl-1-propanol followed by blocking of the functional —OH. Sulfonamido (—N-H—$SO_2$—$R_0$) and sulfamoyl (—$SO_2$—NH—$R_0$) substituents may be protected by a t-butyl group.

The phenyl- or naphthyllithium reagent reacted with the 3-(4'-OP-phenyl/4'-OP-naphthyl)benz[d]isothiazole-1,1-dioxide and ultimately forming the A moiety of the starting materials may be substituted or unsubstituted and may be prepared from the corresponding halo-substituted compound. For example, N,N-dimethylaniline may be halogenated to give the 4-halo compound which, in turn, is reacted with lithium metal or n-butyllithium to yield the 4-lithium compound. Halogenation may be carried out in a conventional manner using either chlorine or bromine, with or without a catalyst, or using N-bromosuccinimide or iodinemonochloride. When lithium metal is employed in the preparation of the 4-lithium compound, the halo substituent may be chloro, bromo or iodo and is either bromo or iodo when a lithium exchange reaction is employed. If substituents, such as, hydroxy, are present, they should be blocked with the appropriate protecting group to render them compatible with organometallic reagents prior to conversion of the 4-lithium compound.

Where the 3,3-substituents of the 2-substituted-3,3-disubstituted-2,3-dihydrobenz[d]isothiazole-1,1-dioxide starting materials are different, they also may be prepared by reacting a 3-(phenyl/naphthyl)benz[d]isothiazole-1,1-dioxide, i.e., other than a 3-(phenyl/naphthyl)benz[d]isothiazole-1,1-dioxide containing a 4'-OP-substituent with at least an equivalent amount of a 4-OP-phenyllithium/4-OP-naphthyllithium reagent in an inert organic solvent preferably below about 0° C. to give the corresponding 3,3-disubstituted-2,3-dihydrobenz[d]isothiazole-1,1-dioxide followed by N-acylation and deblocking as described above. The 3-(phenyl/naphthyl)benz[d]isothiazole-1,1-dioxide may be prepared by blocking any substituent groups as may be appropriate of a halo-benzene or halo-naphthalene compound and converting the halo compound to the corresponding Grignard or lithium reagent which is then reacted with a saccharin reagent. The above method of synthesizing 3-(phenyl/naphthyl)-3-(4'-OP-1'-phenyl/4'-OP-1'-naphthyl)-2,3-dihydrobenz[d]isothiazole-1,1-dioxides forms the subject matter of copending U.S. patent application Ser. No. 838,025 of Alan L. Borror, James W. Foley, Marcis M. Kampe and John W. Lee, Jr. filed Sept. 23, 1977, now U.S. Pat. No. 4,178,447.

Where the 3,3-substituents of the 2-substituted-3,3-disubstituted-2,3-dihydrobenz[d]isothiazole-1,1-dioxide starting materials are the same, they also may be synthesized by reacting at least two equivalents of a 4-OP-phenyllithium/4-OP-naphthyllithium reagent with one equivalent of saccharin pseudo-chloride in an inert organic solvent preferably below 0° C. to give the corresponding 3,3-bis-(4'-OP-1'-phenyl/4'OP-1'-naphthyl)-

2,3-dihydrobenz[d]isothiazole-1,1-dioxide. This bis compound is then reacted with an acid chloride and deblocked in the same manner discussed previously. The above synthesis of 3,3-bis-(4'-OP-1'-phenyl/4'-OP-1'-naphthyl)-2,3-dihydrobenz[d]isothiazole-1,1-dioxides forms the subject matter of copending U.S. patent application Ser. No. 836,004 of Stanley M. Bloom, Alan L. Borror and James W. Foley filed Sept. 23, 1977, now U.S. Pat. No. 4,191,689.

A preferred method of synthesizing 2-substituted-3,3-disubstituted-2,3-dihydrobenz[d]isothiazole-1,1-dioxide starting materials wherein one of the 3,3-substituents is a 4'-OH-1'-phenyl/4'-OH-1'-naphthyl substituent possessing a perhalomethylcarbinol moiety comprises reacting a 3-substituted-benz[d]isothiazole-1,1-dioxide with at least two equivalents of a 4-OLi-phenyllithium/4-OLi-naphthyllithium reagent substituted with a

moiety in an inert organic solvent at −80° to 50° C. to give the corresponding reaction product followed by hydrolyzing with acid at pH 6 to give the 3-(4'-OH-1'-phenyl/4'-OH-1'-naphthyl)-3-(substituted)-2,3-dihydrobenz[d]isothiazole-1,1-dioxide wherein said 3-(4'-OH-1'-phenyl/4'-OH-1'-naphthyl) substituent possesses a

moiety. This method of preparing the aforementioned perhalomethylcarbinol-substituted compounds from the "lithiated" perhalomethylcarbinol-substituted phenol (or 1-naphthol) forms the subject matter of copending U.S. patent application Ser. No. 956,908 of Louis Cincotta and James W. Foley filed Nov. 2, 1978.

The perhalomethylcarbinol-substituted compounds as prepared above may be reacted with 1 to 6 equivalents of an acid halide, $ClCO_2(CH_2)Y$, in pyridine at 0° to 100° C. in the presence of acidic alumina or a zeolite molecular sieve to give the corresponding 2-(-$CO_2(CH_2)_2Y$)-3-(4'-OH-1'-phenyl/4'-OH-1'-naphthyl)-3-(substituted-2,3-dihydrobenz[d]isothiazole-1,1-dioxide wherein said 3-(4'-OH-1'-phenyl/4'-OH-1'-naphthyl) substituent possesses a

moiety. This method of preparing said 2-(-$CO_2(CH_2)_2Y$) compounds forms the subject matter of copending U.S. patent application Ser. No. 957,162 of Louis Cincotta and James W. Foley filed Nov. 2, 1978, now U.S. Pat. No. 4,210,752.

The perhalomethylcarbinol-substituted compounds as prepared from the "lithiated" perhalomethylcarbinol-substituted phenol (or 1-naphthol) also may be reacted with 3 to 6 equivalents of an acid halide, ClCOR'', in pyridine at 0° to 100° C. to give the corresponding triacylated compound 2-(-COR'')-3-(4'-O-COR''-1'-phenyl/4'-O-COR''-1'-naphthyl)-2,3-dihydrobenz[d]isothiazole-1,1-dioxide wherein said (4'-O-COR''-1'-phenyl/naphthyl) substituent possesses a

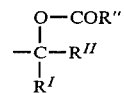

moiety followed by selectively removing the acyl groups only from the phenolic (or napholic) hydroxy group and the carbinol hydroxy group by treating with 0.01 to 2.0 N base between 0° and 40° C. The base may be, for example, methylamine but preferably is an ionic hydroxide base, such as, tetrabutylammonium hydroxide, sodium hydroxide or potassium hydroxide in a solvent, such as, water and/or a lower alkanol, e.g., methanol or ethanol. This method of synthesizing said 2-(-COR'') compounds forms the subject matter of copending U.S. patent application Ser. No. 956,907 of Louis Cincotta and James W. Foley filed Nov. 2, 1978.

In addition to the aforementioned methods of preparing starting materials useful in the above method, particular 2-substituted-3,3-disubstituted-2,3-dihydrobenz[d]isothiazole-1,1-dioxides useful as starting materials are disclosed and claimed in copending U.S. patent applications Ser. Nos. 835,998 and 836,021 of Stanley M. Bloom, Alan L. Borror and James W. Foley filed Sept. 23, 1977, now U.S. Pat. Nos. 4,178,446 and 4,204,061, respectively; in copending U.S. patent application Ser. No. 836,067 of Alan L. Borror, Louis Cincotta, Ernest W. Ellis and James W. Foley filed Sept. 23, 1977, now U.S. Pat. No. 4,195,180; in copending U.S. patent application Ser. No. 836,005 of Stanley M. Bloom, Alan L. Borror and James W. Foley filed Sept. 23, 1977, now U.S. Pat. No. 4,231,929; and in copending U.S. patent application Ser. No. 957,163 of James W. Foley filed Nov. 2, 1978, which patents and applications for convenience are incorporated herein.

Compounds of formula (II) where the R group of said

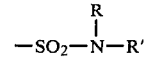

moiety is phenyl, unsubstituted or substituted with a solubilizing group, may be prepared from a phenol/1-naphthol sulfonephthalein wherein the functional —OH and other —OH groups that may be present are protected with a blocking group, such as, 2'-tetrahydropyranyl. For example, after "blocking" the —OH groups, the protected phenol/1-naphthol sulfonephthalein may be reacted with thionyl chloride or phosphorus pentachloride to give the corresponding sulfonyl chloride which is reacted with an alkyl or arylamine, $RNH_2$ wherein R has the same meaning given above, to give the corresponding sulfonamide. The sulfonamide is then reacted with the appropriate acylating agent, for example, ClR' wherein R' has the same meaning given above to give the leuco dye precursor, from which the protecting groups are removed, before it is oxidized, e.g., with o-chloranil to yield the dye product.

This reaction sequence is illustrated below using phenolsulfonephthalein blocked with a protecting group.

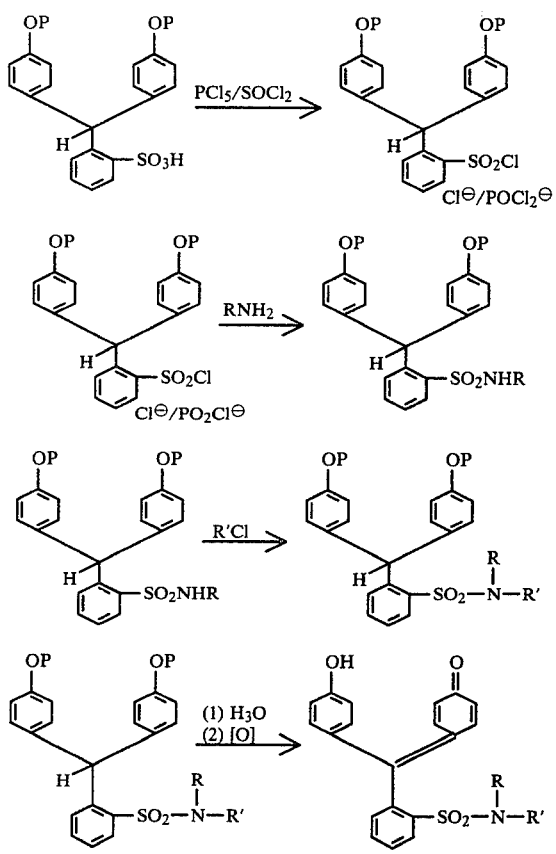

wherein R and R' in the foregoing sequence have the same meaning given above.

The following examples are given to further illustrate the preparation of the compounds of formula (II).

EXAMPLE 1

Preparation of the compound having the formula:

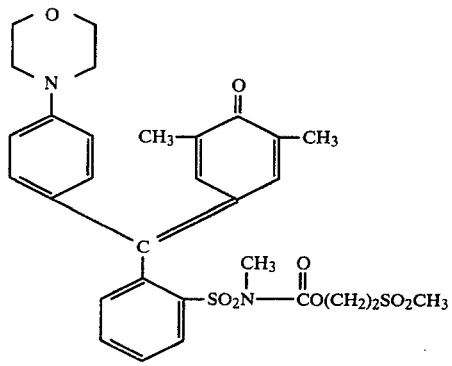

To 50 ml of water as added 0.23 g of potassium carbonate ($K_2CO_3$) and 1.0 g of 2-(-$CO_2CH_2CH_2SO_2CH_3$)-3-(3',5'-dimethyl-4'-hydroxyl-1'-phenyl)-3-(4''-N-morpholinyl-1''-phenyl)-2,3-dihydrobenz[d]isothiazole-1,1-dioxide. To this red solution was added 50 ml of dichloromethane containing 2 ml of methyl iodide, and a two-phase system resulted. A 4% tetrabutylammonium chloride solution (21 mg) was added, and the mixture was stirred well for 48 hours, at which time the water layer was colorless and the dichloromethane layer was red. The dichloromethane was separated and washed with dilute $K_2CO_3$ solution, then with water and dried over sodium sulfate. The dichloromethane was evaporated to yield 1.02 g of red solid. The solid was recrystallized from 30 ml isopropanol to yield 0.75 g of red crystals. TLC using 9.5 ml ether/0.5 ml methanol on silica gel showed a trace of benz[d]isothiazole-1,1-dioxide starting material still present. The remaining red crystals (~0.65 g) were purified via medium pressure liquid chromatography (silica gel/ethyl acetate) to yield 0.5 g of the title compound.

EXAMPLE 2

Preparation of the compound having the formula:

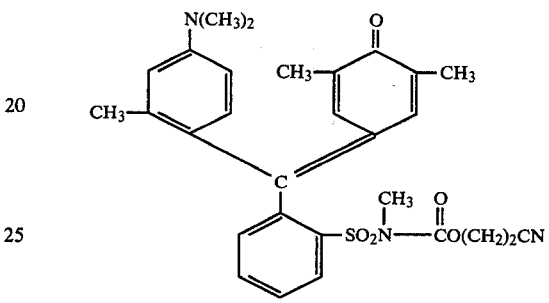

To 50 ml of water was added 0.16 g $K_2CO_3$ and 0.6 g of 2-(-$CO_2CH_2CH_2CN$)-3-(3',5'-dimethyl-4'-hydroxy-1'-phenyl)-3-(4''-N,N-dimethylamino-2''-methyl-1''-phenyl)-2,3-dihydrobenz[d]isothiazole-1,1-dioxide.

Then 50 ml of dichloromethane containing 3 ml methyl iodide was added, and a twophase system resulted with the water layer being an intense red. To this well-stirred mixture was added 4% tetrabutylammonium chloride, and the reaction mixture was stirred for 16 hours. After stirring, the water layer became a light yellow and the dichloromethane layer was red. The dichloromethane layer was separated, washed with water, dried over sodium sulfate and evaporated to leave a red solid. TLC using 9.5 ml chloroform/0.5 ml methanol on silica gel showed three spots. The remaining red solid was placed on a column packed with silica gel, and elution with chloroform/methanol (9.5:0.5) solvent system gave the title compound.

EXAMPLE 3

Preparation of the compound having the formula:

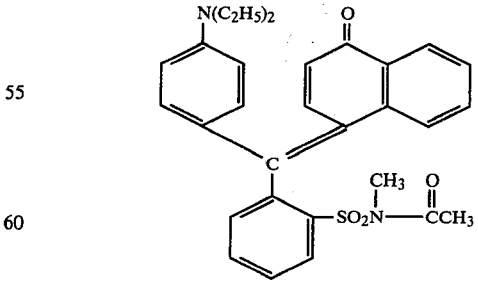

To 25 ml of water containing 0.027 g of $K_2CO_3$ was added 0.100 g of 2-(-$COCH_3$)-3-(4'-hydroxy-1'-naphthyl)-3-(4''-N,N-diethylamino-1''-phenyl)-2,3-dihydrobenz[d]isothiazole-1,1-dixode. A blue solution resulted. 25 ml of dichloromethane was added along with 2 ml methyl iodide and a spatula tip of tetrabutylammonium chloride. With stirring, an immediate color change to magenta occurred and the water layer became colorless. (The dichloromethane layer contained the dye.) The reaction mixture was stirred overnight. TLC on silica gel with 7/3 ether/petroleum ether showed the reaction was complete. The dichloromethane layer was separated, dried and evaporated to dryness giving 0.100 g of the title compound as a red solid.

EXAMPLE 4 preparation of the compound having the formula:

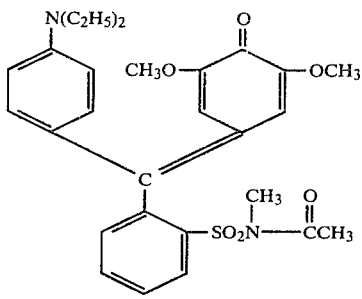

To 20 ml water at room temperature as added 0.0205 g $K_2CO_3$, 0.076 g of 2-(-COCH$_3$)-3-(3',5'-dimethoxy-4'-hydroxy-1'-phenyl)-3-(4''-N,N-diethylamino-1''-phenyl)-2,3-dihydrobenz[d]isothiazole-1,1-dioxide, 20 ml dichloromethane, 2 ml methyl iodide and a spatula tip of tetrabutylammonium hydroxide. The blue-colored water layer immediately became colorless and the dichloromethane layer became magenta colored. The reaction mixture was stirred overnight and the dichloromethane layer was separated, dried and evaporated to leave the title compound as a magenta solid. TLC on silica gel using 9.7 ml dichloromethane/0.3 ml methanol showed the product was homogeneous.

EXAMPLE 5

Preparation of the compound having the formula:

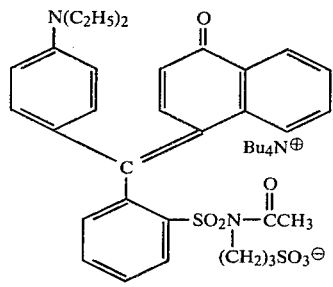

To a solution of 0.10 g of 2-(-COCH$_3$)-3-(4''-hydroxy-1'-naphthyl)-3-(4''-N,N-diethylamino-1''-phenyl)-2,3-dihydrobenz-[d]isothiazole-1,1-dioxide dissolved in methanol was added 0.2 g of a 25% methanol solution of tetrabutylammonium hydroxide. The resulting solution was evaporated to dryness, the residue dissolved in 20 ml of tetrahydrofuran and 0.5 g of 1,3-propane sultone was added. The reaction mixture was refluxed overnight and the tetrahydrofuran removed under reduced pressure. The residue was dissolved in 2 ml chloroform, and employing preparative TLC techniques using silica gel and 9/1 ether/methanol, the product was isolated. The title compound was obtained as a purple hygroscopic solid.

EXAMPLE 6

Preparation of the compound having the formula:

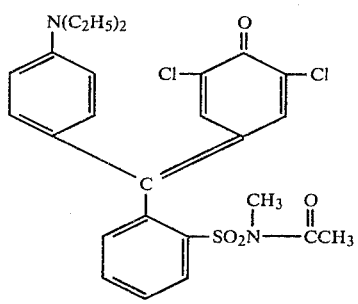

To 20 ml of water was added 0.266 g of 2-(-COCH$_3$)-3-(3',5'-dichloro-4'-hydroxy-1'-phenyl)-3-(4''-N,N-diethylamino-1''-phenyl)-2,3-dihydrobenz[d]isothiazole-1,1-dioxide along with 0.071 g $K_2CO_3$, 20 ml dichloromethane, 2 ml methyl iodide and a spatula tip of tetrabutylammonium chloride. The blue water solution became colorless and the dichloromethane layer was purple. The reaction mixture was stirred well overnight, the dichloromethane layer separated, dried over sodium sulfate and evaporated to leave a purple residue which crystallized on standing. The crystals were washed with ethanol and filtered. The ethanol filtrate was evaporated to give the title compound.

EXAMPLE 7

Preparation of the compound having the formula:

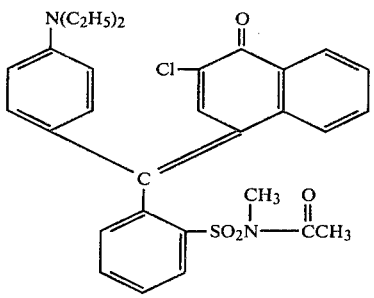

0.158 g of 2-(-COCH$_3$)-3-(3'-chloro-4'-hydroxy-1'-naphthyl)-3-(4''-N,N-diethylamino-1''-phenyl)-2,3-dihydrobenz[d]-isothiazole-1,1-dioxide, 20 ml water, 0.041 g $K_2CO_3$, 20 ml dichloromethane and 2 ml methyl iodide were stirred together. To this blue mixture was added a spatula tip of tetrabutylammonium chloride. The blue water solution immediately became colorless and the dichloromethane layer became purple. This reaction mixture was stirred overnight. TLC on silica gel with ether showed completion of the reaction. The dichloromethane layer was separated, dried over sodium sulfate and evaporated to leave 0.162 g of the title compound as a dark purple solid.

EXAMPLE 8 preparation of the compound having the formula:

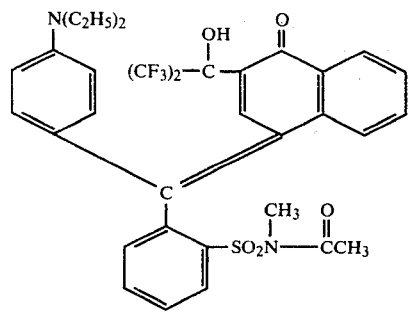

0.584 g of 2-(-COCH₃)-3-[(3'-α-hydroxy-α-trifluoromethyl-β,β,β-trifluoroethyl)-4'-hydroxy-1'-naphthyl]-3-(4"-diethylamino-1"-phenyl)-2,3-dihydrobenz[d]isothiazole-1,1-dioxide, 0.12 g K₂CO₃, 25 ml water, 25 ml dichloromethane, 2 ml methyl iodide and one spatula tip of tetrabutylammonium chloride were stirred together. The blue water solution immediately turned colorless and the dichloromethane was blue. This reaction mixture was stirred for 16 hours. TLC on silica gel with ether showed that only a small amount of the desired reaction had occurred. One more spatula tip of tetrabutylammonium chloride was added along with more K₂CO₃. After stirring the reaction mixture overnight, TCL showed about 50% conversion. The title compound was purified using preparative TLC and obtained as a blue solid.

EXAMPLE 9

Preparation of the compound having the formula:

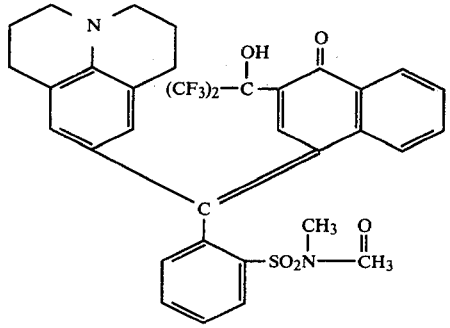

0.30 g of 2-(-COCH₃)-3-[3'-α-hydroxy-α-trifluoromethyl-β,β,β-trifluoroethyl)-4'-hydroxy-1'-naphthyl]-3-(9'-julolidinyl)-2,3-dihydrobenz[d]isothiazole-1,1-dioxide was placed in a flask with 25 ml dichloromethane, 25 ml water, 0.07 g (10% excess) K₂CO₃, 2 ml of methyl iodide and a spatula tip of tetrabutylammonium chloride. The dichloromethane layer was colored cyan. The reaction mixture was stirred rapidly overnight. The dichloromethane layer was separated, dried and evaporated. Using preparative TLC on a sample of the residue, the appropriate band was separated, washed with acetone and the acetone evaporated to yield the title compound as a cyan solid.

EXAMPLE 10

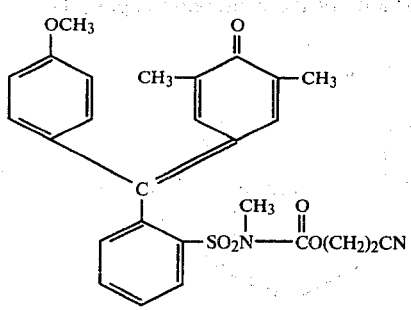

0.9 g of 2-)-CO₂CH₂CH₂CN)-3-(3',5'-dimethyl-4'-hydroxy-1'-phenyl)-3-(4"-methoxy-1"-phenyl)-2,3-dihydrobenz[d]-isothiazole-1,1-dioxide was placed in a flash with 20 ml water, 20 ml dichloromethane, 0.252 g K₂CO₃, 2 ml methyl iodide and a spatula tip of tetrabutylammonium chloride. This reaction mixture was stirred well overnight. TLC on silica gel with 8/2 ether/chloroform showed that the reaction was almost complete. The chloroform layer was then separated, dried over sodium sulfate and evaporated to leave a yellow solid. The yellow solid was dissolved in chloroform, placed on a column packed with silica gel with 8/2 ether/chloroform and eluted with chloroform. The appropriate fraction was collected and evaporated to yield the title compound as a yellow solid.

EXAMPLE 11

Preparation of the compound having the formula:

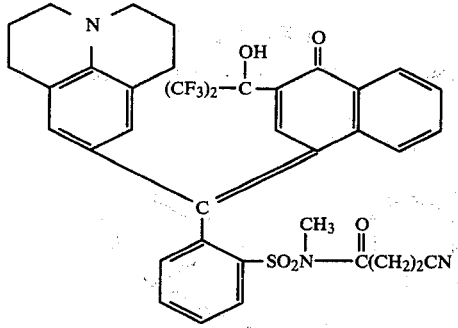

0.068 g of 2-(-CO₂CH₂CH₂CN)-3-[(3'-α-hydroxy-α-trifluoromethyl-β,β,β-trifluoroethyl)-4'-hydroxy-1'-naphthyl]-3-(9'-julolidinyl)-2,3-dihydrobenz[d]isothiazole-1,1-dioxide was dissolved in 20 ml dichloromethane and to this solution was added 0.013 g K₂CO₃, 20 ml water, 1 ml methyl iodide and a spatula tip of tetrabutylammonium chloride. The cyan color of the water layer transferred to the dichloromethane layer. This reaction mixture was stirred for 4 hours at room temperature. TLC on silica gel with ether showed the reaction was complete. The dichloromethane layer was separated, washed with water and dried over sodium sulfate to yield a blue solid on drying. Using preparative TLC on silica gel and eluting with ether, the cyan band was isolated and treated with acetone. The acetone was filtered and removed to yield the title compound as a cyan solid.

EXAMPLE 12

Preparation of the compound having the formula:

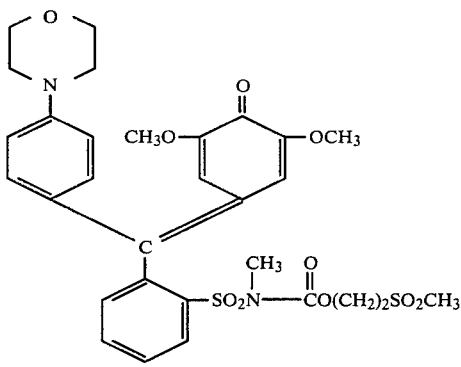

To 160 mg $K_2CO_3$ dissolved in 50 ml water was added 731 mg of 2-(-$CO_2CH_2CH_2SO_2CH_3$)-3-(3',5'-dimethoxy-4'-hydroxy-1'-phenyl)-3-(4''-N-morpholinyl-1''-phenyl)-2,3-dihydrobenz[d]isothiazole-1,1-dioxide to give an intense red solution. To this solution was added 50 ml dichloromethane and 3 ml methyl iodide followed by a few milligrams of tetrabutylammonium chloride. This reaction mixture was stirred rapidly under nitrogen for 16 hours. The aqueous phase became substantially colorless and the dichloromethane layer was colored. The dichloromethane was separated, washed with two 100 ml portions of water, dried over sodium sulfate and filtered. The filtrate was evaporated to dryness and a sample of the residue was recyrstallized from 45 ml of boiling isopropanol and dried at 50°–55° C. in vacuo overnight to give 460 mg of the title compound.

EXAMPLE 13

Preparation of the compound having the formula:

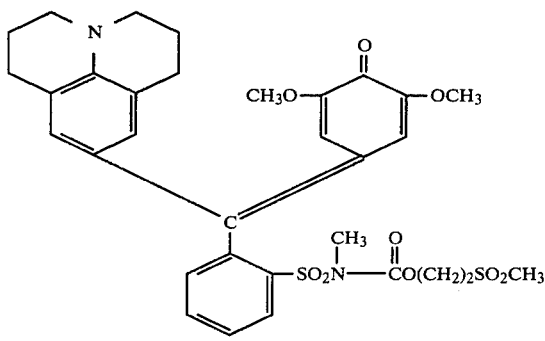

To 35 ml of dry tetrahydrofuran was added 2.82 g of 2-(-$CO_2CH_2CH_2SO_2CH_3$)-3-(3',5'-dimethoxy-4'-hydroxy-1'-phenyl)-3-(9'-julolidinyl)-2,3-dihydrobenz[d]isothiazole-1,1-dioxide followed by 304.3 mg of 85% potassium hydroxide (powdered). After stirring for 15 minutes, 5.6 ml of methyl iodide was added all at once, and then the reaction mixture was stirred at room temperature for 5 hours and poured into 350 ml water which contained 10 drops of 6 N HCl. The mixture was extracted with three 100 ml portions of chloroform and the combined chloroform extracts were washed with three 100 ml portions of water, saturated sodium chloride solution and dried over sodium sulfate overnight. The solvent was removed leaving a purple residue which was recrystallized from approximately 25 ml ethanol to give 1.8 g of crude product containing some starting material. The crude product was passed through a medium pressure liquid chromatography column eluted with 40/1 chloroform/methanol. The residue from the column was recrystallized from ethanol to yield 1.4 g of the title compound.

EXAMPLE 14

Preparation of the compound having the formula:

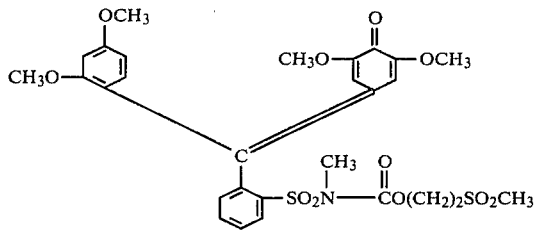

To 15 ml of dichloromethane was added 1.0 g of 2-(-$CO_2CH_2CH_2SO_2CH_3$)-3-(3',5'-dimethoxy-4'-hydroxy-1'-phenyl)-3-(2'',4''-dimethoxy-1''-phenyl)-2,3-dihydrobenz[d]isothiazole-1,1-dioxide. A solution of 115 mg $K_2CO_3$ in 15 ml water was then added followed by 937 mg of methyl iodide and 278 mg tetrabutylammonium chloride. The reaction mixture was stirred at room temperature for about 24 hours and transferred to a separatory funnel. The dichloromethane layer was separated, washed with water (3×25 ml), saturated sodium chloride solution (1×25 ml) and then dried over sodium sulfate. The solvent was removed under reduced pressure leaving 1.2 g of a red-orange oil. The oil was added to about 50 ml isopropanol, heated to solution and allowed to cool to room temperature. A yellow-orange solid precipitated. TLC showed small amounts of impurities. The remaining solid (780 mg) was redissolved in isopropanol with heating. The solution was allowed to cool to room temperature, and the yellow crystalline precipitate recovered to yield 600 mg of the title compound (melting range 145°–6° C.).

EXAMPLE 15

Preparation of the compound having the formula:

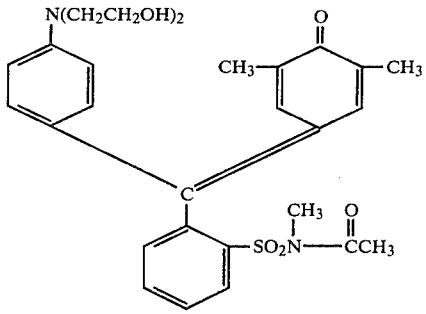

To 0.500 g of 2-(-$COCH_3$)-3-(3',5'-dimethyl-4'-hydroxy-1'-phenyl)-3-[4''-N,N-di($\beta$-hydroxyethyl)amino-1''-phenyl]-2,3-dihydrobenz[d]isothiazole-1,1-dioxide dissolved in 25 ml dichloromethane was added 10–12 ml water containing 0.131 g $K_2CO_3$. An intense violet-magenta color developed in the aqueous layer.

Then 2 ml methyl iodide and a catalytic amount of n-tetrabutylammonium chloride (a spatula tip) were added, and the reaction mixture was stirred at room temperature overnight. TLC on silica gel, with 60/40 ethyl acetate/petroleum ether showed only a trace of a new colored spot. Stirring was continued at room temperature, and then an additional 4 ml methyl iodide and a small amount of the catalyst were added. The reaction was again stirred overnight, and TLC on silica gel in 60/40 ethyl acetate/petroleum ether showed some starting material and a spot below corresponding to the desired product. The solvent was removed leaving a dark maroon-magenta solid. The title compound was isolated using preparative TLC techniques with 80/20 ethyl acetate/petroleum ether solvent.

EXAMPLE 16

Preparation of the compound having the formula:

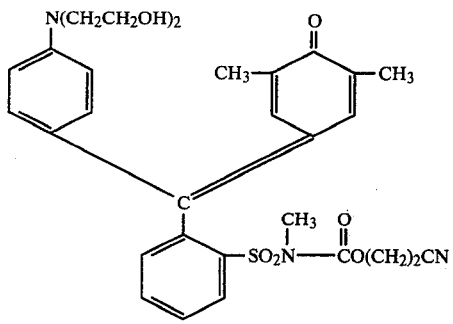

To 80–100 ml dichloromethane was added 0.691 g of 2-(-CO$_2$CH$_2$CH$_2$CN)-3-(3′,5′-dimethyl-4′-hydroxy-1′-phenyl)-3-[4″-N,N-di($\beta$-hydroxyethyl)amino-1″-phenyl]-2,3-dihydrobenz[d]-isothiazole-1,1-dioxide. Then 50 ml water containing 0.168 g K$_2$CO$_3$ was added. A deep magenta-violet color developed in the aqueous layer. The mixture was stirred vigorously, and 6 ml methyl iodide was added together with 45 mg of tetrabutylammonium bromide. This reaction mixture was stirred vigorously overnight. The aqueous phase lost most of its deep magenta-violet color and the organic phase became orange-yellow. TLC on silica gel with 85/15 ethyl acetate/acetone showed one major red-magenta spot and a trace of starting material and other minor spots. The organic dichloromethane phase was decanted and the aqueous phase washed with several portions of dichloromethane which were combined with the organic phase. The combined organic phase was washed with three portions of water and then the solvent was removed under reduced pressure to give a maroon-bronze tar, which upon drying under vacuum, gave glistening maroon-bronze solid particles. This solid was purified via medium pressure column chromatography (silica gel using 85/15 ethyl acetate/acetone solvent). The dark red maroon elutant was collected and the solvent removed to yield 0.6 g of the title compound.

EXAMPLE 17

Preparation of the compound having the formula:

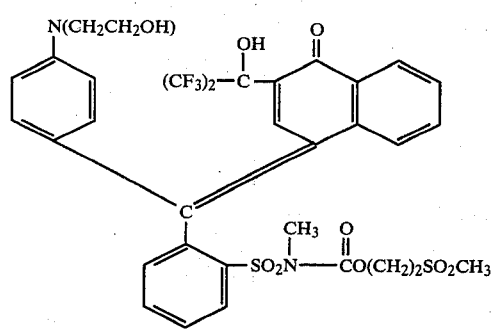

(a) To 1.9 g of 2-(-CO$_2$CH$_2$CH$_2$SO$_2$CH$_3$)-3-[(3′-$\alpha$-hydroxy-$\alpha$-trifluoromethyl-$\beta$,$\beta$,$\beta$-trifluoroethyl)-4′-hydroxy-1′-naphthyl]-3-[4″-N,N-di($\beta$-2″tetrahydropyranyloxyethyl)-1″-phenyl]-2,3-dihydrobenz[d]isothiazole-1,1-dioxide dissolved in 25–30 ml N,N-dimethylformamide was added 1.5 ml methyl iodide and 0.15 g of powdered 85% potassium hydroxide. This reaction mixture was stirred vigorously for 3 to 4 hours at room temperature. TLC on silica gel with 80/20 ethyl acetate/acetone (or pure ethyl acetate) showed no starting material present. The reaction mixture was then poured into cold water containing a small amount of HCl and overlayered with ethyl acetate. The water was decanted and the ethyl acetate washed several times with water. Then the solvent was removed leaving a blue solid which was dissolved in 20 ml ethyl acetate and placed on a low pressure liquid chromatography column using 80/20 ethyl acetate/hexane as the solvent. The blue portion was collected, the solvent removed and the residue dried under vacuum giving 0.340 g of solid.

(b) The product of step (a) (0.340 g) was dissolved in 35–40 ml methanol, and then 4 drops of conc. HCl were added. The solution was heated gently on a steam bath for approximately 15 minutes, poured into cold water containing some sodium chloride and extracted with ethyl acetate. The ethyl acetate was dried over anhydrous sodium sulfate in the presence of some activated carbon and filtered. The solvent was removed, and the residue dried under vacuum to yield 0.214 g of the title compound.

EXAMPLE 18

Preparation of the compound having the formula:

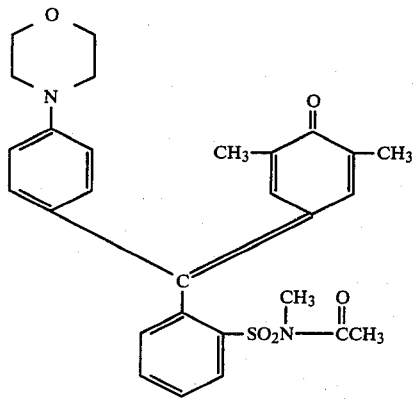

A solution of approximately 2.0 g of 2-(-COCH₃)-3-(3',5'-dimethyl-4'-hydroxy-1'-phenyl)-3-(4''-N-morpholinyl-1''-phenyl)-2,3-dihydrobenz[d]isothiazole-1,1-dioxide dissolved in 100 ml dichloromethane was added to a solution of 0.28 g K₂CO₃ dissolved in 200 ml water. To this mixture was added 0.22 g of tetrabutylammonium chloride and 17.2 ml of methyl iodide. This two-phase reaction mixture was stirred for 18 hours. TLC showed some starting material still present. Additional K₂CO₃ (a small spatula full) was added together with an additional 2 ml of methyl iodide. The reaction mixture was then stirred for 5 hours with no apparent change in the TLC. The organic dichloromethane layer was separated from the aqueous layer, washed with 300 ml water and the dichloromethane removed under reduced pressure to yield 1.06 g of a dark orange solid. The solid was dissolved in 10 ml chloroform and placed on a medium pressure liquid chromatography column (silica gel) and eluted with 8/2 ethyl acetate/hexane to give 0.50 g of the title compound.

EXAMPLE 19

Preparation of the compound having the formula:

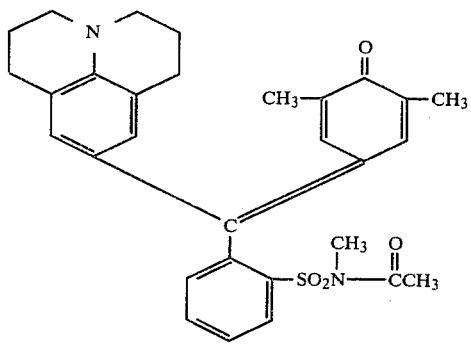

(a) To a solution of 0.67 g of 2-(-COCH₃)-3-(3',5'-dimethyl-4'-methoxymethoxy-1'-phenyl)-3-(9'-julolidinyl)-2,3-dihydrobenz[d]isothiazole-1,1-dioxide dissolved in 50 ml methanol was added two drops of conc. HCl. The solution was refluxed on a steam bath for one-half hour. TLC showed no starting material present. The methanol was removed leaving an oil. The oil was dissolved in dichloromethane and washed three times with water.

(b) The dichloromethane solution of step (a) was added to a solution of 0.3 g K₂CO₃ and 0.2 g tetrabutylammonium chloride dissolved in 40 ml water. To this two-phase system was added 0.5 ml methyl iodide and the reaction mixture was stirred for 16 hours. TLC showed that the reaction was complete. The organic layer was separated and washed three times with water, dried and the dichloromethane evaporated to give a violet oil. The oil was placed on a column of silica gel (100–200 mesh) and eluted with a solution of 7/3 ether acetate/hexane to give a pure sample of the title compound.

EXAMPLE 20

Preparation of the compound having the formula:

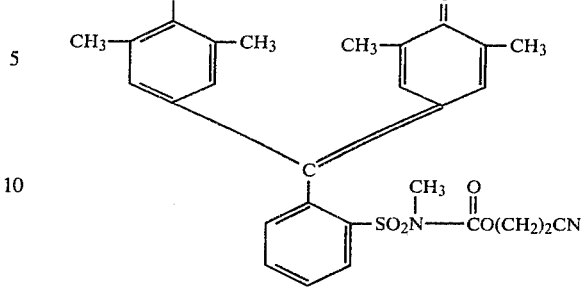

To a solution of 0.55 g of 2-(-CO₂CH₂CH₂CN)-3-(3',5'-dimethyl-4'-hydroxy-1'-phenyl)-3-(3'',5''-dimethyl-4''-methoxy-methoxy-1''-phenyl)-2,3-dihydrobenz[d]isothiazole-1,1-dioxide dissolved in 60 ml dichloromethane was added a solution of 0.2 g K₂CO₃ in 60 ml water along with a small amount (catalytic amount) of tetrabutylammonium chloride and 2 ml of methyl iodide. This reaction mixture was stirred for 4 hours at room temperature, then washed several times with water and the organic dichloromethane layer separated and evaporated to give 0.68 g of a yellow solid. The solid was dissolved in methanol containing one drop of conc. HCl and the solution heated at reflux for 20 minutes. The methanol was removed leaving a red-orange residue. Using preparative TLC techniques, 0.12 g of the title compound was recovered from the residue.

EXAMPLE 21

Preparation of the compound having the formula:

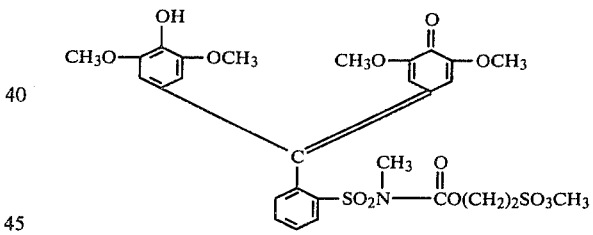

To 5.7 g of 2-(-CO₂CH₂CH₂SO₂CH₃)-3-(3',5'-dimethoxy-4'-hydroxy-1'-phenyl)-3-(3'',5''-dimethoxy-4''-hydroxy-1''-phenyl)-2,3-dihydrobenz[d]isothiazole-1,1-dioxide dissolved in 50 ml of dry N,N-dimethylformamide was added 0.66 g of 85% powdered potassium hydroxide. Then 10 ml of methyl iodide was slowly added at room temperature, and the dark green-yellow reaction mixture was stirred for 4 hours. (After 2 hours, the reaction mixture was orange in color and contained small amounts of suspended KOH.) Another 0.5 ml of methyl iodide was added and after an additional 2 hours, the TLC looked the same. The reaction mixture was then poured into 400 ml water containing 1 drop of conc. HCl and about 5 g of sodium chloride. The water was decanted from the oil, and the oil dissolved in dichloromethane and dried over sodium sulfate. The solution was evaporated under high vacuum to yield 6.6 g of an orange oil. The oil was heated in 200 ml methanol and a solid formed. The solid was recrystallized from dichloromethane/hexane to give 3.50 g of the title compound (melting range 184°–186° C.).

EXAMPLE 22

Preparation of the compound having the formula:

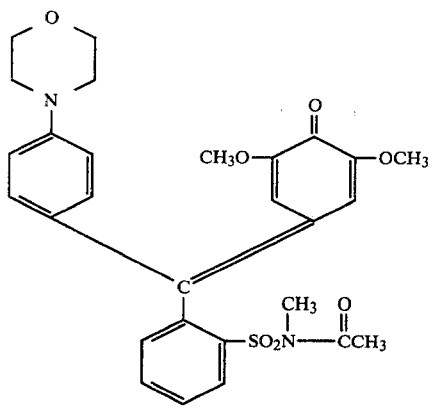

To a solution of 0.3 g of 2-(-COCH₃)-3-(3',5'-dimethoxy-4'-hydroxy-1'-phenyl)-3-(4''-N-morpholinyl-1''-phenyl)-2,3-dihydrobenz[d]isothiazole-1,1-dioxide dissolved in 10 ml dichloromethane was added a solution of 0.1 g of K₂CO₃ in 10 ml water and a few crystals of tetrabutylammonium chloride. This mixture was stirred at room temperature and 1 ml of methyl iodide was added. The reaction mixture was stirred for a total of 24 hours, and an additional 0.5 ml methyl iodide was added after 8 hours. (No change in TLC was observed.) The dichloromethane layer was separated, washed with water, dried over sodium sulfate and evaporated. The residue yielded 0.07 g of the title compound using preparative TLC techniques with 3% methanol-dichloromethane solvent.

EXAMPLE 23

Preparation of the compound having the formula:

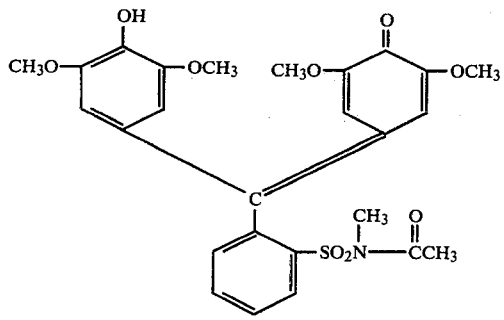

To a solution of 2.82 g of 2-(-COCH₃)-3-(3',5'-dimethoxy-4'-hydroxy-1'-phenyl)-3-(3'',5''-dimethoxy-4''-hydroxy-1''-phenyl)-2,3-dihydrobenz[d]isothiazole-1,1-dioxide dissolved in 30 ml dry N,N-dimethylformamide was added 0.36 g of powdered 85% potassium hydroxide and 4 ml of methyl iodide. This reaction mixture was stirred at room temperature for 2 hours changing from a very dark green to a light yellow-orange. (TLC showed a large amount of starting material present.) An additional 3 ml of methyl iodide and a small amount of potassium hydroxide were added and the reaction mixture was stirred for another 16 hours. Then the reaction mixture was poured into 200 ml water acidified with 3 drops of conc. HCl, extracted with chloroform, dried and evaporated to give a yellow oil. The yellow oil was placed on a medium pressure column of silica and eluted with 1:1 hexane-acetone to yield 0.43 g of the title compound.

EXAMPLE 24

Preparation of the compound having the formula:

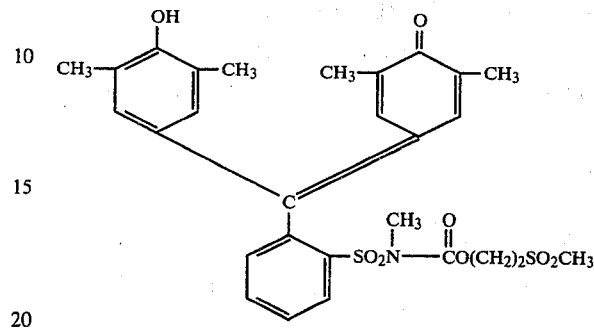

1.73 g of 2-(-CO₂CH₂CH₂SO₂CH₃)-3-(3',5'-dimethyl-4'-hydroxy-1'-phenyl)-3-(3'',5''-dimethyl-4''-hydroxy-1''-phenyl)-2,3-dihydrobenz[d]isothiazole-1,1-dioxide was dissolved in 25 ml dry N,N-dimethylformamide along with 0.23 g of powdered 85% potassium hydroxide and 4 ml of methyl iodide. This reaction mixture was stirred for 3 hours at room temperature, then poured into water containing 1 drop of conc. HCl and extracted with dichloromethane. The dichloromethane was dried and evaporated to give an orange oil. The oil was dissolved in hot ethanol and upon cooling, a pale yellow impurity precipitated. The mother liquor was evaporated leaving an oil which was placed on a medium pressure column (silica) and eluted with dichloromethane to give 0.94 g of the title compound.

EXAMPLE 25

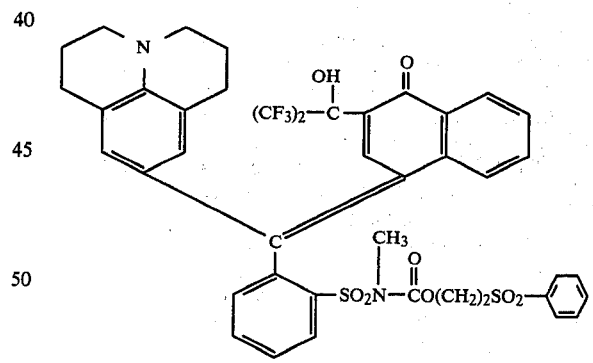

To a solution of 3.8 g of

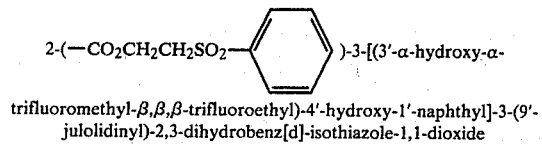

2-(—CO₂CH₂CH₂SO₂—⟨phenyl⟩)-3-[(3'-α-hydroxy-α-trifluoromethyl-β,β,β-trifluoroethyl)-4'-hydroxy-1'-naphthyl]-3-(9'-julolidinyl)-2,3-dihydrobenz[d]-isothiazole-1,1-dioxide dissolved in 100 ml of dry tetrahydrofuran was added 0.21 g of a 50% oil dispersion of sodium hydride and 5 ml of methyl iodide. This reaction mixture was stirred in the dark for 48 hours at room temperature under nitrogen. TLC on silica gel with ether showed the reaction was complete. The reaction mixture was poured into 1 liter of water containing 5 ml of conc. HCl, extracted with ether and the ether was dried over sodium sulfate and evaporated. The residue was dissolved in 20 ml of dichloromethane and placed on a medium pressure column and eluted with ether until the appropriate band was removed. The solvent was evaporated to yield 1.135 g of the little compound.

EXAMPLE 26

Preparation of the compound having the formula:

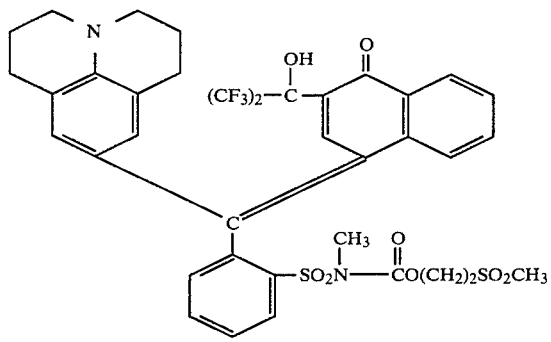

To 3.25 g of 2-(-CO$_2$CH$_2$CH$_2$SO$_2$CH$_3$)-3-[(3'-α-hydroxy-α-trifluoromethyl-β,β,β-trifluoroethyl)-4'-hydroxy-1'-naphthyl]-3-(9'-julolidinyl)-2,3-dihydrobenz[d]isothiazole-1,1-dioxide dissolved in 100 ml of tetrahydrofuran was added 0.2 g of a 50% sodium hydride oil dispersion under nitrogen at room temperature. To this mixture was added 5 ml of methyl iodide, and the reaction mixture was stirred for 48 hours in the dark. TLC on silica gel with ether showed many spots but one major product. The reaction mixture was then poured into one liter of water containing 5 ml of conc. HCl and extracted with ether. The ether was dried over sodium sulfate and evaporated. The blue residue was dissolved in 15 ml dichloromethane and placed on a medium pressure column and eluted with ether and then 100 ml 1%, 2%, 3%, 4% methanol in ether. The remaining elution employed the 4% methanol in ether until the product was removed. TLC still showed traces of impurities. The 0.537 g of product obtained was placed on a medium pressure column and eluted as above to give 0.48 g of pure title compound.

The compound of Example 26 also was prepared as follows:

To a three-necked, 250 ml flask equipped with a mechanical stirrer and nitrogen inlet tube was added in the dark 18 g of 2-(-CO$_2$CH$_2$CH$_2$SO$_2$CH$_3$)-3-[3'-α-hydroxy-α-trifluoromethyl-β,β,β-trifluoroethyl)-1'-naphthyl]-3-(9'-julolidinyl)-2,3-dihydrobenz[d]isothiazole-1,1-dioxide to 80 ml of dry dimethyl sulfoxide. To this solution was added with mechanical stirring at room temperature, 12 ml of methyl iodide. Finally, 1.9 g of powdered 85% potassium hydroxide pellets were added. After stirring the mixture for one hour in the dark, TLC on silica gel with 1/9 methanol/ether showed the reaction was complete. The reaction solution was poured into 5 liters of water containing 6 ml of conc. HCl. The blue precipitate was collected by vacuum filtration on a Büchner funnel and washed well with water. The precipitate was pressed dry, dissolved in 600 ml of hot methanol, filtered and cooled to room temperature. The product separated as green crystals. These were filtered and vacuum dried to give 7.1 g of product which gave a single spot on TLC. The mother liquor was concentrated to near dryness on a rotary evaporator. The residue was dissolved in 50 ml of acetone to which 500 ml of ethyl ether was then added. An impurity which precipitated was removed by filtering through a celite pad. The ether solution was evaporated to dryness. The residue was again crystallized from methanol (75 ml) to give a second crop of the title compound (2.7 g) for a total of 9.8 g (53% yield).

EXAMPLE 27

Preparation of the compound having the formula:

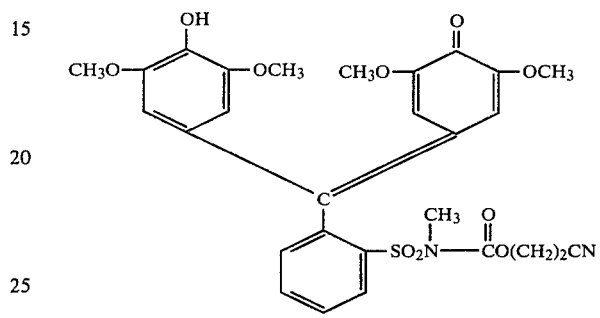

To 0.057 g of 2-(-CO$_2$CH$_2$CH$_2$CN)-3-(3',5'-dimethoxy-4'-hydroxy-1'-phenyl)-3-(3",5"-dimethoxy-4"-hydroxy-1"-phenyl)-2,3-dihydrobenz[d]isothiazole-1,1-dioxide dissolved in 5 ml of acetone was added 0.014 g of powdered 85% potassium hydroxide and 0.01 ml of methyl iodide. This reaction mixture was refluxed for 3 hours excluding air. TLC on silica gel with 15% methanol/ether showed several spots including a small amount of starting material. The reaction mixture was poured into acidic water, extracted with ether and the ether evaporated under vacuum to yield an orange residue. The residue was dissolved in dichloromethane and the title compound was recovered by preparative TLC.

EXAMPLE 28

Preparation of the compound having the formula:

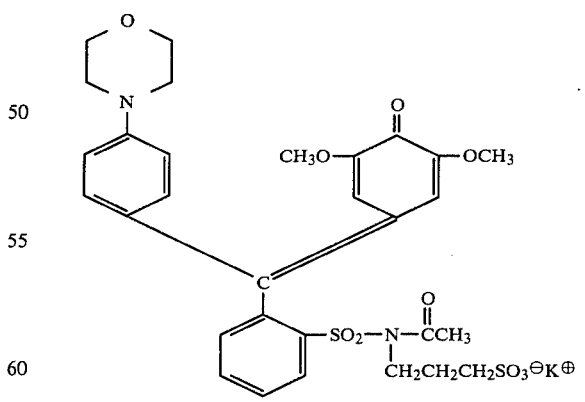

To a 200 mg (0.38 mM) sample of 2-(-COCH$_3$)-3-(3',5'-dimethoxy-4'-hydroxy-1'-phenyl)-3-(4"-N-morpholinyl-1"-phenyl)-2,3-dihydrobenz[d]isothiazole-1,1-dioxide in 2 ml of dimethylformamide was added 20 mg (0.38 mM) of powdered potassium hydroxide under a nitrogen atmosphere. After the potassium hydroxide dissolved, 0.66 ml (7.63 mM) of propane sultone was added to the maroon solution at room temperature. TLC analysis indicated that the reaction was about half complete after two hours of stirring. The reaction mixture was concentrated under vacuum with heat to give a maroon solid. This material was dissolved in methanol and added to ethyl ether, which caused the product to precipitate. After preparative TLC (silica gel/methanol-ethyl acetate—1:5), the title compound was obtained as dark solid (green reflex).

EXAMPLE 29

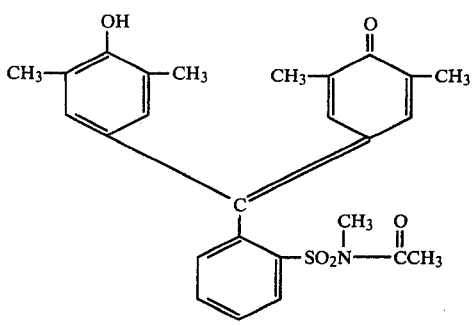

(a) To a solution of 0.40 g of 2-(COCH₃)-3-(3',5'-dimethyl-4'-hydroxy-1'-phenyl)-3-(3",5"-dimethyl-4"-methoxy-methoxy-1"-phenyl)-2,3-dihydrobenz[d]isothiazole-1,1-dioxide dissolved in 20 ml of dichloromethane was added 0.11 g of K₂CO₃ and 20 ml water. Then a catalytic amount of tetrabutylammonium chloride (a spatula tip) was added together with 2 ml of methyl iodide. The aqueous layer was violet and the organic dichloromethane layer was yellow. After stirring several hours, the aqueous layer became colorless and the dichloromethane was a deep yellow. The dichloromethane layer was then separated, washed with an equal volume of water, dried briefly over sodium sulfate, filtered and evaporated under reduced pressure leaving 530 mg of an orange syrup. The syrup was fractionated using preparative TLC (silica gel eluted with ether). 180 mg of the N-methylated compound was obtained as an orange-yellow syrup, which crystallized when covered with methanol.

(b) The compound prepared in step (a) (0.18 g) was dissolved in 50 ml methanol and heated to reflux in an oil bath. All of the solid dissolved, and after about 15 minutes, 2 drops of conc. HCl were added. Refluxing of the resulting wine red solution was continued for about one hour and then the solution was evaporated under reduced pressure to give a red film with a metallic green luster. The red film was dissolved in methanol, the methanol evaporated and the residue dried under reduced pressure in a warm water bath to give 140 mgs of the title compound as a red solid.

EXAMPLE 30

Preparation of the compound having the formula:

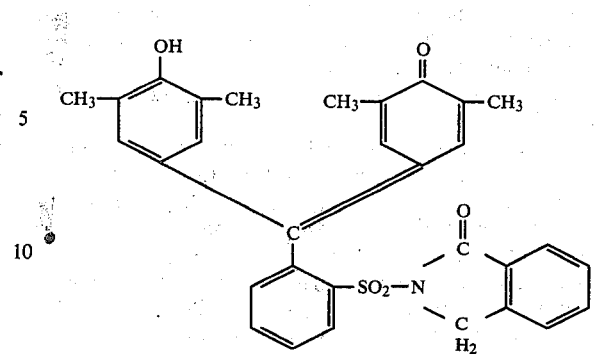

(a) To 1.5 g of 2-(—$\overset{O}{\underset{}{C}}$—$\underset{CH_2Cl}{\phantom{X}}$)-3-(3',5'-dimethyl-4'-methoxymethoxy-1'-phenyl)-3-(3",5"-dimethyl-4"-methoxymethoxy-1"-phenyl)-2,3-dihydrobenz[d]isothiazole-1,1-dioxide suspended in 60 ml methanol was added 3 drops of conc. HCl and the resulting mixture was heated at reflux for 20 minutes. The red colored solution was cooled and evaporated to give 1.5 g of the deblocked isothiazole-1,1-dioxide as a red solid.

(b) The red solid was dissolved in 60 ml methanol and 0.5 g of K₂CO₃ in 10 ml water was added dropwise. This reaction mixture was stirred for one hour at room temperature and then the pH of the mixture was adjusted to 5 with 1 N HCl. The solid that formed was collected and washed in refluxing ethanol for 40 minutes to yield the title compound as a yellow solid.

EXAMPLE 31

Preparation of the compound of the formula

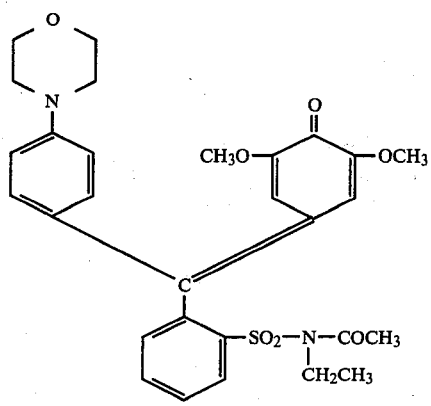

To a solution of 3 g of 2-(COCH₃)-3-(3',5'-dimethoxy-4'-hydroxy)-3-(4"-N-morpholinyl-1"-phenyl)-2,3-dihydrobenz[d]isothiazole-1,1-dioxide dissolved in 17 ml of dry N,N-dimethyl-formamide under nitrogen was added 0.39 g of 87.3% potassium hydroxide pellets. A deep maroon color resulted. The solution was stirred for 3 minutes (a small amount of KOH remained undissolved), and 7.1 ml of ethyliodide was added in one portion. After stirring for about 25 hours at room temperature, the reaction mixture was poured into 250 ml water containing 4 drops of 10% HCl. The mixture was extracted with 200 ml chloroform and the chloroform layer separated, dried over sodium sulfate, and concentrated to a deep maroon oil comprising the title compound.

The compounds of formula (IV) may be prepared by converting the selected 3,3-disubstituted phthalide (phthalein) to the corresponding phthalin, forming the methyl ester of the phthalin, reducing it to the corresponding phthalol and then forming the acyl derivative of the phthalol which is oxidized to yield the triarylmethane dye product. This synthesis is illustrated below employing phenolphthalein as the starting phthalide.

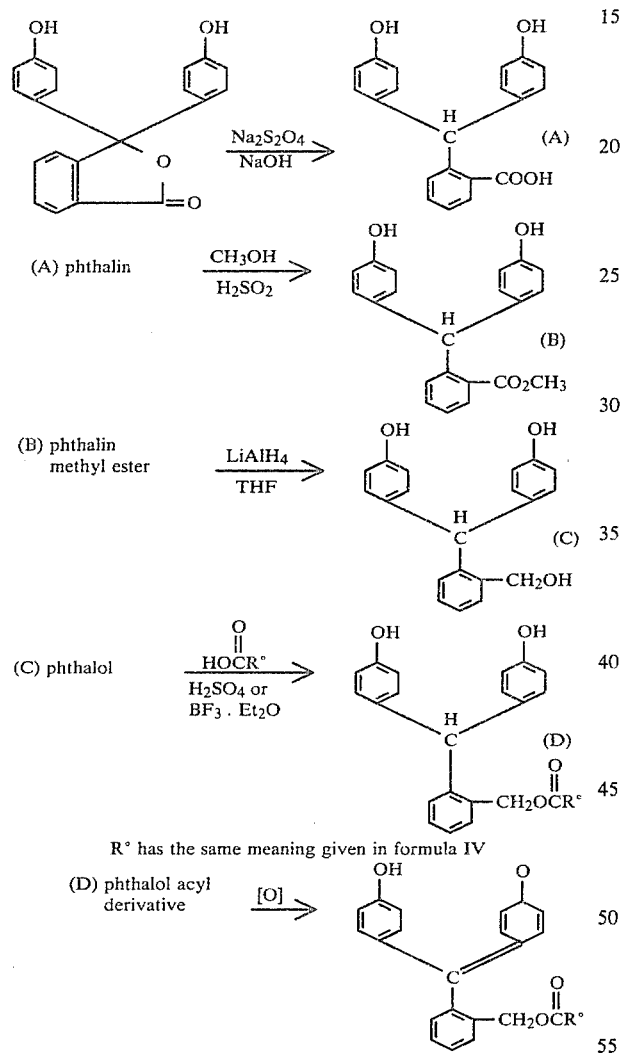

Another method of preparing these compounds comprises reducing the selected 3,3-disubstituted phthalide starting material with lithium aluminum hydride in anhydrous tetrahydrofuran. Depending upon the substituents present in the phthalide, the reduction product is the corresponding phthalol, phthalin, phthalan or mixtures thereof. Where the phthalan is formed, it is reacted with the appropriate acid, HOOCR°, in the presence of sulfuric acid or boron trifluoride catalyst to yield the triarylmethane dye product. This synthesis is illustrated below using phenolphthalein as the phthalide starting material.

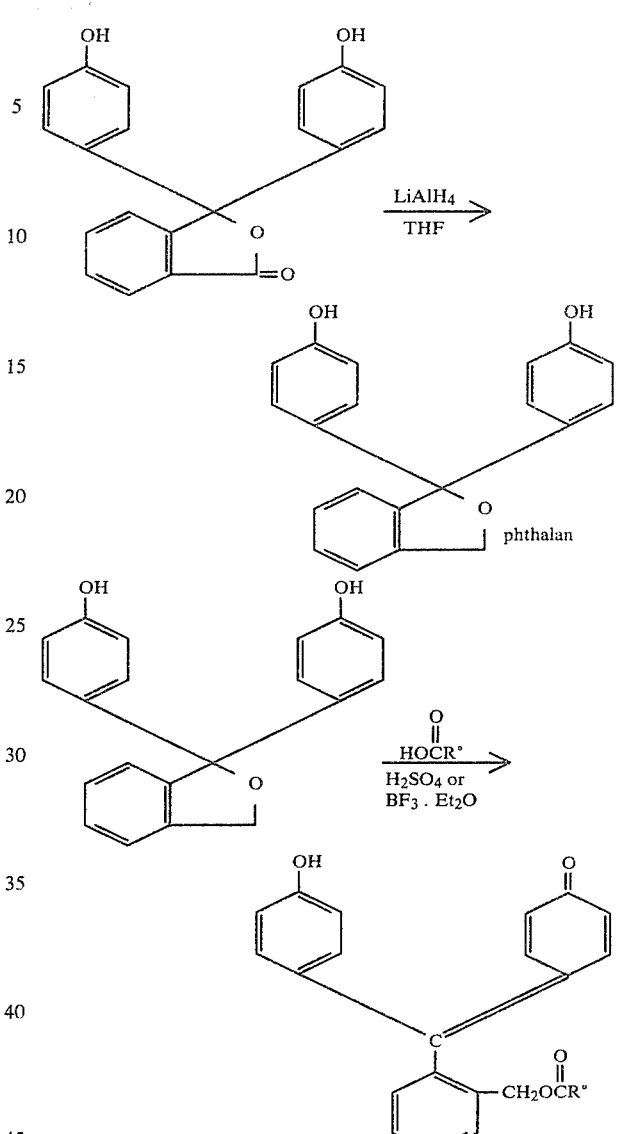

R' has the same meaning given in formula IV.

Where the phthalin is formed as the reduction product, it can be converted to the methyl ester etc. as illustrated in the previous reaction sequence for (A) through (D). Where the phthalol is formed as the reduction product, it can be reacted with the appropriate acid, HOOCR°, to give the corresponding acyl derivative followed by oxidation to the triarylmethane dye product as shown in the previous reaction scheme for (C) and (D). Alternatively, the phthalol can be oxidized to the corresponding phthalan using, for example, o-chloranil or dicyanodichloroquinone, and the phthalan reacted with the appropriate acid as discussed above.

The 3,3-disubstituted phthalides used as the starting materials in the above syntheses may be prepared using various methods known in the art. In one of the more conventional procedures, phenols, such as, thymol, o-cresol and phenol itself are reacted with phthalic anhydride at elevated temperatures in the presence of a suitable catalyst such as zinc chloride or sulfuric acid to yield the corresponding symmetrical 3,3-disubstituted phthalide, i.e., wherein the 3,3 substituents are the same. Another method of synthesizing 3,3-disubstituted phthalides wherein the 3,3 substituents may be the same or different is disclosed and claimed in U.S. Pat. No. 3,931,228 to Alan L. Borror. In the latter method, a phenol or a 1-naphthol is reacted with phthalaldehydric acid to give the corresponding p-phthalidylphenol or p-phthalidylnaphthol adduct which is oxidized by dehydrogenation to selectively remove the hydrogen from the 3-position of the phthalidyl portion of the adduct and to remove the hydrogen from the phenolic or naphtholic hydroxy group. This oxidized intermediate is then condensed with a phenol, 1-naphthol, etc., preferably in the presence of an acid catalyst to yield the 3,3-disubstituted phthalide.

Rather than reducing the 3,3-disubstituted phthalide to the corresponding 3,3-disubstituted phthalan, the phthalan may be synthesized directly by reacting one equivalent of phthalide with, for example, two equivalents of a protected lithiated phenol, such as, 2'-tetrahydropyranyl 4-Li-phenyl ether, to give the corresponding symmetrical 3,3-disubstituted phthalan followed by removal of the 2'-tetrahydropyranyl protecting groups to regenerate the phenolic hydroxy groups as shown below:

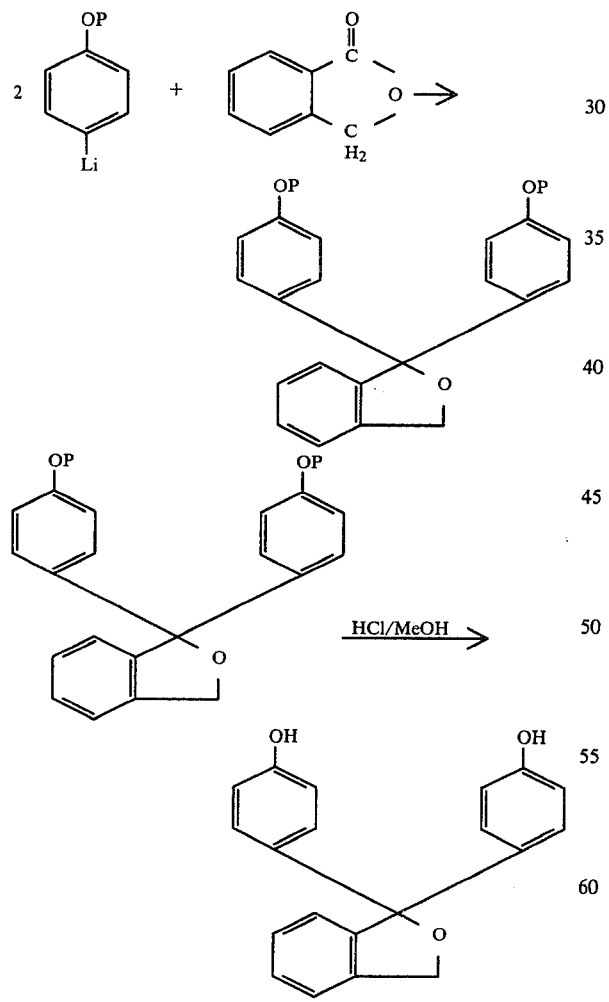

P=protecting group

Unsymmetrical phthalans may be prepared by reacting one equivalent of an organolithium reagent, such as, a 4-Li-N-N-(dialkyl)aniline with one equivalent of phthalide to give the 4-(2'-hydroxymethylbenzoyl)-N,N-(dialkyl)aniline and then reacting this intermediate with, for example, 4-(2'-tetrahydropyranyloxy)phenyl-lithium to give the corresponding unsymmetrical 3,3-disubstituted phthalan followed by deblocking the phenolic—OH, i.e., removing the 2'-tetrahydropyranyl protecting group.

It will be appreciated that any appropriate blocking group as commonly used for protecting the functional phenolic or naphtholic —OH and other —OH substituents that may be present may be employed such as those mentioned above.

A method that may be employed in synthesizing the phthalol acetyl derivatives is that disclosed by M. Hubacher, J. Amer. Chem. Soc., 74, p. 5216 (1952). This method comprises reducing the selected phthalin with lithium aluminum hydride in absolute ether to the corresponding phthalol and then reacting the phthalol with the selected acid.

The following examples are given to further illustrate the preparation of the compounds of formula (IV).

EXAMPLE 32

Preparation of the compound having the formula

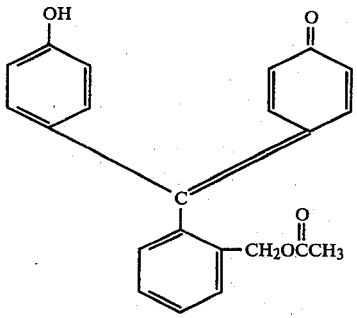

(a) Lithium aluminum hydride (3.0 g) and 100 ml of dry tetrahydrofuran were placed in a 3-neck flask equipped with a mechanical stirrer, condenser with a nitrogen inlet and addition funnel. Phenolphthalein (6.4 g) dissolved in 300 ml of dry tetrahydrofuran was added dropwise to the stirred lithium aluminum hydride suspension at a rate to maintain a gentle reflux. When addition was complete, the reaction mixture was stirred for six hours at reflux by heating with an oil bath and then allowed to stand overnight. To the stirred solution was added excess ethyl acetate followed by 500 ml of water. The pH was adjusted to approximately 2 with conc. HCl and the solution extracted with two 500 ml portions of ether. The ether layer was washed six times with 10% aqueous potassium carbonate (each time the base layer was magenta), and then evaporated to dryness to leave an off-white solid (4.5 g crude yield). The solid was crystallized from 440 ml of 20% ethanol and dried in vacuo at 60° C. to give the corresponding phthalan as very light yellow crystals (yield 3.3 g; melting range 195°–197.5° C.). TLC using ether-silica gel gave one spot. Nmr did not show methine H and was more consistent with the cyclic ether (phenolphthalan) than the open form (phenolphthalol).

(b) Into a test tube was placed the tip of a spatula of the phthalan prepared in step (a) and about 0.5 ml of glacial acetic acid. Two drops of conc. sulfuric acid were added (a bright orange color was observed), and the reaction mixture was heated for 10 minutes at about 80° C., poured into 10 ml of water and extracted with ether. TLC of the ether layer on silica gel showed the title compound as a yellow spot, which was identical to a sample of the title compound prepared as follows:

(1) In a test tube was placed 0.2 g of phenolphthalol and 2 ml of glacial acetic acid. The reaction solution was heated at reflux for 1½ hours, poured into 50 ml of water and extracted two times with ethyl ether. The ether was washed with sodium bicarbonate solution, brine, dried over sodium sulfate and dried in vacuo leaving a colorless oil having a brownish tinge. TLC with ether/silica gel showed a small amount of starting material and a major spot above the starting material, which was the monoacetyl ester of phenolphthalol.

(2) The monoacetyl ester of phenolphthalol prepared in step (1) without purification was dissolved in 10 ml of dry tetrahydrofuran in a test tube. Dicyanodichloroquinone (0.2 g) was added all at once. The reaction mixture became yellow-brown and was allowed to stand one hour with stirring. TLC using silica gel/ether showed one major spot. Preparative TLC on a portion of the tetrahydrofuran solution gave a small amount of the title compound as a yellow oil. (TLC showed the oil to be homogeneous.)

The phenolphthalol was prepared as follows:

(i) Sodium dithionite (26.1 g) was added to a solution of 20 g of sodium hydroxide dissolved in 400 ml water, and then phenolphthalein (15.92 g) was added giving a red-pink solution. An exotherm to about 35° C. was observed. The reaction mixture was then heated to 83° C. over about 20 minutes. The hazy straw solution was then placed in an ice bath, and 42 ml of conc. HCl was slowly added as the solution cooled from 35° to about 5° C. After about 24 mls HCl had been added, a precipitate began to form. After all of the HCl had been added, the strongly acidic solution was filtered and the white solid collected and washed with water. The damp filter cake was set aside overnight and then heated under reflux in about 1500 ml water. When the refluxing solution started to foam in the condenser at 100° C., the solution was filtered hot. (Considerable solid had failed to dissolve.) A solid appeared almost immediately in the filtrate. A small amount of the solid in the filtrate turned faint pink in aqueous sodium hydroxide, but the "insolubles" collected from the hot water solution did not turn pink with sodium hydroxide. The white hot water "insoluble" solids were then dissolved in about 500 ml methanol to give a slightly hazy straw solution which was heated and filtered giving a clear, colorless filtrate. The filtrate was evaporated leaving a white, solid residue which was redissolved in about 200 ml of methanol and again evaporated to give 12.5 g of white solid residue. The filtrate containing the hot water "soluble" solids was filtered and the tiny white needles that were collected were pressed and remained quite damp. Both the white solid residue and the white needle solids were heated under vacuum for several hours and then maintained under vacuum at room temperature. Drying under vacuum was repeated giving phenolphthalin in a total yield of 15.03 g (12.11 g of hot water "insolubles" plus 2.92 g of hot water "solubles", both of which melted at 237°–239° C. giving clear, light yellow melts).

(ii) In a three-neck flask equipped with a magnetic stirrer, nitrogen inlet and condenser vented to an exhaust bubbler, 2.92 g of phenolphthalin was dissolved in 100 ml methanol. To this solution was added 2 drops conc. sulfuric acid, and then the reaction solution was heated under nitrogen in an oil bath. Additional conc. sulfuric acid (approximately 25 drops) was added and refluxing under nitrogen was continued until the reaction was essentially complete. The reaction solution was then poured into 200 ml ice water, treated with sodium bicarbonate to neutralize the sulfuric acid and evaporated to remove the methanol. The white solid residue was collected, washed with water and pressed dry to give 2.93 g of the methyl ester of phenolphthalin.

(iii) A solution of 0.5 g of the methyl ester of phenolphthalin prepared in step (ii) dissolved in 30 ml dry tetrahydrofuran was slowly added to a suspension of 0.5 g of lithium aluminum hydride in 20 ml dry tetrahydrofuran. The resulting reaction mixture was heated at reflux for 30 minutes, and then excess ethylacetate was added. The reaction mixture was poured into 1N HCl, extracted with two 200 ml portions of ethyl ether and the ether evaporated leaving a residue of solid and some water. The residue was taken up in ethyl ether and the ether decanted from water, dried over sodium sulfate, filtered and the solvent removed in vacuo to give 0.42 g of phenolphthalol as a white solid. TLC on silica gel using ether showed the title compound as one major spot, and nmr was consistent with the phthalol structure.

EXAMPLE 33–35

Preparation of the compounds having the formulae

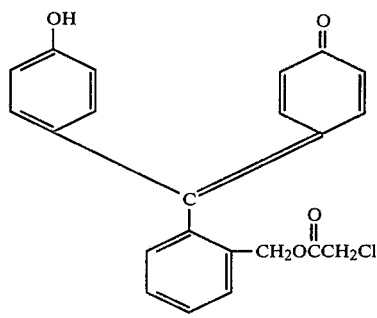

Example 33

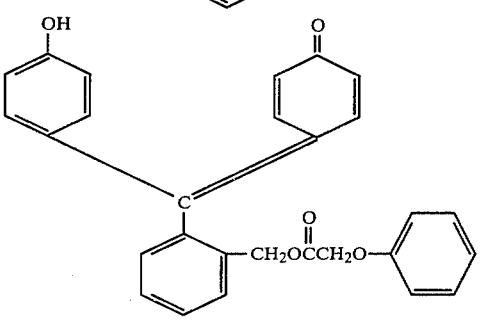

Example 34

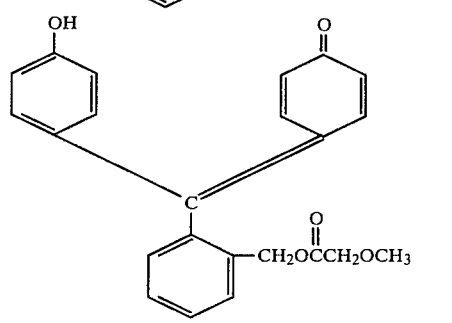

Example 35

(a) Phenolphthalan was prepared according to the procedure given in step (a) of Example 32 above.

(b) About 100 mg of phenolphthalan was dissolved in 0.5 ml of chloroacetic acid, phenoxyacetic acid and methoxyacetic acid, respectively. Two drops of conc. sulfuric acid was added to each reaction solution, and each solution was heated for 10 minutes at about 80° C. After adding 10 ml of water, each solution was extracted with ether. Preparative TLC of the yellow ether layer using silica gel/ether gave the respective title compounds.

The compound of Example 35 also was prepared as follows:

(1) To a one liter 3-neck flask under nitrogen was added 250 ml of dry tetrahydrofuran followed by 4.61 g of lithium aluminum hydride (95%). Phenolphthalein (20.0 g) dissolved in 250 ml of dry tetrahydrofuran was added dropwise to the well-stirred lithium aluminum hydride suspension at a rate to prevent a violent reaction. Addition was completed in 90 minutes. The reaction mixture was then refluxed for 30 minutes by applying external heat. Silica gel TLC in ether showed some unreacted phenolphthalein was present. Refluxing was continued for 2½ hours. Silica gel TLC in ether showed no further changes. The heat source was removed, and 60 ml of ethyl acetate was added to the reaction mixture to destroy unreacted lithium aluminum hydride. Then 200 ml of saturated ammonium chloride was added and the pH adjusted to about 4 to 6 with 1N HCl. The organic portion was decanted and the solvent removed under reduced pressure leaving a yellow oil. The oil was dissolved in 350 ml of ether and the ether extracted with a total of 4 liters of 10% sodium carbonate to remove unreacted pheolphthalein. Then the ether was removed leaving a yellow oil which was dissolved in one liter of boiling 20% ethanol: 80% water mixture to give a clear, pink-red solution. Upon cooling, an off-white crystalline product formed, and the solution was allowed to stand in the refrigerator for three days. The solids were filtered, washed with room temperature 20% ethanol to remove a yellow-pink color and collected giving a very pale yellow, crystalline product. Recrystallization from 750 ml of 20% ethanol gave 11.8 g of the corresponding phthalan as a very pale yellow crystalline solid. Silica gel TLC in ether showed only one spot corresponding to the phthalan.

(b) To 5.0 g of phenolphthalan was added 30 ml of methoxyacetic acid and the mixture stirred vigorously. Not all solids dissolved. The mixture was cooled in an ice water bath and 2.32 g of borontrifluoride etherate was added. A pink-yellow color developed. The reaction mixture was stirred cold for 30 minutes and allowed to come to room temperature. Not all solids had dissolved, and the reaction mixture was heated gently for 35 minutes. Silica gel TLC in ether showed unreacted phthalan. Another 2.32 g portion of borontrifluoride etherate was added and gentle heating was continued for one hour. Unreacted phthalan was again detected by TLC. An additional 5.0 g of borontrifluoride etherate was added, and after gentle heating and continued stirring for one hour, silica gel TLC in ether showed almost no phthalan. The reaction mixture was diluted with ice water and extracted with ether. The yellow ether solution was washed with several portions of fresh water and dried over anhydrous sodium sulfate. The ether was removed leaving a deep yellow oil containing some water which was dried under vacuum in the presence of sulfuric acid. The oil (4.4 g) was purified by high pressure liquid chromatography using approximately 25% methanol in dichloromethane to yield 2.6 g of the title compound.

EXAMPLE 36

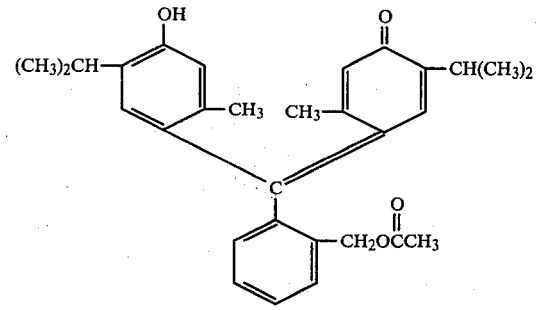

(a) The phthalan of thymolphthalein was prepared according to the procedure given in step (a) of Example 32 above and the crude product used without purification.

(b) The crude product obtained in step (a) above (4.8 g) was dissolved in 30 ml of acetic acid, and 6.5 g of bronotrifluoride etherate was added. The reaction mixture was heated near reflux for 2½ hours. Silica gel TLC showed a new yellow spot had formed above the starting material. The reaction mixture was poured into water and extracted with dichloromethane. The organic solvent portion was washed with several portions of water and the solvent removed leaving a yellow solid. Preparative TLC on silica gel with 90%:10% ether/petroleum ether gave 0.116 g of the title compound as an orange-yellow solid.

EXAMPLE 37

Preparation of the compound having the formula

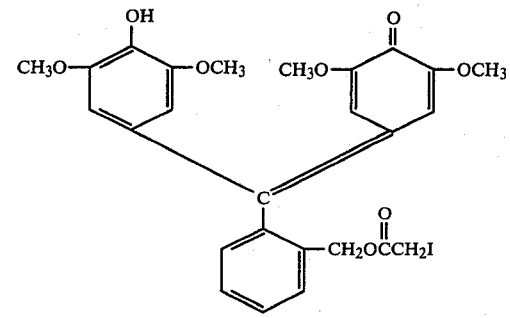

(a) In a flame-dried 3-neck flask equipped with a nitrogen inlet, magnetic stirrer, thermometer rubber septum and dry ice-acetone bath, 12.68 g of 2'-tetrahydropyranyl 4-bromo-2,6-dimethoxyphenyl ether was dissolved in 200 ml of dry tetrahydrofuran under nitrogen while cooling to −60° C. To the solution was added 25 ml of n-butyllithium (1.6 M in hexane) via syringe over about 10 minutes at a rate to maintain the temperature between −50° and −60° C. After stirring for about 30 minutes at −50° to −60° C., 2.68 g of phthalide was added all at once giving a light yellow solution. The reaction solution was allowed to stir while the reaction temperature came to room temperature over the weekend. A small sample of the reaction mixture (½ ml) was poured on ice, diluted with HCl and extracted with ether. TLC of the ether using silica gel/-petroleum ether-ether (2:1) showed a major spot that turned deep magenta when treated with sulfuric acid. The remaining mixture was poured over 100 cc of crushed ice, the pH adjusted to 5-6 with dilute HCl with stirring, and extracted with two 125 ml portions of ether. The ether extracts were combined, washed with water (three 50 ml portions), dried over sodium sulfate and filtered. The solvent was removed under reduced pressure and the residue dried in vacuo for 2 hours at room temperature. About 10.3 g of the residue was dissolved in 50-75 ml of methanol at room temperature and then 3 drops of conc. HCl were added. After stirring overnight at room temperature, the off-white crystals were filtered, washed with methanol and air dried to give 4.64 g of 3', 3'',5',5''-tetramethoxyphenolphthalan.

(b) Twenty drops of conc. sulfuric acid were added to a stirring melt of 1.06 g of the phthalan prepared in step (a) and 10 g of iodoacetic acid at 75° C., and stirring and heating were continued for 45 minutes. The dark mass was then poured over about 25 cc of crushed ice and extracted with four 25 ml portions of methylenechloride. The combined methylenechloride extracts were washed with water, filtered and the solvent removed at 35°-40° C. under reduced pressure. 100 ml of ether was added to the dark residue, and after stirring for about one hour, the dark crystals were removed by filtration. The solid was dissolved in ethanol containing Norite; the solution filtered and placed in a refrigerator for 2-5 hours to induce crystallization. The crystals were filtered, washed with two 10 ml portions of ethanol and then ether and air dried to give 645 mg of the title compound.

EXAMPLE 38

Preparation of the compound having the formula

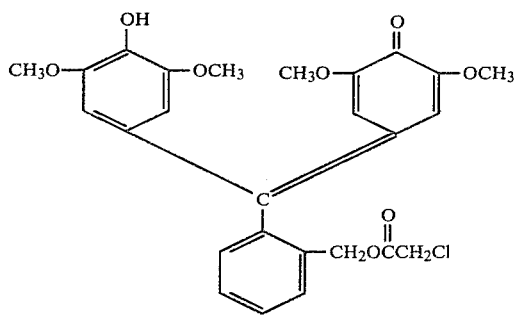

The title compound was prepared according to the procedure given in Example 37 except that chloroacetic acid was substituted for iodoacetic acid in step (b).

EXAMPLE 39

Preparation of the compound having the formula

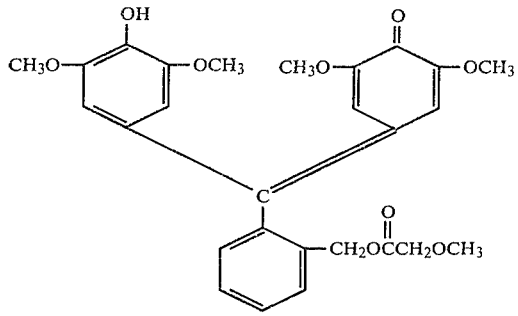

(a) The procedure of step (a) of Example 37 was repeated using 25.36 g of 2'-tetrahydropyranyl 4-bromo-2,6-dimethoxyphenyl ether dissolved in 400 ml of dry tetrahydrofuran, 50 ml of n-butyllithium (1.6 M in hexane) and 4.83 g of phthalide but adding a solution of 7 g of ammonium chloride to the iced reaction mixture instead of dilute HCl. The yield of 3',3'',5',5''-tetramethoxyphenolphthalan after recrystallizing the air-dried solids from 100 ml of boiling ethanol was 9.02 g.

(b) The phthalan prepared in step (a) (8.5 g) was dissolved in 90 g of methoxyacetic acid at 90°-95° C. 15 ml of boronfluoride etherate was added dropwise while stirring giving a deep green solution. Heating and stirring of the reaction mixture at 95° C. was continued for 1¼ hours and then a small sample prepared for TLC using silica gel and 3% methanol/methylene chloride. After 15 minutes, the remaining reaction mixture was poured over 100 cc of crushed ice and extracted with two 125 ml portions of ether. The combined ether extracts were washed with two 50 ml portions of water and the combined aqueous phases were extracted with three 100 ml portions of methylene chloride. The combined methylene chloride extracts were washed with 50 ml water, dried over sodium sulfate, filtered and the solvent removed leaving 18.7 g of residue. The foregoing procedure was repeated and residues from the methylene chloride extracts were combined giving a total residue of 31.45 g. High pressure chromatography using methylene chloride/methanol (trace) gave 14.5 g of product which was dried in vacuo at room temperature overnight, then dissolved in methanol and the methanol solution filtered through Celite. The solvent was removed and the solid vacuum dried to give 12.5 g of the title compound.

EXAMPLE 40

Preparation of the compound having the formula

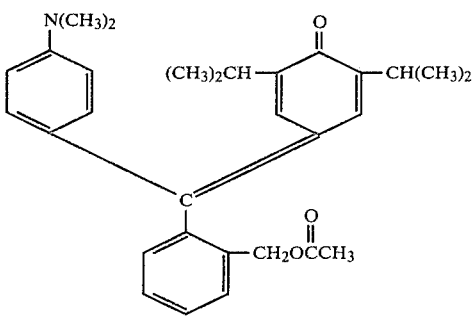

(a) Lithium aluminum hydride (0.2 g) was added to approximately 40 ml of dry tetrahydrofuran at room temperature under nitrogen. 3-[4'-(dimethyl)amino-1'-phenyl]-3-(3",5"-diisopropyl-4"-oxo-1"-phenyl)phthalide (1.0 g) was dissolved in 40 ml dry tetrahydrofuran and the solution added dropwise to the lithium aluminum hydride suspension. The temperature rose to about 30° C. Upon completion of addition, a sample of the reaction mixture was poured into water and extracted with ether. TLC on silica gel with 1:1 ether/petroleum ether showed completion of the reaction and no unreacted phthalide. After neutralizing the lithium aluminum hydride with ethylacetate, the reaction mixture was poured into 200 ml water, the pH adjusted to 3 with HCl and extracted with ether. The ether layer was washed with 200 ml of 5% aqueous sodium hydroxide, dried over sodium sulfate and the ether evaporated to leave a pink-red residue. The residue was dissolved in about 20 ml ether, and petroleum ether was added to precipitate a white solid. The solution after filtering was evaporated to give the corresponding phthalan as a pink solid.

(b) The phthalan prepared in step (a) was dissolved in approximately 20 ml of glacial acetic acid, and approximately 2 ml of borontrifluoride etherate solution was added. The resulting orange-red solution was heated on a steam bath for one and three-fourths hours. TLC of the reaction solution on silica gel with 1:1 ether/petroleum ether showed no unreacted phthalan. The reaction solution was then poured into 100 ml water, extracted with ether, the ether dried and evaporated to leave a tarry residue with an odor of acetic acid. The residue was dissolved in about 20 ml methanol and then poured into 100 ml water to yield a red powder on filtering. The powder was dried and then passed through a column wet packed with silica gel (100–200 mesh) and 1:1 ether/hexane and eluted with the same solvent. The appropriate fractions were collected and evaported to give 0.040 g of the title compound as a brick-red solid. (TLC showed one spot.)

EXAMPLE 41

Preparation of the compound having the formula

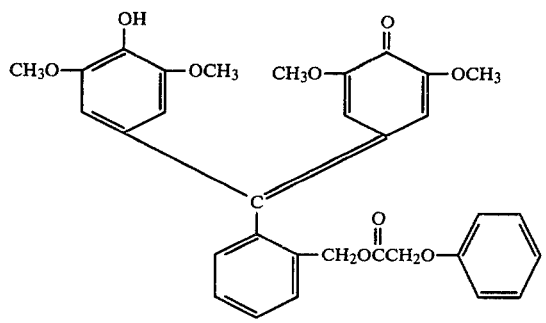

To a stirred mixture of 3',3",5',5"-tetramethoxyphenolphthalan (3.9 g; 0.009 M) and phenoxy acetic acid (20.0 g; 0.13 M) was added a small amount of borontrifluoride etherate. This was gently heated until a melt occurred. Additional $BF_3.Et_2O$ (6.0 ml) was added dropwise to the melt over a 10 minute period. After stirring the resulting deep blue solution for about 10 minutes at 95° C., it was diluted with 350 ml of ice water and extracted with ether. The ether was removed and the residue was dissolved in benzene. This solution was repeatedly extracted with hot water to remove excess phenoxy acetic acid. The benzene layer was dried over sodium sulfate and the solvent removed to give 5.7 g of crude product. A pure sample of the title compound was obtained using high pressure preparative liquid chromatography (silica gel/3% methanol/methylene chloride).

EXAMPLE 42

Preparation of the compound having the formula

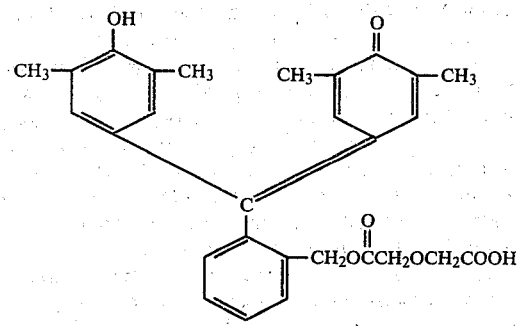

(a) Into a 2 liter flask, equipped with a nitrogen inlet, a mechanical stirrer and a thermometer, was placed 9.52 g (0.0264 M) of 3',3",5',5"-tetramethylphenolphthalan, 41.2 g (0.63 M) of zinc dust and 300 ml acetic acid. A mild exotherm was noticed (31° C.). The grey slurry was stirred at room temperature for 6 hours, filtered and the filtrate was slowly added to 2 liters of water. The resulting white precipitate was collected by filtration, dissolved in hot methylene chloride, filtered through sodium sulfate and allowed to crystallize overnight. After isolation and drying, 6.6 g of the corresponding 3',3",5',5"-tetramethylphenolphthalol was obtained as off-white crystals. An additional quantity of the said phthalol was prepared by the above procedure.

(b) Into a one liter flask equipped with a magnetic stirring bar, a nitrogen inlet and a distillation head, was added 500 ml of dry toluene, 21.59 g (0.185 M) of diglycolic anhydride, and a small amount of p-toluenesulfonic acid monohydrate ("tip of spatula"). This mixture was heated to its boiling point. After about 50 ml of toluene-water azeotrope had been removed, 8.29 g (0.018 M) of 3',3",5',5"-tetramethylphenolphthalol was added to the hot solution; heating was resumed and about 70 ml of distillate was removed. After heating the solution under reflux conditions for 4 hours, the toluene was removed. The residue was taken up in methylene chloride and extracted three times with a total of 750 ml of water. The organic layer was dried over sodium sulfate, filtered, and the solvent removed to give 9 g of material comprising the corresponding phthalol acyl derivative of the formula

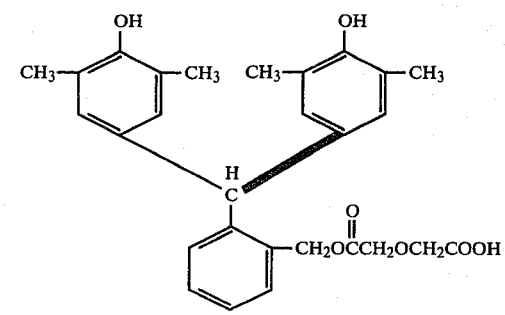

This material was obtained as a light yellow froth and was used without further purification.

(c) To a stirred slurry of the phthalol acyl derivative obtained in step b (7.4 g; 0.0155 M), sodium bicarbonate (6.51 g; 0.078 M) and water (200 ml) was added dropwise, a solution of 4.44 g (0.018 M) iodine in 175 ml methylene chloride. After a total of 20 minutes of stirring at room temperature, the aqueous layer was separated and neutralized by adding it to one liter of water containing 15 ml concentrated hydrochloric acid. The aqueous fraction was extracted with methylene, chloride, the organic layer was dried over sodium sulfate and the solvent was removed in vacuo. The dark orange residue was purified via medium pressure column chromatography (silica gel) methanol-methylene chloride; methanol content varied from 0.5–2%). The title compound was isolated as an orange glass. (λmax 424 nm, Epsilon 22,500 as measured in ethanol)

The 3',3'',5',5''-tetramethylphenolphthalan used in the foregoing example was prepared according to the procedure given in step a of Example 37 using 2'-tetrahydropyranyl-4-bromo-2,6-dimethylphenyl ether.

EXAMPLE 43

Preparation of the compound having the formula

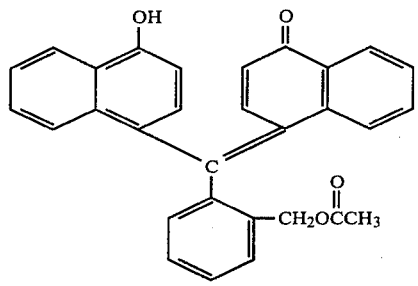

(a) Lithium aluminum hydride (0.2 g) was added to 35 ml of anhydrous tetrahydrofuran at room temperature under nitrogen. To this stirred mixture was added a 30 ml solution of 1.0 g of 3,3-bis-[4'-(2''-tetrahydropyranyloxy)-1'-naphthyl)]-phthalide in tetrahydrofuran dropwise. Upon completion of addition, TLC on silica gel with ether showed the reaction was complete. Ethylacetate was added dropwise until the exotherm and hydrogen evolution ceased. The reaction mixture was poured into water, made pH 6 with HCl and extracted with ether. The ether was evaporated to yield a yellow solid. A sample of the yellow solid was dissolved in methanol and a drop of conc. HCl was added. A yellow-green color developed. The resulting solution was refluxed for 10 minutes, and TLC on silica gel with 1:1 ether/petroleum ether showed that deblocking of the 2''-tetrahydropyranyl protecting groups from the naphtholic—OH groups was complete. The methanol was then removed under vacuum to give the 1-naphthol phthalan.

(b) Glacial acetic acid was added to the 1-naphthol phthalan prepared in step (a) along with several drops of borontrifluoride etherate solution. An intense green color formed. The reaction solution was heated on a steam bath until a yellow-green color began to develop (about 15 minutes), then poured into water and extracted with ether. The ether was evaporated, and TLC on the residue using silica gel with 1:1 ether/petroleum ether showed many spots. The spot that was orange-brown on drying and turned blue with sodium hydroxide solution was the title compound which was isolated and purified using preparative TLC techniques.

The compounds of formula (V) may be prepared by reacting the selected 3,3-disubstituted phthalide (phthalein) with R'''NH$_2$ to give the corresponding phthalimidine followed by reduction with diborane in tetrahydrofuran solution to the corresponding iso-indoline which is reacted with the appropriate chloroformate to yield the triarylmethane dye product. This synthesis is illustrated below employing phenolphthalein as the phthalide starting material.

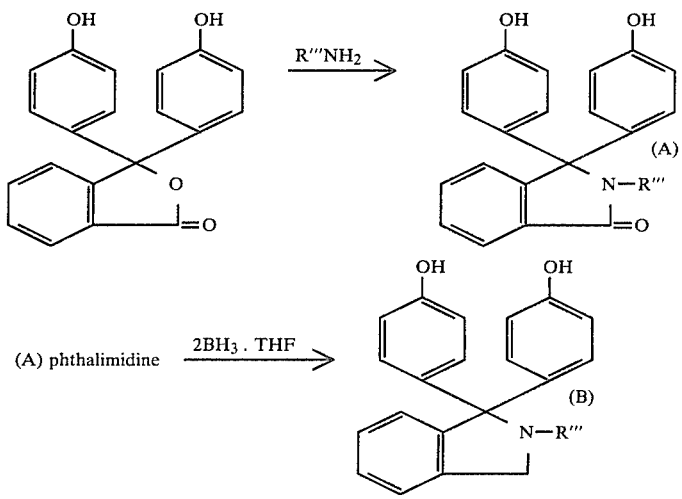

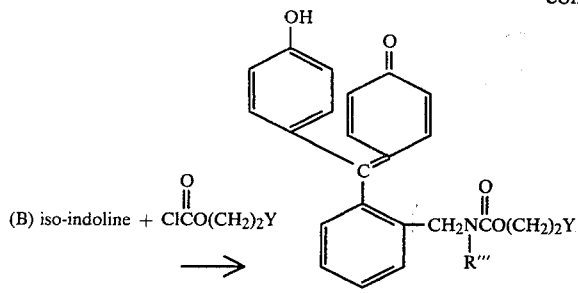

(B) iso-indoline + ClCO(CH₂)₂Y →

R‴ and Y have the same meaning given in formula V.

The chloroformates and the 3,3-disubstituted phthalides may be prepared as described above.

The following example is given to further illustrate the preparation of the compounds of formula (V).

EXAMPLE 44

Preparation of the compound having the formula

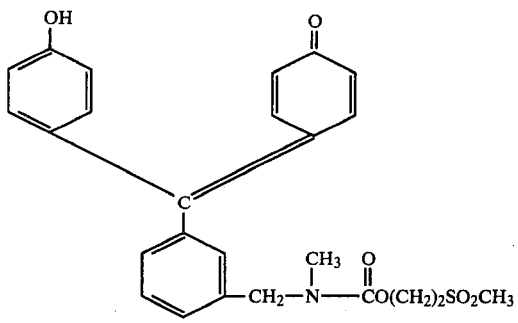

(a) Phenolphthalein (100 g) was stirred at room temperature with 500 g of 40% methylamine solution for 5 days. (After stirring for 48 hours, the pink color had disappeared and a white flocculant solid had precipitated.) The white solid was filtered, air-dried and crystallized from isopropanol to yield 39.7 g of N-methylphenolphthalimidine. The filtrate was placed in the refrigerator and afforded an additional 27.6 g of the phthalimidine to give a total yield of 67.3 g.

(b) Diborane (200 ml) as a solution 1 M in BH₃ in tetrahydrofuran and 300 ml of dry tetrahydrofuran were charged into a three neck flask equipped with thermometer, condenser, dropping funnel and overhead stirred under an atmosphere of nitrogen. The flask was cooled in an ice bath to 0°-5° C., and 16.6 g of the compound of step (a) in 100 ml dry tetrahydrofuran was added dropwise, the temperature being maintained between 0° and 5° C. The reaction mixture became cloudy and then a white precipitate was observed. After addition was complete the flask was allowed to warm to room temperature and then heated to reflux for 24 hours. The white precipitate gradually dissolved, but a small amount of gummy material remained after 24 hours. The reaction mixture was cooled in an ice bath, carefully treated with 120 ml of 6 N HCl and stirred until a clear lightly pink solution resulted. The solvent was removed under vacuum leaving a pink solid. The solid was heated to boiling in 150 ml water and 8.3 ml conc. HCl (color faded to white solid) and allowed to stand in the refrigerator over the weekened. The white solid was suspended in 100 ml water and 200 ml ether and treated with 12.6 g of sodium bicarbonate. The solid dissolved in the ether layer. The ether layer was separated and the aqueous layer re-extracted with 100 ml of ether. The combined ether extracts were dried over sodium sulfate, the solvent removed leaving a tacky solid which was crystallized from benzene to give 13.17 g of N-methyl-bis-(4'-hydroxy-1'-phenyl)-iso-indoline, (melting range 186°-8° C.).

(c) β-(methylsulfonyl)ethylchloroformate (196 mg) in 8 ml of toluene was added dropwise over 20 minutes to a refluxing solution of 317.3 mg of the compound prepared in step (b) in 15 ml toluene. The yellow mixture was allowed to stir under reflux for an additional hour after addition was complete. The reaction mixture was a deep yellow. TLC on a sample using silica gel and 10% methanol/chloroform showed 3 major components and 2 minor components. The yellow spot representing the title compound when treated with 1 N NaOH produced a magenta color which bleached in approximately 5 seconds. The solvent was removed from the remaining reaction mixture under vacuum to give a yellow solid. Preparative TLC with 150 mg of solid in 4 ml tetrahydrofuran using 10% methanol/chloroform gave a yellow band which was separated and washed with acetone to yield approximately 5 mg of the title compound.

The compounds of formula III may be prepared by reacting phenolphthalin with an excess of thionyl chloride to give the corresponding carbonyl chloride; reacting the carbonyl chloride with the selected amine, RNH₂, to give the corresponding monoamide; blocking the functional —OH and other —OH substituents with the appropriate protecting group; treating the protected compound with butyllithium and reacting with the selected chloroformate, ClCO₂(CH₂)₂Y, to give the leuco dye precursor; and after removing the protecting groups with weak acid, oxidizing the leuco dye with, for example, 2,3-dichloro-5,6-dicyano-1,4-benzoquinone to yield the dye product. This synthesis is illustrated below employing phenolphthalin as the starting material.

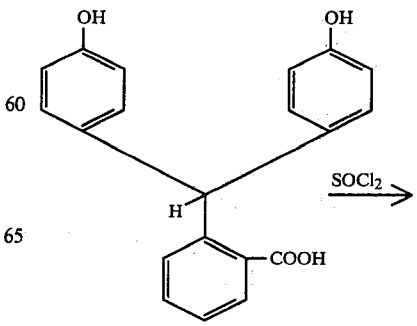

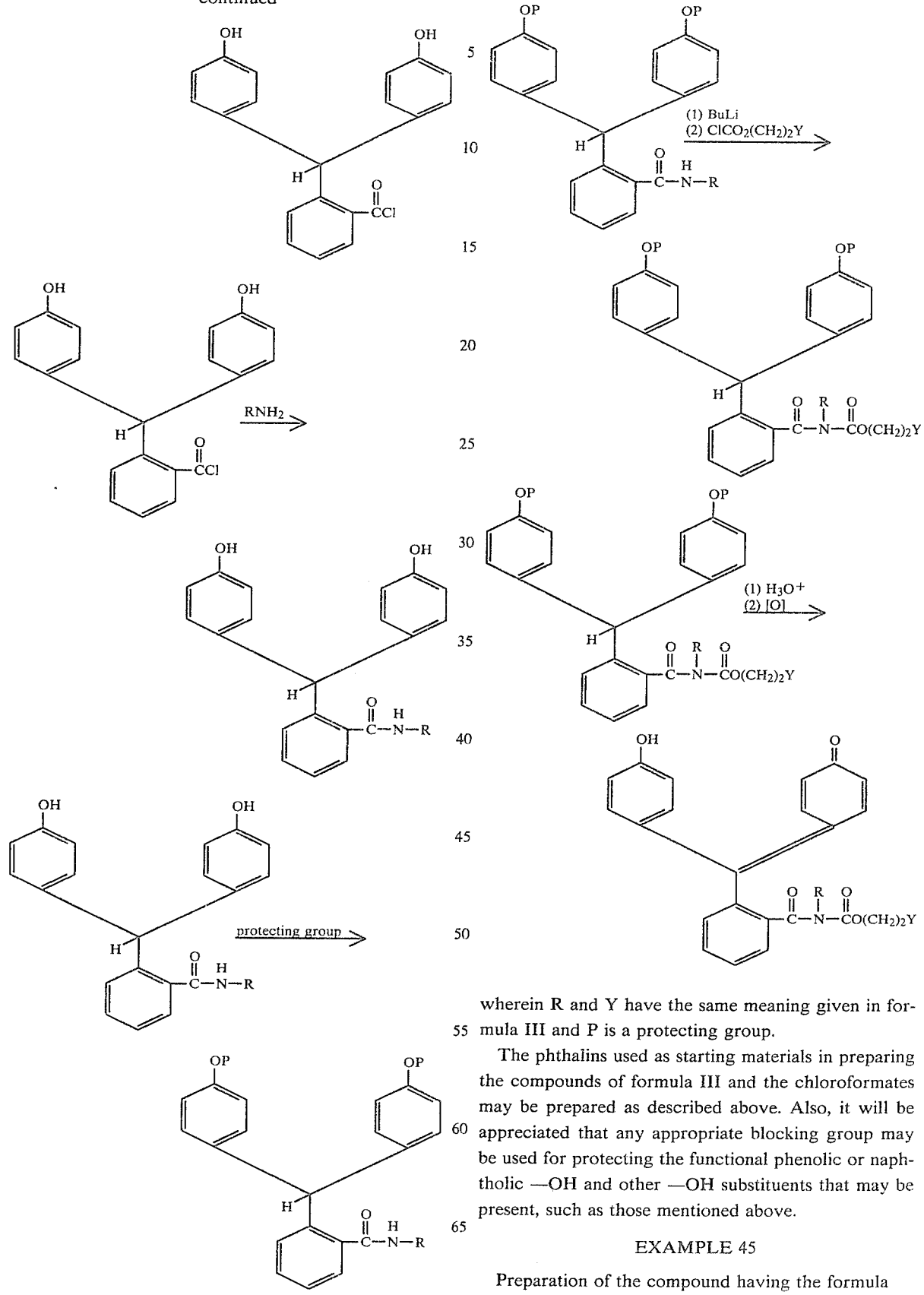

wherein R and Y have the same meaning given in formula III and P is a protecting group.

The phthalins used as starting materials in preparing the compounds of formula III and the chloroformates may be prepared as described above. Also, it will be appreciated that any appropriate blocking group may be used for protecting the functional phenolic or naphtholic —OH and other —OH substituents that may be present, such as those mentioned above.

EXAMPLE 45

Preparation of the compound having the formula

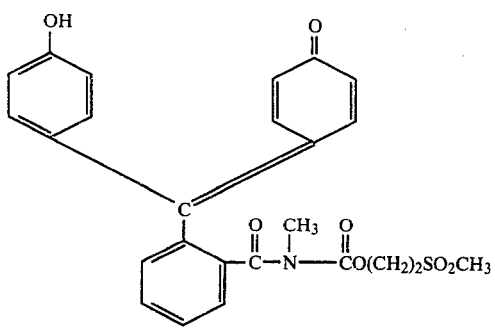

(a) The acid chloride of the formula

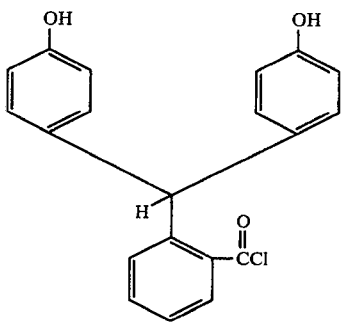

was prepared in quantitative yield by refluxing 10.0 g of phenolphthalin in excess thionyl chloride for two hours. Removal of thionyl chloride by distillation at atmospheric, then reduced pressure provided a viscous, yellow syrup used directly in the next step. (theoretical yield of acid chloride=10.2 g; the crude product weighed 15.1 g).

(b) A solution of 15.1 g of the crude acid chloride prepared in step (a) dissolved in ether was added dropwise to a cold ether solution of methyl amine (presaturated at 0° C.). Neutralization with hydrochloric acid, followed by two recrystallizations from aqueous ethanol gave 5.68 g of the corresponding amide, melting range 255°–258° C. Infrared and nmr spectra were consistent with, and supportive of, the desired structure.

(c) The phenolic functions of the amide prepared in step (b) were blocked by treating 5.68 g (0.017 mole) of the amide with 2.2 equivalents of t-butyldimethylsilyl chloride and 4.4 equivalents of imidazole in 60 ml of dry N,N-dimethylformamide at room temperature overnight. Reaction solids were collected by filtration and washed with water. Recrystallization from ethanol gave 5.0 g of the blocked product, melting range 175°–178° C. Infrared and nmr spectra were consistent with, and supportive of, the desired structure.

(d) The blocked compound prepared in step (c), 3.89 g (0.007 mole) was treated with 1.2 equivalents of n-butyllithium in dry tetrahydrofuran at −65° C. This cold solution was added to a cold (−65° C.) solution of 1.5 equivalents of the chloroformate, $ClCO_2(CH_2)_2SO_2CH_3$, also in dry tetrahydrofuran. Work-up, including high pressure column chromatography, provided 1.23 g (25% yield) of the compound

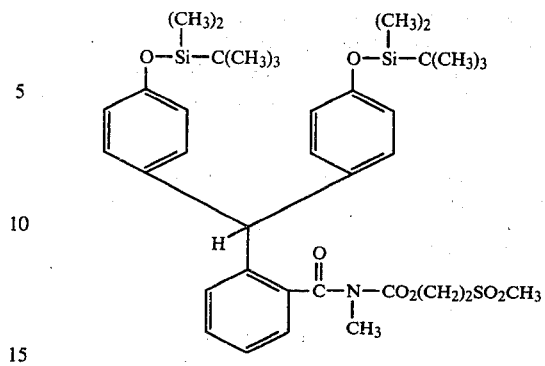

as a straw syrup. Infrared and nmr spectra were consistent with, and supportive of, the desired structure.

(e) The compound prepared in step (d) was reacted with methanolic hydrogen chloride at room temperature overnight to effect the desired cleavage of the silyloxy protecting groups. The deblocked compound was obtained as a white solid, 0.41 g (50% yield). Infrared and nmr spectra were consistent with, and supportive of, the assigned structure.

(f) Oxidation of the deblocked compound of step (e) with 2,3-dichloro-5,6-dicyano-1,4-benzoquinone followed by work-up which included intermediate pressure column chromatography gave the title compound as an amorphous orange solid. This material was further purified using preparative TLC (silica gel/95:5 $CH_2Cl_2$:MeOH). Infrared and nmr spectra were consistent with, and supportive of, the assigned structure.

The title compound gave yellow solutions in methanol and acetone. Addition of aqueous base (1 N NaOH) instantly produced magenta coloration, which rapidly and irreversibly bleached to colorless.

A sample of an acetone solution of the purified dye compound was added to fresh pH=12 buffer and the first half-life (T ½) and the second half-life (T ½) were measured giving the following results wherein OD refers to optical density. By T ½ is meant the time measured for one-half of said colored compound to decolorize.

EXPERIMENT 1

1st T ½ = 10.0 sec.
2nd T ½ = 8.5 sec.
Initial OD≅2.20 extrapolated from OD=2.00 at 1.5 sec.
Final OD=0.02

EXPERIMENT 2

1st T ½ = 9.5 sec.
2nd T ½ = 8.5 sec.
Initial OD=1.15 extrapolated from OD=0.90 at 3.0 sec.
Final OD=0.01

The λmax of the pure title compound was 560 nm as measured in acetone—pH 12 buffer, and the T ½ values were measured at this wavelength. Also, a sample of the title compound dissolved in methanol was treated with aqueous 1 N NaOH, and after decolorization, the cleavage product was compared to a known sample and was found to be the same.

The compounds as represented in formulae (II), (IV) and (V) form the subject matter of copending U.S. Patent Application Ser. Nos. 106,904, 106,900, and 106,899, respectively, of James W. Foley filed Dec. 26, 1979. The compounds as represented in formulae (III) form the subject matter of copending U.S. Patent Application Ser. No. 152,181 of James W. Foley filed concurrently herewith. For convenience, the specifications of these applications are specifically incorporated herein.

As noted previously, the dyes of the present invention have the ability to decolorize completely and irreversibly in base by undergoing an irreversible cleavage reaction within a predetermined time at a predetermined pH to give a new colorless compound which remains colorless at the pH's normally encountered during processing subsequent to "bleaching" so that the new compound may be retained in a photographic film unit, e.g., a photosensitive element without the possibility of color reappearing in time. Typically, dyes may be selected for use as antihalation dyes, e.g., in a non-light-sensitive layer positioned intermediate a photosensitive silver halide emulsion layer and the support. Also, dyes may be selected for use as color correction filter dyes where absorption of light within a particular wavelength range during exposure is desirable for achieving appropriate color balance.

Illustrative film units in which the dyes of the present invention may be advantageously used as antihalation dyes are described, for example, in British Patent No. 1,482,156. These film units comprise, in the order in which incident light passes therethrough, an additive multicolor screen, a photosensitive silver halide emulsion layer, an antihalation layer in which the selected compound may be disposed, and preferably, an image-receiving layer. As described therein, exposure of the silver halide layer is accomplished through the screen which possesses optical filter elements selectively transmitting predetermined portions of incident radiation, e.g., red, green and blue light, to the underlying photosensitive silver halide layer. Upon photographic processing with an aqueous alkaline processing composition, soluble silver complex is transferred by diffusion and deposited in a superposed image-receiving layer as a function of the degree of exposure of silver halide behind each filter element. The silver image thus formed may then serve to modulate the quantity of light passing through the filter elements in the reverse direction during projection through a transparent support.

In a preferred embodiment, the image-receiving layer is intermediate the photosensitive silver halide emulsion layer and the additive multicolor screen and remains in position as part of an integral film unit prior to, during and after formation of the image. The antihalation dye is disposed in a processing composition permeable layer adjacent to the photosensitive layer on the side opposite the screen and serves to prevent the reflection or backscattering of incident light which has passed through the photosensitive layer thereby eliminating the exposure of silver halide grains in the photosensitive layer other than those within the intended photoexposure path.

As noted above, the dyes of the present invention also are useful as color correction filter dyes in photographic film units comprising multilayered, multicolor photosensitive elements employing a blue-, a green-, and a red-sensitive silver halide layer, and particularly in integral negative-positive diffusion transfer film units wherein the image-receiving layer carrying the color transfer image is not separated from the developed photosensitive layers after processing but both components are retained together as a permanent laminate. Included as part of the laminate is a layer of light-reflecting material, preferably titanium dioxide, positioned between the image-carrying layer and the developed photosensitive layer(s). The light-reflecting layer separating the image-carrying and photosensitive components provides a white background for the transfer image and masks the developed photosensitive layer(s). In addition to these layers, the laminate usually includes dimensionally stable outer layers or supports, at least one of which is transparent so that the resulting transfer image may be viewed by reflection against the background provided by the light-reflecting layer.

Illustrative of patents describing such film units are U.S. Pat. No. 2,983,606 issued Mar. 9, 1961 to Howard G. Rogers, U.S. Pat. Nos. 3,415,644, 3,415,645 and 3,415,646 issued Dec. 10, 1968 to Edwin H. Land, U.S. Pat. Nos. 3,594,164 and 3,594,165 issued July 20, 1971 to Howard G. Rogers, and U.S. Pat. No. 3,647,437 issued Mar. 7, 1972 to Edwin H. Land. Copending U.S. Patent application Ser. No. 537,124 of Edwin H. Land is concerned with multicolor diffusion transfer film units, wherein a layer of a dye, preferably a dye bleachable by the processing composition, is so positioned that photoexposure is effected therethrough, whereby said dye layer is effective as a color correction filter. For convenience, the specification of this application is specifically incorporated herein.

Whether used as antihalation dyes, color correction filter dyes or in other conventional photographic light-screening applications, the dyes of the present invention when disposed in a processing composition-permeable layer are completely and irreversibly decolorized by contacting with an aqueous alkaline processing composition for the time necessary for converting the colored dye compound to the new colorless ring-closed compound. The time required for decolorization, i.e., for conversion of the colored compound to the colorless product via said irreversible cleavage reaction may be measured at any given alkaline pH, and for a selected decolorization time, the pH of the processing composition contacted with and remaining in contact with the colored filter dye should be at least as high as that predetermined to give the selected decolorization time. In terms of $T \frac{1}{2}$, the preferred compounds have a half-life ($T \frac{1}{2}$) in approximately 1 N NaOH of about 30 seconds or less. By $T \frac{1}{2}$ is meant the time measured for one-half of said colored dye to decolorize.

The dyes of the present invention may be incorporated into the appropriate layer of the photographic film unit using any of the techniques known in the art. For instance, the selected compound can be dissolved in the appropriate solvent and then dispersed, in the presence of a wetting agent if desired, in a coating solution containing a hydrophilic colloid binder, e.g., gelatin, and the resulting coating solution applied as the desired layer, for example, coated on a transparent support to provide an antihalation layer, or coated over the outermost photosensitive layer of a multilayered, multicolor photosensitive element to provide a color correction filter layer through which photoexposure is made. The concentration of compound in the layer will vary depending upon the product in which the filter layer is to be used and may be readily determined empirically to provide the optical density necessary for the specific use. It will be appreciated that the dyes of the present invention may be used in combination with each other and also may be used in combination with other classes of dyes previously employed in antihalation, color correction and other filter layers.

FIG. 1 of the accompanying drawing, which illustrates one embodiment of the present invention, is an enlarged cross-sectional view of an integral diffusion transfer film unit comprising a transparent film base or support 1 carrying on one surface, in order, additive multicolor screen 3 comprising a plurality of primary red color filter elements, a plurality of primary green color filter elements and a plurality of blue color filter elements arranged in a geometrically repetitive distribution in side-by-side relationship in substantially a single plane, photoinsensitive layer 5 carrying silver precipitating nuclei, photosensitive layer 7 containing silver halide crystals and antihalation layer 9 containing one or more light-screening dyes of the present invention.

As discussed in aformentioned British Patent No. 1,482,156, the degree of light absorption of the antihalation layer in such film units can vary over a relatively wide range, but usually, the antihalation layer possesses a transmission density range from about 0.4 to 1.4. Preferably, the transmission density is greater than 0.6 so that in the event a plurality of film units is employed in a stacked relationship during photoexposure, the antihalation layer will have sufficient density, i.e., light-absorbing capacity to substantially prevent reflectance as well as prevent exposure of underlying film units.

In determining the appropriate light-absorbing capacity for cyan, magenta and yellow for color correction purposes, "color compensating" filters as conventionally used in front of the camera lens may be employed in the usual manner as a convenient method of approximating the type and quantity of filtration which it would be desirable to provide. A layer containing the appropriate color correction dye(s) in a corresponding density may then be provided as a layer through which photoexposure is to be made.

Multicolor diffusion transfer images may be obtained using a variety of arrangements of the image-receiving layer and the silver halide emulsions. Thus, these layers may be carried by a common support brought into superposition after photoexposure. A particularly advantageous film structure is shown in U.S. Pat. No. 3,415,644 wherein the requisite layers are in superposed relationship prior to and during photoexposure, and these layers are maintained in superposed relationship as a permanent laminate after processing and image formation. Such film units typically contain an outer transparent layer or support through which photoexposure is effected and the final multicolor image viewed, and another outer layer or support carrying at least the photosensitive layers, the latter support being opaque. While these supports or sheet-like elements may simply be held in superposed relationship, e.g., by a binding tape around the edges, in the preferred embodiment these elements are laminated together prior to photoexposure. This prelamination provides a number of benefits, both during manufacture and in photoexposure. Following exposure, the elements are delaminated by the distribution of a fluid processing composition which, upon solidification, bonds the elements together to form the desired permanent laminate. Procedures for forming such prelaminated film units wherein the two elements are temporarily laminated together prior to exposure are described, for example, in U.S. Pat. No. 3,625,231 to Albert J. Bachelder and Frederick J. Binda, and U.S. Pat. No. 3,652,282 to Edwin H. Land, both issued Mar. 28, 1972 and in U.S. Pat. No. 3,793,023 issued to Edwin H. Land on Feb. 19, 1974.

Figure 2:
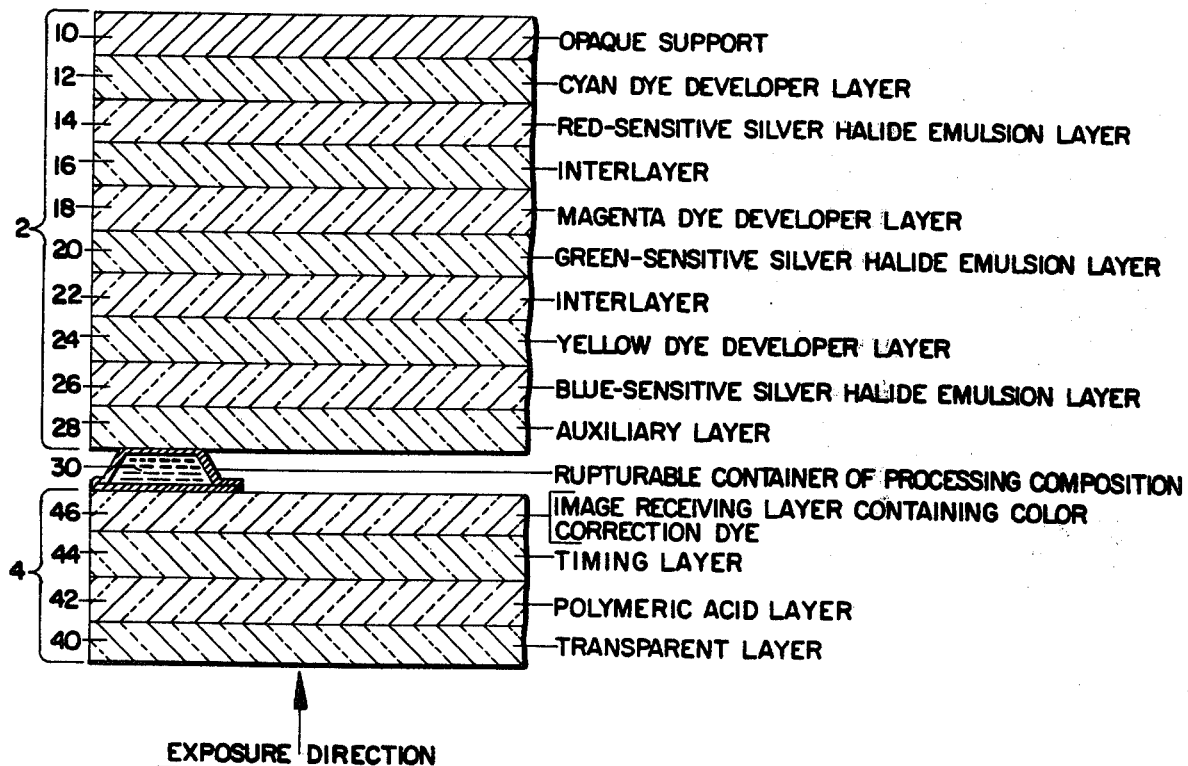
FIG. 2 is a diagrammatic, enlarged cross-sectional view of another diffusion transfer film unit incorporating a dye of the present invention as a color correction filter dye in the image-receiving layer.

Further description of this embodiment of the present invention may be facilitated by reference to FIG. 2 of the accompanying drawing which illustrates a diffusion transfer film unit adapted to provide integral negative-positive reflection prints and employing dye developers as the image dyes.

FIG. 2 illustrates a diffusion transfer film unit comprising a photosensitive element or component 2, a rupturable container 30, and an image-receiving element or component 4. The photosensitive element 2 comprises an opaque support 10 carrying, in turn, a cyan dye developer layer 12, a red-sensitive sliver halide emulsion layer 14, an interlayer 16, a magenta dye developer layer 18, a green-sensitive silver halide emulsion layer 20, an interlayer 22, a yellow dye developer layer 24, a blue-sensitive silver halide emulsion layer 26, and an auxiliary layer 28. The positive or image-receiving element 4 comprises a transparent support 40 carrying, in turn, a polymeric acid layer 42, a timing layer 44 and an image-receiving layer 46 having dispersed therein a bleachable dye of this invention as a color correction filter dye. The two elements are held in superposed, registered relationship, e.g., by a binding tape (not shown), so that photoexposure of the silver halide emulsion layers is effected through image-receiving layer 46 containing the bleachable dye. The rupturable container 30 contains a processing composition and is so positioned that, upon rupture the processing composition is distributed between the superposed elements 2 and 4. By including in the processing composition a light-reflecting pigment, preferably titanium dioxide, a light-reflecting layer may be provided against which the transfer image formed in the image-receiving layer 46 may be viewed. The developed photosensitive layers are masked from view by the light-reflecting layer and remain with the receiving layer 46 as part of a permanent laminate. The rupturable container 30 is of the type shown in U.S. Pat. No. 2,543,181 and is positioned adjacent the leading edge of the film unit.

In the processing of the film unit, the film unit is advanced relative to and between a pair of pressure-applying members which apply compressive pressure to the rupturable container 30 to eject its liquid contents between the photosensitive and image-receiving components 2 and 4 and then distribute the mass of liquid between the sheets toward the trailing ends thereof to form a layer of substantially uniform, predetermined thickness at least co-extensive with the image area. In order to insure sufficient processing liquid to form a layer of the required area and thickness between the sheets, excess processing liquid may be provided in container 30 and trapping means (not shown) provided for collecting and retaining excess processing liquid overrun. Details of the various layers of this and of the film unit of FIG. 1 may be found in the herein cited patents and applications and need not be recited here.

Processing of film units of the type described in FIG. 2 is initiated by distributing the processing composition between predetermined layers of the film unit. In exposed and developed areas, the dye developer will be immobilized as a function of development. In unexposed and undeveloped areas, the dye developer is unreacted and diffusible, and this provides an image-wise distribution of unoxidized dye developer, diffusible in the processing composition, as a function of the point-to-point degree of exposure of the silver halide layer. The desired transfer image is obtained by the diffusion transfer to the image-receiving layer of at least part of this imagewise distribution of unoxidized dye developer. In the illustrated embodiment, the pH of the photographic system is controlled and reduced by the neutralization of alkali after a predetermined interval, in accordance with the teachings of the above noted U.S. Pat. No. 3,615,644, to reduce the alkalinity to a pH at which the unoxidized dye developer is substantially insoluble and non-diffusible. As will be readily recognized, the details of such processes form no part of the present invention but are well known; the previously noted U.S. patents may be referred to for more specific discussion of such processes.

Multicolor images may be obtained by providing the requisite number of differentially exposable silver halide emulsions, and said silver halide emulsions are most commonly provided as individual layers coated in superposed relationship. Film units intended to provide multicolor images comprise two or more selectively sensitized silver halide layers each having associated therewith an appropriate image dye-providing material providing an image dye having spectral absorption characteristics substantially complementary to the light by which the associated silver halide is exposed. The most commonly employed negative components for forming multicolor images are of the "tripack" structure and contain blue-, green-, and red-sensitive silver halide layers each having associated therewith in the same or in a contiguous layer a yellow, a magenta and a cyan image dye-providing material respectively. Interlayers or spacer layers may, if desired, be provided between the respective silver halide layers and associated image dye-providing materials or between other layers. Integral multicolor photosensitive elements of this general type ar disclosed in U.S. Pat. No. 3,345,163 issued Oct. 3, 1967 to Edwin H. Land and Howard G. Rogers as well as in the previously noted U.S. patents, e.g., in FIG. 9 of the aforementioned U.S. Pat. No. 2,983,606.

A number of modifications to the structures described in connection with FIG. 2 will readily suggest themselves to one skilled in the art. Thus, for example, the multicolor multilayer negative may be replaced by a screen-type negative as illustrated in U.S. Pat. No. 2,968,554 issued Jan. 17, 1961 to Edwin H. Land and in the aforementioned U.S. Pat. No. 2,983,606 particularly with respect to FIG. 3 thereof.

The image dye-providing materials which may be employed in such processes generally may be characterized as either (1) initially soluble or diffusible in the processing composition but are selectively rendered non-diffusible in an imagewise pattern as a function of development; or (2) initially insoluble or non-diffusible in the processing composition but which are selectively rendered diffusible or provide a diffusible product in an imagewise pattern as a function of development. These materials may be complete dyes or dye intermediates, e.g., color couplers. The requisite differential in mobility or solubility may, for example, be obtained by a chemical action such as a redox reaction or a coupling reaction.

As examples of initially soluble or diffusible materials and their application in color diffusion transfer, mention may be made of those disclosed, for example, in U.S. Pat. Nos. 2,774,668; 2,968,554; 2,983,606; 3,087,817; 3,185,567; 3,230,082; 3,345,163; and 3,443,943. As examples of initially non-diffusible materials and their use in color transfer systems, mention may be made of the materials and systems disclosed in U.S. Pat. Nos. 3,185,567; 3,719,489; 3,443,939; 3,443,940; 3,227,550; 3,227,552; and 4,076,529. Many types of image dye-providing substances and film units useful therewith also are discussed in the aforementioned U.S. Pat. No. 3,647,437 to which reference may be made.

It is also to be understood that "direct positive" silver halide emulsions may also be used, depending upon the particular image dye-providing substances employed and whether a positive or negative color transfer image is desired.

A preferred opacification system to be contained in the processing composition to effect processing outside of a camera is that described in the above-mentioned U.S. Pat. No. 3,647,437, and comprises a dispersion of an inorganic light-reflecting pigment which also contains at least one light-absorbing agent, i.e., optical filter agent, at a pH above the pKa of the optical filter agent in a concentration effective when the processing composition is applied, to provide a layer exhibiting optical transmission density > than about 6.0 density units with respect to incident radiation actinic to the photosensitive silver halide and optical reflection density < than about 1.0 density units with respect to incident visible radiation.

In lieu of having the light-reflecting pigment in the processing composition, the light-reflecting pigment used to mask the photosensitive strata and to provide the background for viewing the color transfer image formed in the receiving layer may be present initially in whole or in part as a preformed layer in the film unit. As an example of such a preformed layer, mention may be made of that disclosed in U.S. Pat. No. 3,615,421 issued Oct. 26, 1971 and in U.S. Pat. No. 3,620,724 issued Nov. 16, 1971, both in the name of Edwin H. Land. The reflecting agent may be generated in situ as is disclosed in U.S. Pat. Nos. 3,647,434 and 3,647,435, both issued Mar. 7, 1972 to Edwin H. Land.

The dye developers (or other image dye-providing substances) are preferably selected for their ability to provide colors that are useful in carrying out subtractive color photograghy, that is, the previously mentioned cyan, magenta and yellow. They may be incorporated in the respective silver halide emulsion or, in the preferred embodiment, in a separate layer behind the respective silver halide emulsion. Thus, a dye developer may, for example, be in a coating or layer behind the respective silver halide emulsion and such a layer of dye developer may be applied by use of a coating solution containing the respective dye developer distributed, in a concentration calculated to give the desired coverage of dye developer per unit area, in a film-forming natural, or synthetic, polymer, for exmple, gelatin, polyvinyl alcohol, and the like, adapted to be permeated by the processing composition.

Dye developers, as noted above, are compounds which contain the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

The image-receiving layer may comprise one of the materials known in the art, such as polyvinyl alcohol, gelatin, etc. It may contain agents adapted to mordant or otherwise fix the transferred image dye(s). Preferred materials comprise polyvinyl alcohol or gelatin containing a dye mordant such as poly-4-vinylpyridine, as disclosed in U.S. Pat. No. 3,148,061 and graft copolymers containing 4-vinylpyridine as disclosed in U.S. Pat. No. 3,756,814.

In the various color diffusion transfer systems which have previously been described and which employ an aqueous alkaline processing fluid, it is well known to employ an acid-reacting reagent in a layer of the film unit to lower the environmental pH following substantial dye transfer in order to increase the image stability and/or to adjust the pH from the first pH at which the image dyes are diffusible to a second (lower) pH at which they are not. For example, the previously mentioned U.S. Pat. No. 3,415,644 discloses systems wherein the desired pH reduction may be effected by providing a polymeric acid layer adjacent the dyeable stratum. These polymeric acids may be polymers which contain acid groups, e.g., carboxylic acid and sulfonic acid groups, which are capable of forming salts with alkali metals or with organic bases; or potentially acid-yielding groups such as anhydrides or lactones. Preferably the acid polymer contains free carboxyl groups. Alternatively, the acid-reacting reagent may be in a layer adjacent to the silver halide most distant from the image-receiving layer, as disclosed in U.S. Pat. No. 3,573,043 issued Mar. 30, 1971 to Edwin H. Land. Another system for providing an acid-reacting reagent is disclosed in U.S. Pat. No. 3,576,625 issued Apr. 27, 1971 to Edwin H. Land.

An inert interlayer or spacer layer may be and is preferably disposed between the polymeric acid layer and the dyeable stratum in order to control or "time" the pH reduction so that it is not premature and interferes with the development process. Suitable spacer or "timing" layers for this purpose are described with particularity in U.S. Pat. Nos. 3,362,819; 3,419,389; 3,421,893; 3,455,686; and 3,575,701.

While the acid layer and associated spacer layer are preferably contained in the positive component employed in systems wherein the dyeable stratum and photosensitive strata are contained on separate supports, e.g., between the support for the receiving element and the dyeable stratum; or associated with te dyeable stratum in those integral film units, e.g., on the side of the dyeable stratum opposed from the negative components, they may, if desired, be associated with the photosensitive strata, as is disclosed, for example, in U.S. Pat. Nos. 3,362,821 and 3,573,043. In film units such as those described in the aforementioned U.S. Pat. Nos. 3,594,164 and 3,594,165, they also may be contained on the spreader sheet employed to facilitate application of the processing fluid.

As is now well known and illustrated, for example, in the previously cited patents, the liquid processing composition referred to for effecting multicolor diffusion transfer processes comprises at least an aqueous solution of an alkaline material, for example sodium hydroxide, potassium hydroxide, and the like, and preferably possessing a pH in excess of 12, and most preferably includes a viscosity-increasing compound constituting a film-forming material of the type which, when the composition is spread and dried, forms a relatively firm and relatively stable film. The preferred film-forming materials comprise high molecular weight polymers such as polymeric, water-soluble ethers which are inert to an alkaline solution such as, for example, a hydroxyethyl cellulose or sodium carboxymethyl cellulose. Other film-forming materials or thickening agents whose ability to increase viscosity is substantially unaffected if left in solution for a long period of time also are capable of utilization. The film-forming material is preferably contained in the processing composition in such suitable quantities as to impart to the composition a viscosity in excess of 100 cps, at a temperature of approximately 24° C. and preferably in the order of 100,000 cps to 200,000 cps at that temperature.

In particularly useful embodiments, the transparent polymeric support contains a small quantity of a pigment, e.g., carbon black, to prevent fog formation due to lightpiping by internal reflection within the transparent support, and subsequent exiting from the support surface carrying the photographic layers, of actinic light incident upon an edge thereof; such elements are described in Belgian Patent No. 777,407. The transparent support advantageously may include an ultraviolet light absorber.

cyan:

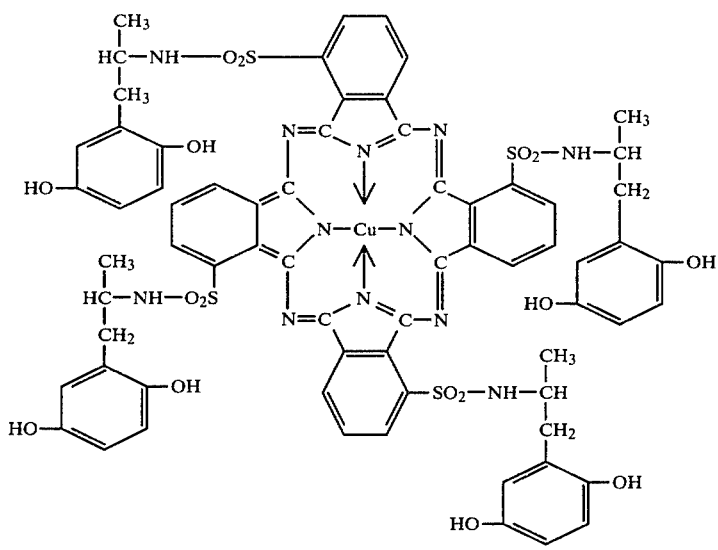

magenta:

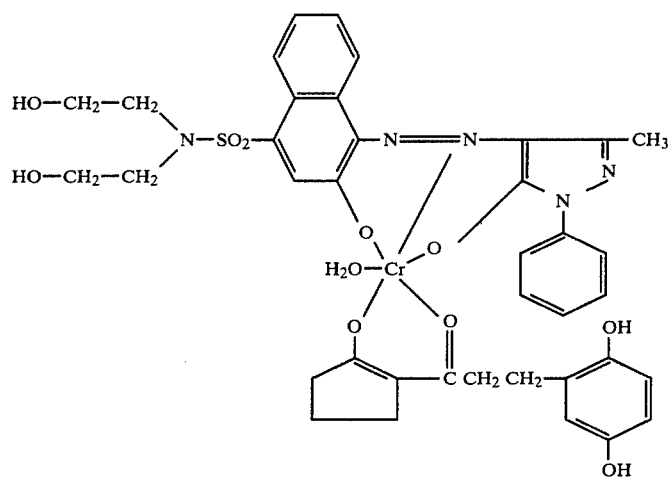

yellow:

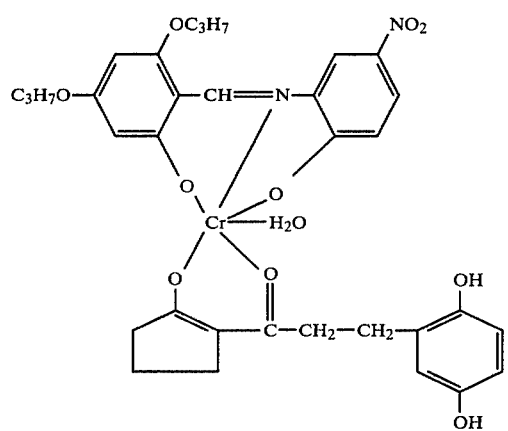

For purposes of illustrating the invention, multicolor photosensitive element using, as the cyan, magenta and yellow dye developers was prepared by coating a gelatin-subcoated 4 mil opaque polyethylene terephthalate film base with the following layers:

1. a layer of cyan dye developer dispersed in gelatin and coated at a coverage of 69 mgs./ft.$^2$ of dye and 138 mgs./ft.$^2$ of geltain, plus 4'-methylphenyl hydroquinone coated at a coverge of 6.3 mgs./ft.$^2$ and 2-phenylbenzimidazole coated at a coverge of 25.1 mgs./ft.$^2$;
2. a red-sensitive gelatino silver iodobromide emulsion coated at a coverage of 120 mgs./ft.$^2$ of silver and 72 mgs./ft.$^2$ of gelatin;
3. a layer of 60-30-4-6 tetrapolymer of butylacrylate, diacetone acrylamide, styrene and methacrylic acid and polyacrylamide coated at a coverage of 232.8 mgs./ft.² of the copolymer and 7.2 mgs./ft.² of polyacrylamide;
4. a layer of magenta dye developer dispersed in gelatin and coated at a coverage of 60 mgs./ft.² of dye and 42 mgs./ft.² of gelatin; and about 21 mgs./ft.² of 2-phenylbenzimidazole;
5. a green-sensitive gelatino silver iodobromide emulsion at a coverge of about 74 mgs./ft.² of silver and 36 mgs./ft.² of gelatin;
6. a layer containing the tetrapolymer referred to above in layer 3 plus polyacrylamide coated at a coverage of 126.9 mgs./ft.² of tetrapolymer and 8.1 mgs./ft.² of polyacrylamide; and also containing 6.6 mgs./ft.² of succindialdehyde;
7. a layer of yellow dye developer dispersed in gelatin and coated at a coverage of 90 mgs./ft.² of dye and 42 mgs./ft.² of gelatin; and also containing 19 mgs./ft.² of 2-phenylbenzimidazole;
8. a blue-sensitive gelatino silver iodobromide emulsion coated at a coverage of 119 mgs./ft.² of silver and 62 mgs./ft.² of gelatin; and also containing 19 mgs./ft.² of 4'-methylphenylhydroquinone; and
9. a layer of gelatin coated at a coverage of 45 mgs./ft.² of gelatin and also containing carbon black coated at a coverage of 4 mgs./ft.²

A transparent 4 mil polyethylene terephthalate film base was coated, in succession, with the following layers to form an image-receiving component:
1. as a polymeric acid layer, a mixture of a partial butyl ester of polyethylene/maleic anhydride copolymer and polyvinylbutyral at a ratio of about 9:1 at a coverage of about 2,500 mgs./ft.²;
2. a timing layer containing a 14:1 ratio of a 60-30-4-6 tetrapolymer of butylacrylate, diacetone acrylamide, styrene and methacrylic acid and polyvinyl alcohol at a coverage of 500 mgs./ft.²; and
3. a blend of 3 parts by weight of a 2:1 mixture, by weight, of polyvinyl alcohol and poly-4-vinylpyridine and 1 part by weight of a graft copolymer of 4-vinylpyridine and vinylbenzyltrimethylammoniumchloride grafted on hydroxyethyl cellulose in a weight ratio of 2.2/1/2.2, respectively, coated at a coverage of 300 mgs./ft.² to provide an image-receiving layer.

The aqueous alkaline processing composition comprised the following in % by weight.

| | |
|---|---|
| Water | 49.28 |
| Potassium hydroxide | 5.39 |
| Carboxymethyl hydroxyethyl cellulose | 1.79 |
| Benzotriazole | 0.77 |
| 4-aminopyrazolo-3,4-D-pyrimidine | 0.20 |
| 6-methyluracil | 0.21 |
| N-2-hydroxyethyl-N,N',N-40 - triscarboxymethyl-ethylene diamine | 0.81 |
| bis(2-aminoethyl)sulfide | 0.02 |
| Polyethylene glycol (mol. wt. 6000) | 0.50 |
| Titanium dioxide | 38.10 |
| Colloidal silica aqueous dispersion (30% SiO₂) | 1.68 |
| N-phenethyl-α-picolinium bromide | 1.25 |

To 100 gms. of the above composition was added 1.35 gms. of the pH-sensitive dye of the formula

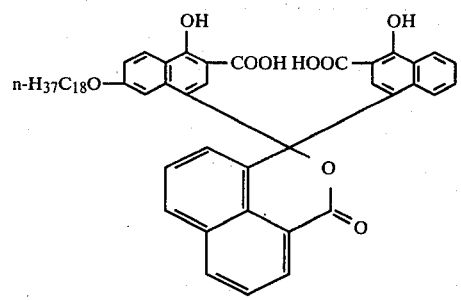

and 0.30 gms. of the pH-sensitive dye of the formula

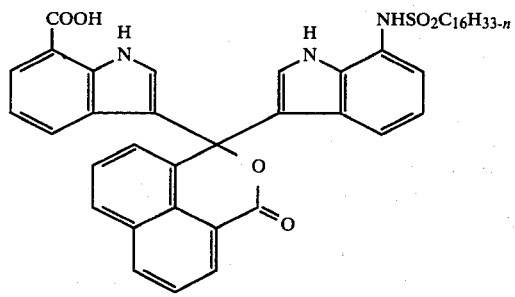

The photosensitive element was exposed to a multicolor stepwedge through the image-receiving element superposed on the photosensitive element, and a rupturable container of the processing composition attached. This assembly was passed between a pair of pressure rolls so that a layer approximately 0.003" thick of the processing composition was distributed between the gelatin overcoat layer 9 of the photosensitive element and the image-receiving layer 3 of the image-receiving element. The blue, green and red D log E curves of the resulting multicolor transfer image (control image) were prepared.

Test multicolor transfer images were prepared in the same manner described above using an identical processing composition and identical photosensitive and image-receiving elements except that the compounds prepared in Examples 16, 26, 27 and 39 above were incorporated in the image-receiving layer 3 at the coverages (mgs./ft.²) designated in Table I below. The blue, green and red D log E curves of the test images were prepared, and the speed in log E units for the blue, green and red H and D curves was measured at the 0.75 reflection density intercept of the neutral density column (0.75 Neut. Exp.) for each pair of control and test multicolor transfer images. The log E speed measurements obtained at said 0.75 reflection density-exposure intercept and the maximum and minimum reflection densities ($D_{max}$ and $D_{min}$) obtained for the blue (B), green (G), and red (R) H and D curves are set forth in Table I.

In addition to the above, test multicolor transfer images using the compounds of Examples 26 and 39 were prepared in the same manner described above, the photosensitive elements and the image-receiving elements were superimposed prior to exposure, and exposure to a multicolor stepwedge was made through the image-receiving element of the integral film unit. The log E speed measurements and the reflection densities as determined for each pair of control and test images of the integral film units also are set forth in Table I below.

TABLE I

| Example No. | Dye Coverage (mgs./ft.$^2$) | $D_{max}$ R | $D_{max}$ G | $D_{max}$ B | $D_{min}$ R | $D_{min}$ G | $D_{min}$ B | 0.75 R | Neut. G | Exp. B |
|---|---|---|---|---|---|---|---|---|---|---|
| Control | none | 2.14 | 1.95 | 2.04 | 0.22 | 0.23 | 0.20 | 1.52 | 1.52 | 1.51 |
| 16 | 4 mgs./ft.$^2$ | 2.12 | 1.93 | 2.04 | 0.22 | 0.23 | 0.20 | 1.51 | 1.46 | 1.46 |
| Control | none | 2.22 | 2.06 | 2.07 | 0.20 | 0.21 | 0.19 | 1.54 | 1.59 | 1.54 |
| 26 | 3 mgs./ft.$^2$ | 2.25 | 2.06 | 2.07 | 0.20 | 0.21 | 0.20 | 1.43 | 1.54 | 1.52 |
| Control | none | 2.13 | 1.95 | 2.08 | 0.22 | 0.23 | 0.20 | 1.55 | 1.57 | 1.53 |
| 27 | 3 mgs./ft.$^2$ | 2.14 | 1.94 | 2.09 | 0.22 | 0.22 | 0.20 | 1.52 | 1.51 | 1.44 |
| Control | none | 2.20 | 2.03 | 2.04 | 0.20 | 0.22 | 0.20 | 1.46 | 1.47 | 1.48 |
| 39 | 3 mgs./ft.$^2$ | 2.20 | 2.03 | 2.03 | 0.21 | 0.23 | 0.22 | 1.45 | 1.45 | 1.42 |
| Control 39 | 6 mgs./ft.$^2$ | 2.21 | 2.05 | 2.05 | 0.20 | 0.22 | 0.20 | 1.46 | 1.45 | 1.37 |
| Control 39 | 12 mgs./ft.$^2$ | 2.21 | 2.03 | 2.02 | 0.19 | 0.22 | 0.20 | 1.47 | 1.41 | 1.25 |
| Control* | none | 2.10 | 1.92 | 2.11 | 0.22 | 0.23 | 0.20 | 1.58 | 1.58 | 1.57 |
| 26 | 3 mgs./ft.$^2$ | 2.10 | 1.91 | 2.10 | 0.23 | 0.23 | 0.20 | 1.48 | 1.56 | 1.55 |
| Control* | none | 2.06 | 1.89 | 2.12 | 0.21 | 0.22 | 0.20 | 1.63 | 1.65 | 1.62 |
| 39 | 5 mgs./ft.$^2$ | 2.05 | 1.89 | 2.18 | 0.21 | 0.22 | 0.22 | 1.63 | 1.61 | 1.54 |

*Integral film units

It will be apparent from reference to Table I that the subject dyes were effective in absorbing radiation within a certain wavelength range in the visible region, thereby selectively shifting the color balance as evidenced by the change in log E speeds at 0.75 density. This change in color balance was achieved without adversely affecting the maximum or minimum densities. This lack of change demonstrates bleaching. In addition, it was observed that decolorization of the filter dye in the test images occurred in about 10 seconds or less.

Decolorization of the subject dyes also was observed by incorporating certain of the compounds into the image-receiving layer 3 of an image-receiving element identical to that defined above and then contacting the image-receiving element with an aqueous alkaline processing composition as defined above. The particular compounds tested, their concentration in the image-receiving layer and the solvent employed for incorporating the compound into the image-receiving layer are set forth in Table II below.

TABLE II

| Compound Ex. No. | Coverage mgs./ft.$^2$ | Solvent |
|---|---|---|
| 11 | 6 | trifluoroethanol |
| 14 | 16 | methanol |
| 16 | 4 | methanol |
| 25 | 3 | trifluoroethanol |
| 26 | 3 | ethanol |
| 27 | 3 | methanol |
| 39 | 3 | methanol |
| " | 6 | " |
| " | 12 | " |

It was observed visually that all of these compounds "bleached", i.e., decolorized in about 10 seconds or less upon contact with said aqueous alkaline processing composition.

Also, samples of the compounds prepared in Examples 24, 26 and 39 above were dissolved in a small amount of methanol, and aqueous 1N sodium hydroxide was added to each solution to decolorize the compound. After decolorization, aqueous hydrochloric acid was added to each solution to lower the pH to pH 1, and it was observed that all of the solutions remained colorless even at pH 1. Also, a solution of the compound prepared in Example 44 was completely bleached within 5 seconds when treated with aqueous 1N NaOH and remained colorless after acidifying and again treating with aqueous 1N NaOH.

The "bleaching" rates for the compounds of Examples 21, 23, 24, 39 and 41 were determined at pH=12 in terms of T ½. By T ½ is meant the time measured for one-half of the colored compound to decolorize. In making these determinations, a cell containing about 3 ml of pH=12 buffer (aqueous) was placed in a visible spectrometer. A sample of each compound was dissolved in methanol, and a small amount (less than 0.1 cc) of each solution was injected into the buffer. The optical densities were then recorded at a selected wavelength value to determine T ½. The results are set forth below.

| Compound Ex. No. | Wavelength (λmax-nm) | T ½ (pH = 12) (sec.) |
|---|---|---|
| 21 | 640 | 2 |
| 23 | 640 | 158 |
| 24 | 590 | 2 |
| 39 | 640 | 44 |
| 41 | 640 | 18 |

Also, it was observed that a methanol solution of the compound of Example 9, when added to aqueous 1 N KOH, decolorized in approximately 5 seconds and that a methanol solution of the compound of Example 26, when added to aqueous 1 N KOH, decolorized substantially instantaneously.

Using appropriate solvents, samples of the dye compounds prepared in Examples 12, 13, 24, 26 and 39 were incorporated into the image-receiving layer 3 of image-receiving components comprising the structure set forth below by mixing a solution of each compound with a solution of the graft copolymer and coating this mixture on top of the timing layer to complete each of the image-receiving components.

A transparent 4 mil polyethylene terephthalate film base coated with, in succession:
1. as a polymeric acid layer, a mixture of about 9 parts of a partial butyl ester of polyethylene/maleic anhydride copolymer and 1 part of polyvinyl butyral coated at a coverage of about 2,500 mgs./ft.$^2$;
2. a timing layer containing a 14:1 ratio of a 60-30-4-6 tetrapolymer of butylacrylate, diacetone acrylamide, styrene and methacrylic acid and polyvinyl alcohol at a coverage of 500 mgs./ft.$^2$;
3. a graft copolymer of 4-vinylpyridine and vinylbenzyltrimethylammoniumchloride grafted on hydroxyethyl cellulose in a weight ratio of 2.2/1/2.2, respectively, coated at a coverage of 300 mgs./ft.² to provide an image-receiving layer and containing the selected dye compound at a coverage of 22 mgs./ft.².

Each of the image-receiving components containing the respective dye compounds were placed on a piece of gelatin coated Mylar, and the transmission densities for red (R), green (G) and blue (B) were recorded on a transmission densitometer. Then several drops of aqueous 1 N KOH were added to each gelatin sheet, and the image-receiving components were lightly pressed against the gelatin sheets to "bleach" the dye compounds. After 15 to 60 seconds, the transmission densities were again recorded for red (R), green (G) and blue (B) for each "sandwich". The results are set forth below.

| Compound Ex. No. | Transmission Densities** | | | | | |
|---|---|---|---|---|---|---|
| | Before Bleaching | | | After Bleaching | | |
| | R | G | B | R | G | B |
| 12 | .00 | .31 | .45 | .02 | .01 | .00 |
| 13 | .21 | .32 | .09 | .01 | .01 | .00 |
| 24 | .00 | .00 | .40 | .01 | .00 | .00 |
| 26* | .19 | .06 | .05 | .02 | .00 | .02 |
| 39 | .01 | .03 | .59 | .00 | .00 | .01 |

*Measurements made on coating stored for over 3 months; bleaching time was about 3 minutes.
**The densitometer was set at 0.00 for R, G, B with two pieces of gelatin coated Mylar in the light beam.

The dye compound of Example 45 also was incorporated into the image-receiving layer 3 of an image-receiving component comprising the structure set forth above giving a clear, light yellow film that was quickly bleached with aqueous 1 N NaOH leaving a colorless ("to the dye") film.

It will be appreciated that various solvents may be employed for dispersing the dyes in the image-receiving or other appropriate layer of the photographic product and that useful solvents may be readily selected for a given compound. If desired, additional —OH groups or other solubilizing groups, such as, —COOH or —SO₃H, may be incorporated into the dye molecule, for example, on said A and/or B moieties or via the X group. Depending upon the mobility of the dye in a given matrix or binder, it may be desirable to employ an immobilizing group or a group that will mordant to the matrix to prevent migration of the dye, particularly, where the photographic product is subjected to conditions of high temperature and high humidity prior to use.

Also, it will be appreciated that in utilizing the subject dyes to correct color balance, for example, in multicolor diffusion transfer photographic film units that a photosensitive element may be exposed to a suitable multicolor step-wedge and diffusion transfer processed with a given processing composition and image-receiving element. The blue, green and red D log E curves of the resulting multicolor transfer image (sample image) are then prepared. Examination of these D log E curves will indicate to one skilled in color photographic sensitometry the manner and extent to which the individual D log E curves depart from the desired curve shape. From this examination, one may determine by routine analysis and experimentation how much filtration would be required of what wavelength range or ranges to obtain a more desirable color balance. The photosensitive element of another film unit, having the identical photosensitive element, image-receiving element and processing composition as used in obtaining the sample image, is then given the same exposure through a conventional color correction filter(s) of the color and density estimated to be necessary to provide the desired changes in the D log E curves of the sample image. The blue, green and red D log E curves of the resulting test multicolor transfer image are then prepared and compared with the sample. While more than one "test" may be required to determine the color filtration most effective to give the desired D log E curve shape changes, such tests may be performed rapidly and easily. When the appropriate color filtration has been determined, a layer containing a color correction dye or dyes absorbing light in appropriate wavelength range(s) is coated on a transparent support at a coverage calculated to provide the requisite density. This "test" color correction dye layer is placed in the exposure path and the previous exposure test repeated. Analysis of the D log E curves of the resulting multicolor transfer image will indicate what changes, if any, should be made in the spectral absorption range and density prior to incorporating a corresponding color correction dye layer into the diffusion transfer film unit.

It will be recognized that effecting photoexposure through a layer containing the subject dye(s) is effective to "filter", i.e., decrease the exposure given to the silver halide layer(s) exposable by light absorbed by said color correction dye(s) and that one or more dyes of the present invention may be used in conjunction with other filter dyes for effecting changes in one, two or all three of the individual red, green and blue H and D curves to achieve the desired color balance. Though the subject dyes find particular utility in diffusion transfer and other photographic film units where it is desired to bleach the dye(s) during processing subsequent to photoexposure through the dye layer(s), the subject dyes also may be employed in diffusion transfer and other film units where the dye is so positioned as not to contribute dye density to the transfer or final image. Where the filter dye layer through which photoexposure has been made is not part of the transfer image, or where the final image is masked from view as in certain integral negative-positive reflection print structures, the "unbleached" filter dye should be non-diffusable to the image-receiving layer containing the transfer image. The requisite non-diffusion character may be provided by the use of a suitable mordant, by the use of long chain "ballast" or "anchor" substituents and/or other art known techniques.

As noted in the above example, in integral diffusion transfer film units, the color correction dye(s) may be incorporated in the image-receiving layer. The choice of location of the color correction dye(s) will depend in large part upon what stage of the manufacturing process the determination is made to incorporate such a color correction dye. As will be readily apparent, provision of the color correction dye(s) in a separate layer has the advantage of permitting modification after the components have fully "matured" and also permits different modification of portions of the same lot of the positive component.

The supports for the various layers may be any of the types known in the art to be useful. In the preferred embodiments wherein an integral negative-positive reflection print is obtained, the supports should be dimensionally stable and may be polyethylene terephthalate or other polymeric film base, as disclosed in the cross-referenced patents.

It will be recognized that the transfer image formed following exposure and processing of film units of the type illustrated in FIG. 2 will be a geometrically reversed image of the subject. Accordingly, to provide geometrically non-reversed transfer images, exposure of such film units should be accomplished through an image reversing optical system, such as in a camera possessing an image reversing optical system utilizing mirror optics, e.g., as described in U.S. Pat. No. 3,447,437 issued June 3, 1969 to Douglas B. Tiffany.

Where the expression "positive image" has been used, this expression should not be interpreted in a restrictive sense since it is used primarily for purposes of illustration, in that it defines the image produced on the image-carrying layer as being reversed, in the positive-negative sense, with respect to the image in the photosensitive emulsion layers. As an example of an alternative meaning for "positive image", assume that the photosensitive element is exposed to actinic light through a negative transparency. In this case, the latent image in the photosensitive emulsion layers will be positive and the dye image produced on the image-carrying layer will be negative. The expression "positive image" is intended to cover such an image produced on the image-carrying layer, as well as transfer images obtained by use of direct positive silver halide emulsions to provide a "positive" image of the photographed subject.

While the usefulness of the subject dyes has been illustrated as applied to integral diffusion transfer film units where the transfer image is retained with the developed photosensitive element as part of a permanent laminate, it will be understood that the dyes of this invention also may be used to provide antihalo, color correction or other light filtering layer(s) in diffusion transfer film units where the transfer image, either in silver or in dye, is separated from the developed photosensitive layer(s) subsequent to processing. Though the image dye-providing materials are preferably dye developers, it will be appreciated that other types of image dyes and dye intermediates may be employed to provide the dye transfer image.

Besides their usefulness in diffusion transfer photographic products and processes, the dyes of the present invention also may be used in filter layers of conventional photographic materials, for example, in antihalation or color correction layers in conventional negatives, and may be disposed in the appropriate layer(s) in an amount sufficient to provide the desired filtering effect. The selection and incorporation of the dyes for the desired filtering effect may be accomplished in a known manner using conventional techniques and is well within the skill of the art. For example, for color correction purposes, the dye(s) selected may absorb light within a specific wavelength range, e.g., blue, green or red light, or within a combination of several wavelength ranges and will be disposed in a layer through which photoexposure is made. Indeed, it may be desirable in a given instance to filter light of two different wavelength ranges in a ratio such that one silver halide emulsion receives more exposure filtration than does another. As in the diffusion transfer film units, the dye(s) selected for color correction are advantageously applied after the photosensitive element has aged to "maturity", i.e., the sensitometry of the photosensitive element as manufactured is no longer changing significantly with time. Where the subject dyes are employed for antihalation purposes, they may be incorporated, for example, in a layer on one or both sides of a support carrying the photosensitive layer(s) and where they are employed as optical filter agents, they will be so positioned as to prevent post-exposure fogging during processing in ambient light without, of course, interfering with imagewise exposure of the photosensitive layer(s) or with viewing of the final image.

Since certain changes may be made in the hereinafter defined subject matter without departing from the scope of the invention herein involved, it is intended that all matter contained in the above description and examples be interpreted as illustrative and not in a limiting sense.

What is claimed is:

1. A photographic product comprising a plurality of layers including a support and at least one photosensitive silver halide emulsion layer carried on said support, at least one of said layers containing a colored triarylmethane compound possessing in its triarylmethane structure a 4'-oxo-1'-naphthylidene or a 4'-oxo-1'-phenylidene moiety; a naphthyl moiety or a phenyl moiety; and a phenyl moiety substituted in the ortho-position to the central carbon atom of said triarylmethane compound with a non-nucleophilic group that cannot add to said central carbon atom but in alkaline solution undergoes an irreversible cleavage reaction with base that is complete within a predetermined time at a predetermined alkaline pH to provide a nucleophilic moiety that adds to said central carbon atom to form a ring-closed compound which is colorless.

2. A photographic product as defined in claim 1 wherein said colored compound is disposed in a processing composition permeable layer on the same side of said support as said silver halide emulsion layer(s).

3. A photographic product as defined in claim 2 which comprises, in order, said support, said photosensitive silver halide emulsion layer and said layer containing said colored compound.

4. A photographic product as defined in claim 3 which includes a silver-precipitating layer carried on said support or on a second support and so positioned as to receive a silver diffusion transfer image upon application of an aqueous alkaline processing composition to provide a silver halide developing agent and a silver halide solvent.

5. A photographic product as defined in claim 4 which comprises, in order, said support, an additive multicolor screen, said silver-precipitating layer, said photosensitive silver halide emulsion layer and said layer of said colored compound, said support being transparent.

6. A photographic product as defined in claim 2 wherein said support is transparent and said colored compound is disposed in a layer between said support and said silver halide emulsion layer(s).

7. A photographic product as defined in claim 2 which additionally includes a layer of said colored compound coated over the photosensitive silver halide emulsion layer outermost from said support on the surface opposite said support.

8. A photographic product as defined in claim 2 wherein said silver halide emulsion layers are a red-sensitive silver halide emulsion, a green-sensitive silver halide emulsion and a blue-sensitive silver halide emulsion, each said emulsion layer having an image dye-providing substance associated therewith.

9. A photographic product as defined in claim 1 wherein said colored compound has the formula

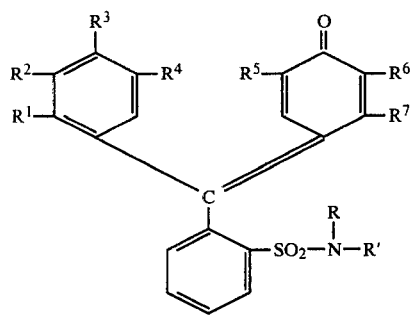

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen; alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group; R' is selected from

wherein R" is methyl, unsubstituted or substituted with one or two halo groups or substituted with a phenyl, alkoxy or phenoxy group, and

wherein Y is an electron-withdrawing group; and R and R' taken with said

represents

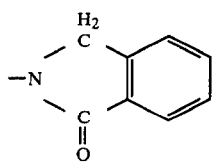

10. A photographic product as defined in claim 1 wherein said colored compound has the formula

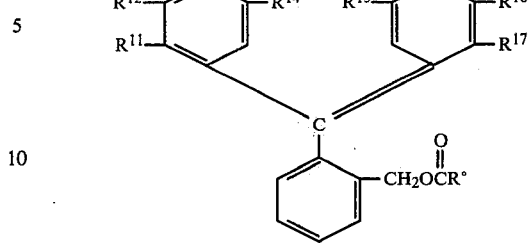

wherein $R^{11}$ is hydrogen, alkyl, alkoxy or hydroxy; $R^{12}$ and $R^{14}$ each are selected from hydrogen, alkyl, alkoxy, chloro and fluoro; $R^{11}$ and $R^{12}$ taken together represent the carbon atoms necessary to complete a fused benzene ring; $R^{13}$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^{15}$ is hydrogen, phenyl, alkyl, alkoxy, chloro or fluoro; $R^{16}$ is hydrogen, alkyl, alkoxy, chloro or fluoro; $R^{17}$ is hydrogen, alkyl, alkoxy or hydroxy and $R^{16}$ and $R^{17}$ taken together represent the carbon atoms necessary to complete a fused benzene ring; and R° is hydrogen; alkyl, unsubstituted or substituted with halo, alkoxy, carboxy-substituted alkoxy, phenoxy or phenyl; or phenyl, unsubstituted or substituted in the m- or p-position with halo, alkoxy, nitro, dimethylamino or alkyl.

11. A photographic product as defined in claim 1 wherein said colored compound has the formula

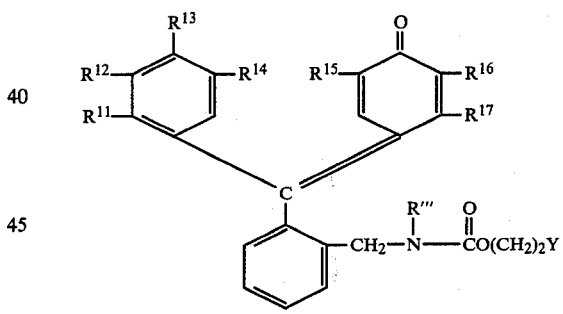

wherein $R^{11}$ is hydrogen, alkyl, alkoxy or hydroxy, $R^{12}$ and $R^{14}$ each are selected from hydrogen, alkyl, alkoxy, chloro and fluoro; $R^{11}$ and $R^{12}$ taken together represent the carbon atoms necessary to complete a fused benzene ring; $R^{13}$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^{15}$ is hydrogen, phenyl, alkyl, alkoxy, chloro or fluoro; $R^{16}$ is hydrogen, alkyl, alkoxy, chloro or fluoro; $R^{17}$ is hydrogen, alkyl, alkoxy or hydroxy and $R^{16}$ and $R^{17}$ taken together represent the carbon atoms necessary to complete a fused benzene ring; R''' is alkyl, unsubstituted or substituted with a solubilizing group; and Y is an electron-withdrawing group.

12. A photographic product as defined in claim 1 wherein said colored compound has the formula

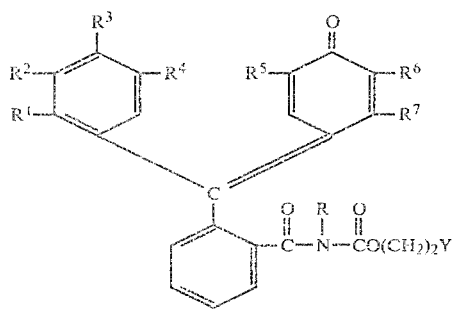

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen; alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group and Y is an electron-withdrawing group.

13. A photographic product for forming a multicolor diffusion transfer image, said product comprising a first sheet-like element comprising a first support carrying a red-sensitive silver halide emulsion layer, a green-sensitive silver halide emulsion layer, and a blue-sensitive silver halide emulsion layer, said silver halide emulsion layers having associated therewith, respectively, a cyan image dye-providing material, a magenta image dye-providing material and a yellow image dye-providing material; a second sheet-like element comprising a second support; said first and second sheet-like elements being in superposed relationship, or adapted to be brought into superposed relationship, with said supports being outermost; at least one of said supports being transparent to permit photoexposure of said silver halide emulsions therethrough; a rupturable container releasably holding an aqueous alkaline processing composition, said rupturable container being so positioned as to be capable of discharging said processing composition between a pair of predetermined layers carried by said supports; an image-receiving layer carried by one of said supports; and a colored triarylmethane compound being disposed in a processing composition permeable layer carried by one of said supports, said triarylmethane compound possessing in its triarylmethane structure a 4'-oxo-1'-naphthylidene or a 4'-oxo-1'-phenylidene moiety; a naphthyl moiety or a phenyl moiety; and a phenyl moiety substituted in the ortho-position to the central carbon atom of said triarylmethane compound with a non-nucleophilic group that cannot add to said central carbon atom but in alkaline solution undergoes an irreversible cleavage reaction with base that is complete within a predetermined time at a predetermined alkaline pH to provide a nucleophilic moiety that adds to said central carbon atom to form a ring-closed compound which is colorless.

14. A photographic product as defined in claim 13 wherein said colored compound is so positioned that photoexposure of said silver halide emulsion layers is effected therethrough.

15. A photographic product as defined in claim 14 wherein said second support is transparent and said image-receiving layer and said colored compound are carried by said transparent second support of said second sheet-like element.

16. A photographic product as defined in claim 15 wherein said colored compound is disposed in said image-receiving layer.

17. A photographic product as defined in claim 15 wherein said first support is opaque.

18. A photographic product as defined in claim 14 wherein said first and second supports are transparent.

19. A photographic product as defined in claim 13 wherein said product includes means providing a layer of a white pigment between said image-receiving layer and said silver halide emulsions.

20. A photographic product as defined in claim 19 wherein said means providing a layer of a white pigment comprises a white pigment dispersed in said processing composition.

21. A photographic product as defined in claim 19 wherein said means providing a layer of a white pigment comprises a preformed layer of a white pigment.

22. A photographic product as defined in claim 21 wherein said colored compound is disposed in said preformed layer of a white pigment.

23. A photographic product as defined in claim 13 wherein each said image dye-providing materials is an image dye-providing material selected from image dyes and image dye intermediates.

24. A photographic product as defined in claim 23 wherein each said image dye-providing material is a dye.

25. A photographic product as defined in claim 24 wherein each said dye is a dye developer.

26. A photographic product as defined in claim 13 wherein said first and second sheet-like elements are in superposed relationship.

27. A photographic product as defined in claim 13 wherein said second sheet-like element is adapted to be superposed with said first sheet-like element.

28. A photographic product as defined in claim 13 wherein said colored compound has the formula

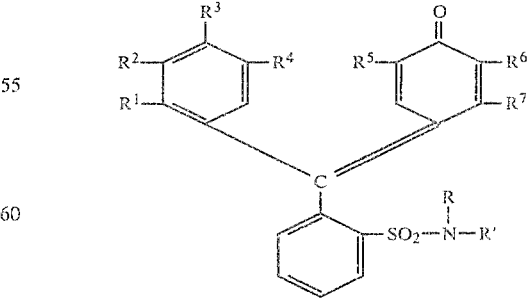

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group; R' is selected from

wherein R" is methyl, unsubstituted or substituted with one or two halo groups or substituted with a phenyl, alkoxy or phenoxy group, and

wherein Y is an electron-withdrawing group; and R and R' taken with said

represents

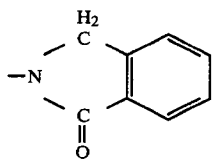

29. A photographic product as defined in claim 13 wherein said colored compound has the formula

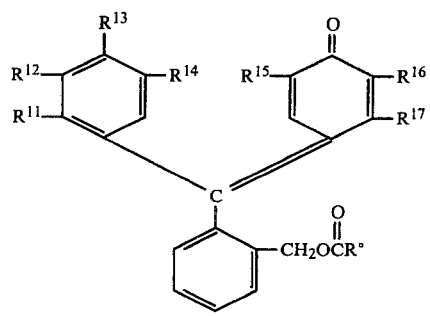

wherein $R^{11}$ is hydrogen, alkyl, alkoxy or hydroxy; $R^{12}$ and $R^{14}$ each are selected from hyrogen, alkyl, alkoxy, chloro and fluoro; $R^{11}$ and $R^{12}$ taken together represent the carbon atoms necessary to complete a fused benzene ring; $R^{13}$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^{15}$ is hydrogen, phenyl, alkyl, alkoxy, chloro or fluoro; $R^{16}$ is hydrogen, alkyl, alkoxy, chloro or fluoro; $R^{17}$ is hydrogen, alkyl, alkoxy or hydroxy and $R^{16}$ and $R^{17}$ taken together represent the carbon atoms necessary to complete a fused benzene ring; and R° is hydrogen; alkyl, unsubstituted or substituted with halo, alkoxy, carboxy-substituted alkoxy, phenoxy or phenyl; or phenyl, unsubstituted or substituted in the m- or p-position with halo, alkoxy, nitro, dimethylamino or alkyl.

30. A photographic product as defined in claim 13 wherein said colored compound has the formula

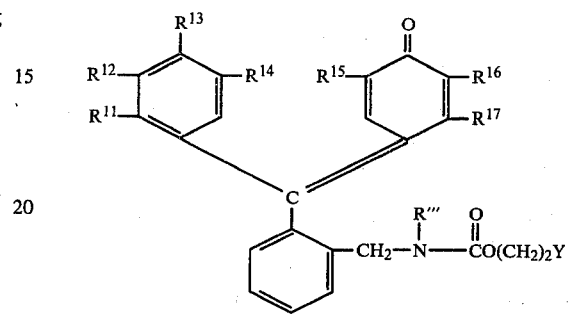

wherein $R^{11}$ is hydrogen, alkyl, alkoxy or hydroxy, $R^{12}$ and $R^{14}$ each are selected from hydrogen, alkyl, alkoxy, chloro and fluoro; $R^{11}$ and $R^{12}$ taken together represent the carbon atoms necessary to complete a fused benzene ring; $R^{13}$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^{15}$ is hydrogen, phenyl, alkyl, alkoxy, chloro or fluoro; $R^{16}$ is hydrogen, alkyl, alkoxy, chloro or fluoro; $R^{17}$ is hydrogen, alkyl, alkoxy or hydroxy and $R^{16}$ and $R^{17}$ taken together represent the carbon atoms necessary to complete a fused benzene ring; R''' is alkyl, unsubstituted or substituted with a solubilizing group; and Y is an electron-withdrawing group.

31. A photographic product as defined in claim 13 wherein said colored compound has the formula

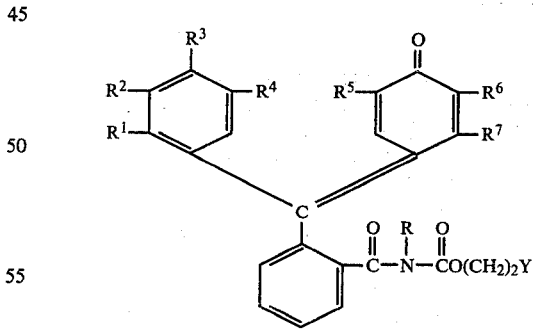

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen; alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]- quinolizidine ring; $R^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group of a phenyl group, unsubstituted or substituted with a solubilizing group and Y is an electron-withdrawing group.

32. A photographic process which comprises the steps of exposing a photosensitive film comprising a plurality of layers including at least one photosensitive silver halide emulsion layer carried on a support, at least one of said layers containing a colored triarylmethane compound possessing in its triarylmethane structure a 4'-oxo-1'-naphthylidene or a 4'-oxo-1'-phenylidene moiety; a naphthyl moiety or a phenyl moiety; and a phenyl moiety substituted in the ortho-position to the central carbon atom of said triarylmethane compound with a non-nucleophilic group that cannot add to said central carbon atom but in alkaline solution undergoes an irreversible cleavage reaction but with base that is complete within a predetermined time at a predetermined alkaline pH to provide a nucleophilic moiety that adds to said central carbon atom to form a ring-closed compound which is colorless and contacting said photosensitive silver halide emulsion layer(s) with an aqueous alkaline processing composition having an alkaline pH to effect development.

33. A photographic process as defined in claim 32 wherein said colored compound is disposed in a processing composition permeable layer on the same side of said support as said silver halide emulsion layer and the pH of said processing composition in contact with said colored compound is maintained at an alkaline pH for a time sufficient to effect cleavage of said non-nucleophilic group whereby said colored compound is converted to a colorless compound.

34. A photographic process as defined in claim 33 wherein said support is transparent and said colored compound is disposed in a layer between said support and said silver halide emulsion layer(s).

35. A photographic process as defined in claim 33 wherein said film includes a layer of said colored compound coated over the silver halide emulsion layer outermost from said support on the surface opposite said support.

36. A photographic process as defined in claim 33 wherein said silver halide emulsion layers are a red-sensitive silver halide layer, a green-sensitive silver halide layer and a blue-sensitive silver halide layer, each said emulsion layer having an image dye-providing material associated therewith.

37. A photographic process as defined in claim 33 including the step of separating said processing composition from contact with said film unit subsequent to development and irreversible cleavage of said non-nucleophilic group.

38. A photographic process which comprises, in combination, the steps of:
(a) exposing a photosensitive film unit comprising a plurality of layers including a support carrying at least one photosensitive silver halide emulsion layer having associated therewith an image-providing material, an image-receiving layer adapted to receive a solubilized image-providing material diffusing thereto, at least one of said layers on the same side of said support as said silver halide layer(s) containing a colored triarylmethane compound possessing in its triarylmethane structure a 4'-oxo-1'-naphthylidene or a 4'-1'-phenylidene moiety; a naphthyl moiety or a phenyl moiety; and a phenyl moiety substituted in the ortho-position to the central carbon atom of said triarylmethane compound with a non-nucleophilic group that cannot add to said central carbon atom but in alkaline solution undergoes an irreversible cleavage reaction with base that is complete within a predetermined time at a predetermined alkaline pH to provide a nucleophilic moiety that adds to said central carbon atom to form a ring-closed compound which is colorless;

(b) contacting said silver halide layer(s) and said colored compound with a processing composition having an alkaline pH at least as high as said predetermined pH;

(c) effecting thereby development of said silver halide layer(s);

(d) maintaining the pH of said processing composition in contact with said colored compound at least as high as said predetermined alkaline pH for a time sufficient to effect irreversible cleavage of said non-nucleophilic group whereby said colored compound is converted to said colorless ring-closed compound;

(e) forming as a result of said development, an imagewise distribution of diffusible image-providing material; and (f) transferring, by diffusion, at least a portion of said imagewise distribution of diffusible image-providing material to said layer adapted to receive said material to provide a transfer image thereto.

39. A photographic process as defined in claim 38 which includes the step of maintaining said film unit intact subsequent to said processing.

40. A photographic process as defined in claim 39 wherein said processing composition includes a silver halide solvent and said transfer image is an image in silver.

41. A photographic process as defined in claim 40 wherein said photosensitive film unit comprises, in order, a transparent support, an additive multicolor screen, an image-receiving layer comprising a silver-precipitating layer, a photosensitive silver halide emulsion layer and a layer of said colored compound.

42. A photographic process as defined in claim 38 wherein said colored compound has the formula

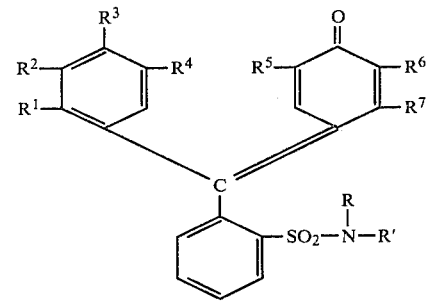

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, -N,N-

(dialkyl)amino, -N,N-(w-R$^8$alkyl)$_2$amino wherein R$^8$ is halo or hydroxy; piperidino, pyrrolidino, N-methylpiperazino, morpholino, thiomorpholino or tetrahydro-2H,4H-1,3,6-dioxazocino; R$^2$, R$^3$ and R$^4$ are taken together represent the atoms necessary to complete a fused [ij]quinolizidine ring; R$^5$ is hydrogen, alkyl, phenyl, alkoxy, chloro, fluoro or perhalomethylcarbinol; R$^6$ is hydrogen, alkyl, alkoxy, chloro or fluoro; R$^7$ is hydrogen, alkyl, alkoxy or hydroxy; R$^6$ and R$^7$ taken together represent the carbon atoms necessary to complete a fused benzene ring; R is an alkyl group or a phenyl group, unsubstituted or substituted with a solubilizing group; R' is selected from

wherein R'' is methyl, unsubstituted or substituted with one or two halo groups or substituted with a phenyl, alkoxy or phenoxy group, and

wherein Y is an electron-withdrawing group; and R and R' taken with said

represents

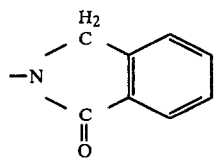

43. A photographic process as defined in claim 38 wherein said colored compound has the formula

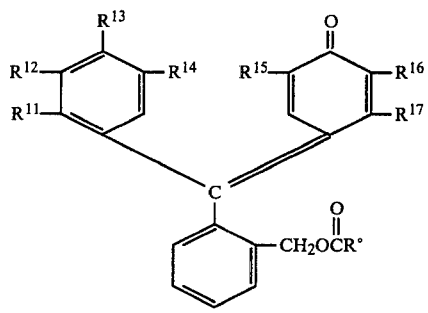

wherein R$^{11}$ is hydrogen, alkyl, alkoxy or hydroxy; R$^{12}$ and R$^{14}$ each are selected from hydrogen, alkyl, alkoxy, chloro and fluoro; R$^{11}$ and R$^{12}$ taken together represent the carbon atoms necessary to complete a fused benzene ring; R$^{13}$ is hydrogen, alkyl, alkoxy, hydroxy, -N,N-(dialkyl)amino, -N,N-(w-R$^8$alkyl)$_2$amino wherein R$^8$ is halo or hydroxy; piperidino, pyrrolidino, N-methylpiperazino, morpholino, thiomorpholino or tetrahydro-2H,4H-1,3,6-dioxazocino; R$^{15}$ is hydrogen, phenyl, alkyl, alkoxy, chloro or fluoro; R$^{16}$ is hydrogen, alkyl, alkoxy, chloro or fluoro; R$^{17}$ is hydrogen, alkyl, alkoxy or hydroxy and R$^{16}$ and R$^{17}$ taken together represent the carbon atoms necessary to complete a fused benzene ring; and R° is hydrogen; alkyl, unsubstituted or substituted with halo, alkoxy, carboxy-substituted alkoxy, phenoxy or phenyl; or phenyl, unsubstituted or substituted in the m- or p-position with halo, alkoxy, nitro, dimethylamino or alkyl.

44. A photographic process as defined in claim 38 wherein said colored compound has the formula

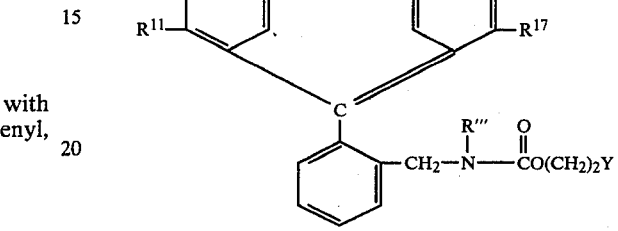

wherein R$^{11}$ is hydrogen, alkyl, alkoxy or hydroxy; R$^{12}$ and R$^{14}$ each are selected from hydrogen, alkyl, alkoxy, chloro and fluoro; R$^{11}$ and R$^{12}$ taken together represent the carbon atoms necessary to complete a fused benzene ring; R$^{13}$ is hydrogen, alkyl, alkoxy, hydroxy, -N,N-(dialkyl)amino, -N,N-(w-R$^8$alkyl)$_2$amino wherein R$^8$ is halo or hydroxy; piperidino, pyrrolidino, N-methylpiperazino, morpholino, thiomorpholino or tetrahydro-2H,4H-1,3,6-dioxazocino; R$^{15}$ is hydrogen, phenyl, alkyl, alkoxy, chloro or fluoro; R$^{16}$ is hydrogen, alkyl, alkoxy, chloro or fluoro; R$^{17}$ is hydrogen, alkyl, alkoxy or hydroxy and R$^{16}$ and R$^{17}$ taken together represent the carbon atoms necessary to complete a fused benzene ring; R''' is alkyl, unsubstituted or substituted with a solubilizing group; and Y is an electron-withdrawing group.

45. A photographic process as defined in claim 38 wherein said colored compound has the formula

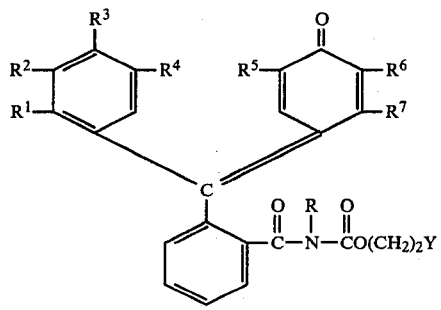

wherein R$^1$ is hydrogen, alkyl, alkoxy or hydroxy; R$^2$ and R$^4$ each are selected from hydrogen, alkyl, alkoxy, chloro and fluoro; R$^1$ and R$^2$ taken together represent the carbon atoms necessary to complete a fused benzene ring; R$^3$ is hydrogen; alkyl, alkoxy, hydroxy, -N,N-(dialkyl)amino, -N,N-(w-R$^8$alkyl)$_2$amino wherein R$^8$ is halo or hydroxy; piperidino, pyrrolidino, N-methylpiperazino, morpholino, thiomorpholino or tetrahydro-2H,4H-1,3,6-dioxazocino; R$^2$, R$^3$ and R$^4$ taken together represent the atoms necessary to complete a fused [ij]quinolizidine ring; R$^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group and Y is an electron-withdrawing group.

46. A photographic process for forming a multicolor diffusion transfer image which comprises the steps of:

(a) exposing a photosensitive film unit which includes, in combination, a first sheet-like element comprising a first support carrying a red-sensitive silver halide emulsion layer, a green-sensitive silver halide emulsion layer, and a blue-sensitive silver halide emulsion layer, said silver halide emulsion layers having associated therewith, respectively, a cyan image dye-providing material, a magenta image dye-providing material and a yellow image dye-providing material; a second sheet-like element comprising a second support; said first and second sheet-like elements being in superposed relationship, or adapted to be brought into superposed relationship, with said supports being outermost; at least one of said supports being transparent to permit photoexposure of said silver halide emulsions therethrough; a rupturable container releasably holding an aqueous alkaline processing composition, said rupturable container being so positioned as to be capable of discharging said processing composition between a pair of predetermined layers carried by said supports; an image-receiving layer carried by one of said supports; and a colored compound disposed in a processing composition permeable layer carried by one of said supports, said colored compound being a triarylmethane compound possessing in its triarylmethane structure a 4'-oxo-1'-naphthylidene or a 4'-oxo-1'-phenylidene moiety; a naphthyl moiety or a phenyl moiety; and a phenyl moiety substituted in the ortho-position to the central carbon atom of said triarylmethane compound with a non-nucleophilic group that cannot add to said central carbon atom but in alkaline solution undergoes an irreversible cleavage reaction with base that is complete within a predetermined time at a predetermined alkaline pH to provide a nucleophilic moiety that adds to said central carbon atom to form a ring-closed compound which is colorless;

(b) contacting said silver halide layer(s) and said colored compound with a processing composition having an alkaline pH at least as high as said predetermined pH;

(c) effecting thereby development of said silver halide layer(s);

(d) maintaining the pH of said processing composition in contact with said colored compound at least as high as said predetermined alkaline pH for a time sufficient to effect irreversible cleavage of said non-nucleophilic group whereby said colored compound is converted to said colorless ring-closed compound;

(e) forming as a result of said development, an imagewise distribution of diffusible image dye-providing material; and (f) transferring, by diffusion, at least a portion of said imagewise distribution of diffusible image dye-providing material to said image-receiving layer to provide a transfer image thereto.

47. A photographic process as defined in claim 46 wherein said colored compound is so positioned that exposure of said silver halide layer(s) is effected therethrough.

48. A photographic process as defined in claim 47 wherein said second support is transparent and said image-receiving layer and said colored compound are carried by said transparent second support of said second sheet-like element.

49. A photographic process as defined in claim 47 wherein said product includes means providing a layer of a white pigment between said image-receiving layer and said silver halide emulsions.

50. A photographic process as defined in claim 49 wherein said means providing a layer of white pigment comprises a white pigment dispersed in said processing composition.

51. A photographic process as defined in claim 49 wherein said means providing a layer of a white pigment comprises a performed layer of a white pigment.

52. A photographic process as defined in claim 48 wherein said colored compound is disposed in said image-receiving layer.

53. A photographic process as defined in claim 48 wherein said first support is opaque.

54. A photographic process as defined in claim 46 wherein each said image dye-providing materials is an image dye-providing material selected from image dyes and image dye intermediates.

55. A photographic process as defined in claim 54 wherein each said image dye-providing material is a dye.

56. A photographic process as defined in claim 55 wherein each said dye is a dye developer.

57. A photograhic process as defined in claim 46 wherein said first and second sheet-like elements are in superposed relationship.

58. A photographic product as defined in claim 46 wherein said second sheet-like element is adapted to be superposed with said first sheet-like element.

59. A photographic process as defined in claim 46 wherein said colored compound has the formula

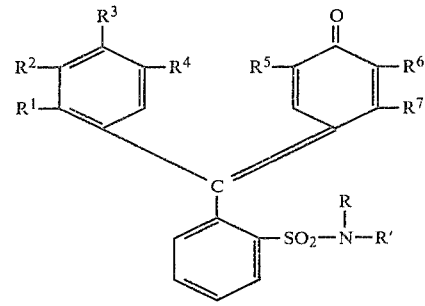

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group; R' is selected from

wherein R" is methyl, unsubstituted or substituted with one or two halo groups or substituted with a phenyl, alkoxy or phenoxy group, and

wherein Y is an electron-withdrawing group; and R and R' taken with said

represents

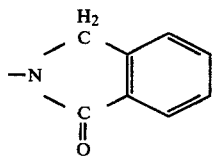

60. A photographic process as defined in claim 46 wherein said colored compound has the formula

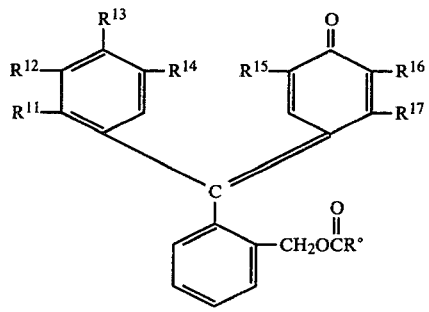

wherein $R^{11}$ is hydrogen, alkyl, alkoxy or hydroxy; $R^{12}$ and $R^{14}$ each are selected from hydrogen, alkyl, alkoxy, chloro and fluoro; $R^{11}$ and $R^{12}$ taken together represent the carbon atoms necessary to complete a fused benzene ring; $R^{13}$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^{15}$ is hydrogen, phenyl, alkyl, alkoxy, chloro or fluoro; $R^{16}$ is hydrogen, alkyl, alkoxy, chloro or fluoro; $R^{17}$ is hydrogen, alkyl, alkoxy or hydroxy and $R^{16}$ and $R^{17}$ taken together represent the carbon atoms necessary to complete a fused benzene ring; and R° is hydrogen; alkyl, unsubstituted or substituted with halo, alkoxy, carboxy-substituted alkoxy, phenoxy or phenyl, or phenyl, unsubstituted or substituted in the m- or p-position with halo, alkoxy, nitro, dimethylamino or alkyl.

61. A photographic process as defined in claim 46 wherein said colored compound has the formula

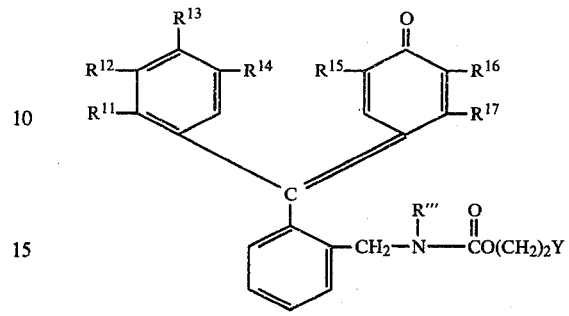

wherein $R^{11}$ is hydrogen, alkyl, alkoxy or hydroxy; $R^{12}$ and $R^{14}$ each are selected from hydrogen, alkyl, alkoxy, chloro and fluoro; $R^{11}$ and $R^{12}$ taken together represent the carbon atoms necessary to complete a fused benzene ring; $R^{13}$ is hydrogen, alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^{15}$ is hydrogen, phenyl, alkyl, alkoxy, chloro or fluoro; $R^{16}$ is hydrogen, alkyl, alkoxy, chloro or fluoro; $R^{17}$ is hydrogen, alkyl, alkoxy or hydroxy and $R^{16}$ and $R^{17}$ taken together represent the carbon atoms necessary to complete a fused benzene ring; R''' is alkyl, unsubstituted or substituted with a solubilizing group; and Y is an electron-withdrawing group.

62. A photographic process as defined in claim 46 wherein said colored compound has the formula

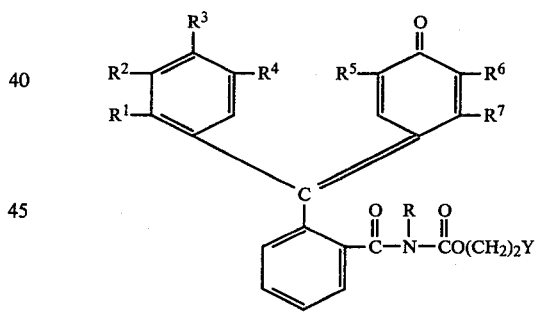

wherein $R^1$ is hydrogen, alkyl, alkoxy or hydroxy; $R^2$ and $R^4$ each are selected from hydrogen, alkyl, alkoxy, chloro and fluoro; $R^1$ and $R^2$ taken together represent the carbon atoms necessary to complete a fused benzene ring; $R^3$ is hydrogen; alkyl, alkoxy, hydroxy, -N,N-(dialkyl)amino, -N,N-(w-$R^8$alkyl)$_2$amino wherein $R^8$ is halo or hydroxy; piperidino, pyrrolidino, N-methylpiperazino, morpholino, thiomorpholino or tetrahydro-2H,4H-1,3,6-dioxazocino; $R^2$, $R^3$ and $R^4$ taken together represent the atoms necessary to complete a fused [ij]-quinolizidine ring; $R^5$ is hydrogen, alkyl, phenyl, alkoxy, chloro, fluoro or perhalomethylcarbinol; $R^6$ is hydrogen, alkyl, alkoxy, chloro or fluoro; $R^7$ is hydrogen, alkyl, alkoxy or hydroxy; $R^6$ and $R^7$ taken together represent the carbon atoms necessary to complete a fused benzene ring; R is an alkyl group or a phenyl group, unsubstituted or substituted with a solubilizing group and Y is an electron-withdrawing group.

* * * * *